US011044204B1

(12) United States Patent
Matthews et al.

(10) Patent No.: US 11,044,204 B1
(45) Date of Patent: Jun. 22, 2021

(54) VISIBILITY PACKETS WITH INFLATED LATENCY

(71) Applicant: Innovium, Inc., San Jose, CA (US)

(72) Inventors: William Brad Matthews, San Jose, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 1 day.

(21) Appl. No.: 16/527,278

(22) Filed: Jul. 31, 2019

Related U.S. Application Data

(63) Continuation of application No. 15/410,686, filed on Jan. 19, 2017, now Pat. No. 10,389,643.

(60) Provisional application No. 62/289,199, filed on Jan. 30, 2016.

(51) Int. Cl.
*H04L 12/825* (2013.01)
*H04L 12/26* (2006.01)

(52) U.S. Cl.
CPC .......... *H04L 47/26* (2013.01); *H04L 43/0882* (2013.01)

(58) Field of Classification Search
CPC ..................... H04L 47/26; H04L 43/0882
USPC .................................. 370/229, 235
See application file for complete search history.

(56) References Cited

U.S. PATENT DOCUMENTS

| 5,805,602 | A | * | 9/1998 | Cloutier | H04N 21/4305 |
| | | | | | 348/497 |
| 6,865,160 | B1 | | 3/2005 | Bare | |
| 7,295,562 | B1 | | 11/2007 | Acharya et al. | |
| 7,360,217 | B2 | | 4/2008 | Melvin et al. | |
| 7,813,348 | B1 | | 10/2010 | Gupta et al. | |
| 7,898,959 | B1 | | 3/2011 | Arad | |
| 8,004,990 | B1 | | 8/2011 | Callon | |
| 8,281,033 | B1 | | 10/2012 | Riordan et al. | |
| 9,565,114 | B1 | | 2/2017 | Kabbani et al. | |
| 9,979,624 | B1 | | 5/2018 | Volpe et al. | |
| 10,063,488 | B2 | | 8/2018 | Oran | |

(Continued)

OTHER PUBLICATIONS

United States Patent and Trademark Office, U.S. Appl. No. 15/407,159, Notice of Allowance dated Mar. 25, 2020.

(Continued)

*Primary Examiner* — Obaidul Huq
(74) *Attorney, Agent, or Firm* — Wong & Rees LLP; Karl T. Rees

(57) ABSTRACT

Nodes within a network are configured to adapt to changing path states, due to congestion, node failures, and/or other factors. A node may selectively convey path information and/or other state information to another node by annotating the information into packets it receives from the other node. A node may selectively reflect these annotated packets back to the other node, or other nodes that subsequently receive these annotated packets may reflect them. A weighted cost multipathing selection technique is improved by dynamically adjusting weights of paths in response to feedback indicating the current state of the network topology, such as collected through these reflected packets. In an embodiment, certain packets that would have been dropped may instead be transformed into "special visibility" packets that may be stored and/or sent for analysis. In an embodiment, insight into the performance of a network device is enhanced through the use of programmable visibility engines.

20 Claims, 19 Drawing Sheets

(56) References Cited

U.S. PATENT DOCUMENTS

| | | | |
|---|---|---|---|
| 10,505,849 B1 | 12/2019 | Iny et al. | |
| 2002/0133617 A1 | 9/2002 | Davies | |
| 2003/0093567 A1 | 5/2003 | Lolayekar et al. | |
| 2003/0131122 A1 | 7/2003 | Kondo et al. | |
| 2003/0142685 A1 | 7/2003 | Bare | |
| 2004/0218925 A1 | 11/2004 | Nahm | |
| 2005/0007959 A1 | 1/2005 | Tomonaga et al. | |
| 2005/0068970 A1 | 3/2005 | Srikrishna et al. | |
| 2005/0086363 A1 | 4/2005 | Ji | |
| 2006/0036821 A1 | 2/2006 | Frey et al. | |
| 2006/0218556 A1 | 9/2006 | Nemirovsky et al. | |
| 2006/0274760 A1 | 12/2006 | Loher | |
| 2007/0280117 A1 | 12/2007 | Katz et al. | |
| 2008/0112343 A1 | 5/2008 | Oleszczuk | |
| 2008/0212613 A1 | 9/2008 | Perkinson et al. | |
| 2008/0259800 A1 | 10/2008 | Clark et al. | |
| 2009/0028045 A1 | 1/2009 | Stellenberg et al. | |
| 2009/0075668 A1 | 3/2009 | Rao | |
| 2009/0109858 A1* | 4/2009 | Yamasaki | H04L 47/34 370/242 |
| 2009/0190591 A1 | 7/2009 | Sankaran | |
| 2010/0046524 A1 | 2/2010 | Rune et al. | |
| 2010/0091782 A1* | 4/2010 | Hiscock | H04L 47/10 370/412 |
| 2011/0051602 A1 | 3/2011 | Matthews et al. | |
| 2011/0280126 A1 | 11/2011 | Fefer et al. | |
| 2012/0063451 A1 | 3/2012 | Keesara et al. | |
| 2012/0201241 A1 | 8/2012 | Subramanian et al. | |
| 2012/0236860 A1 | 9/2012 | Kompella et al. | |
| 2014/0092736 A1 | 4/2014 | Baillargeon | |
| 2014/0126396 A1 | 5/2014 | Matthews et al. | |
| 2014/0169189 A1 | 6/2014 | Kalkunte | |
| 2014/0247740 A1 | 9/2014 | Koo | |
| 2015/0016258 A1 | 1/2015 | Okner et al. | |
| 2015/0124608 A1 | 5/2015 | Agarwal et al. | |
| 2016/0087894 A1 | 3/2016 | Chen et al. | |
| 2016/0134915 A1 | 5/2016 | Oran | |
| 2016/0254992 A1 | 9/2016 | Torvi et al. | |
| 2016/0261500 A1 | 9/2016 | Revah et al. | |
| 2016/0269284 A1 | 9/2016 | Cheng et al. | |
| 2017/0048147 A1 | 2/2017 | Vaidya | |
| 2017/0111264 A1 | 4/2017 | Shankarappa et al. | |
| 2017/0126547 A1 | 5/2017 | Wood et al. | |
| 2018/0091388 A1 | 3/2018 | Levy et al. | |
| 2020/0053026 A1 | 2/2020 | Rangachari et al. | |

OTHER PUBLICATIONS

United States Patent and Trademark Office, U.S. Appl. No. 16/288,165, Notice of Allowance dated Jan. 27, 2020.
United States Patent and Trademark Office, U.S. Appl. No. 15/407,159, Advisory Action dated Sep. 24, 2019.
United States Patent and Trademark Office, U.S. Appl. No. 15/410,651, Notice of Allowance dated Sep. 24, 2019.
United States Patent and Trademark Office, U.S. Appl. No. 15/446,888, Notice of Allowance dated Sep. 24, 2019.
Sinha et al. "Harnessing TCP's Burstiness with Flowlet Switching." (2004).
United States Patent and Trademark Office, U.S. Appl. No. 15/410,607, Final Office Action dated Dec. 18, 2018.
United States Patent and Trademark Office, U.S. Appl. No. 15/410,607, Non-Final Office Action dated May 17, 2018.
United States Patent and Trademark Office, U.S. Appl. No. 15/410,607, Notice of Allowance dated Apr. 3, 2019.
United States Patent and Trademark Office, U.S. Appl. No. 15/410,644, Final Office Action dated Oct. 11, 2018.
United States Patent and Trademark Office, U.S. Appl. No. 15/410,644, Non-Final Office Action dated May 3, 2018.
United States Patent and Trademark Office, U.S. Appl. No. 15/410,644, Notice of Allowance dated Jan. 28, 2019.
United States Patent and Trademark Office, U.S. Appl. No. 15/410,651, Final Office Action dated Oct. 11, 2018.
United States Patent and Trademark Office, U.S. Appl. No. 15/410,651, Final Office Action dated Jun. 6, 2019.
United States Patent and Trademark Office, U.S. Appl. No. 15/410,651, Non-Final Office Action dated May 15, 2018.
United States Patent and Trademark Office, U.S. Appl. No. 15/410,651, Non-Final Office Action dated Feb. 15, 2019.
United States Patent and Trademark Office, U.S. Appl. No. 15/410,686, Final Office Action dated Nov. 8, 2018.
United States Patent and Trademark Office, U.S. Appl. No. 15/410,686, Non-Final Office Action dated May 9, 2018.
United States Patent and Trademark Office, U.S. Appl. No. 15/410,686, Notice of Allowance dated Apr. 9, 2019.
United States Patent and Trademark Office, U.S. Appl. No. 15/446,888, Advisory Action dated Mar. 15, 2019.
United States Patent and Trademark Office, U.S. Appl. No. 15/446,888, Final Office Action dated Nov. 23, 2018.
United States Patent and Trademark Office, U.S. Appl. No. 15/446,888, Non-Final Office Action dated May 10, 2018.
United States Patent and Trademark Office, U.S. Appl. No. 15/446,894, Non-Final Office Action dated Jul. 27, 2018.
United States Patent and Trademark Office, U.S. Appl. No. 15/446,894, Notice of Allowance dated Feb. 19, 2019.
United States Patent and Trademark Office, U.S. Appl. No. 15/446,901, Advisory Action dated Mar. 28, 2019.
United States Patent and Trademark Office, U.S. Appl. No. 15/446,901, Final Office Action dated Jan. 15, 2019.
United States Patent and Trademark Office, U.S. Appl. No. 15/446,901, Non-Final Office Action dated Aug. 29, 2018.
United States Patent and Trademark Office, U.S. Appl. No. 15/446,901, Notice of Allowance dated May 28, 2019.
United States Patent and Trademark Office, U.S. Appl. No. 16/575,343, Non-Final Office Action dated Sep. 30, 2020.
United States Patent and Trademark Office, U.S. Appl. No. 16/595,127, Non-Final Office Action dated Oct. 16, 2020.
United States Patent and Trademark Office, U.S. Appl. No. 16/575,343, Final Office Action dated Mar. 31, 2021.
United States Patent and Trademark Office, U.S. Appl. No. 16/595,127, Notice of Allowance dated Mar. 23, 2021.
United States Patent and Trademark Office, U.S. Appl. No. 16/741,510, Notice of Allowance dated Feb. 18, 2021.

* cited by examiner

FIG. 5               500
t0
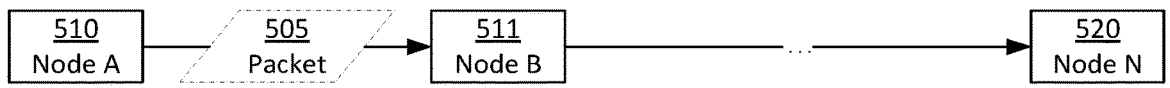
t1
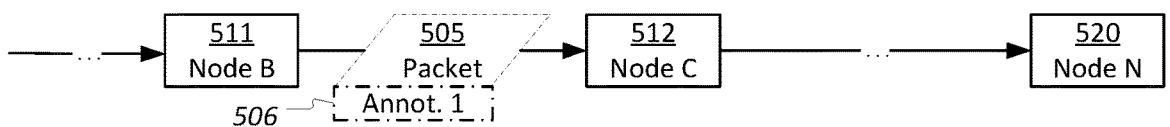
t2
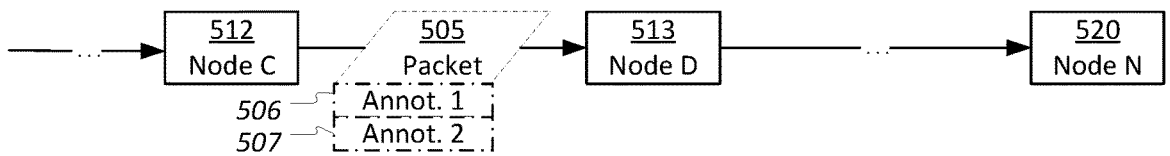
t3
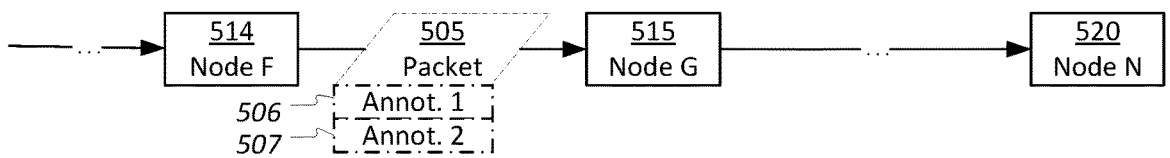
t4
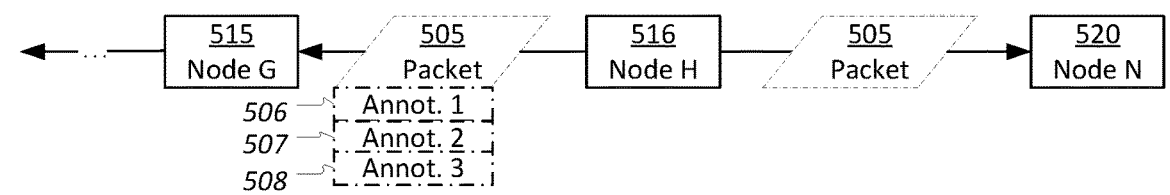
t5
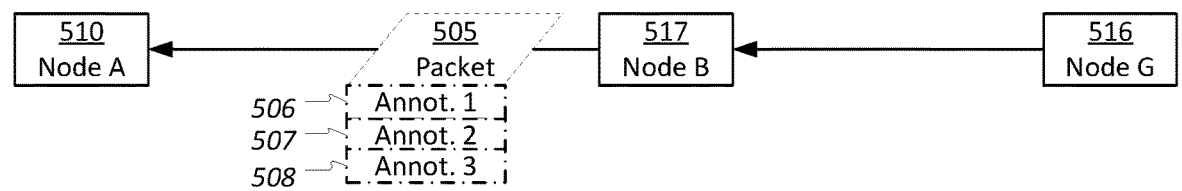

VISIBILITY PACKETS WITH INFLATED LATENCY

PRIORITY CLAIM

This application claims benefit under 35 U.S.C. § 120 as a Continuation of U.S. application Ser. No. 15/410,686, filed Jan. 19, 2017, entitled "Reflected Packets," by Matthews, et al., which claims benefit of 35 U.S.C. § 119(e) of U.S. Provisional Application No. 62/289,199, filed Jan. 30, 2016, the entire contents of each which is hereby incorporated by reference as if fully set forth herein.

CROSS-REFERENCE TO RELATED APPLICATIONS

This application is related to U.S. patent application Ser. No. 15/410,607, filed on Jan. 19, 2017, entitled "Dynamic Weighted Cost Multipathing," by Matthews, et al., the entire contents of which are hereby incorporated by reference for all purposes as if fully set forth herein.

This application is related to U.S. patent application Ser. No. 15/410,644, filed on Jan. 19, 2017, entitled "Visibility Packets," by Matthews, et al., the entire contents of which are hereby incorporated by reference for all purposes as if fully set forth herein.

This application is related to U.S. patent application Ser. No. 15/410,651, filed on Jan. 19, 2017, entitled "Programmable Visibility Engines," by Matthews, et al., the entire contents of which are hereby incorporated by reference for all purposes as if fully set forth herein.

TECHNICAL FIELD

Embodiments relate generally to computer networking, and, more specifically, to techniques for improving network performance based on network state information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network or data network is a set of computing components interconnected by communication links. Each computing component may be a separate computing device, such as, without limitation, a hub, switch, bridge, router, server, gateway, or personal computer, or a component thereof. Each computing component is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocol, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes or "hops." The node may identify these paths in a variety of manners. For instance, the paths may be specified to the node in advance, and/or the node may identify the paths by analyzing a topological map, such as the node may build over time through observations of certain types of messages from other nodes in the network.

Each path is mapped to one or more destination nodes. For instance, a path may be mapped to a grouping of nodes known as a subnet, wherein all nodes in the grouping share a certain address prefix. Or a path may be mapped to individual destination nodes. Each path is further associated with an outbound port of the node, through which messages routed through the path are sent out. Hence, a path may be viewed in one sense as a mapping of one or more destination nodes to a specific outbound port of a node.

In complex networks, there may be any number of different paths between two nodes. Some of these paths may include different nodes, while other paths may include the same nodes but involve at least some different ports and/or communication links between those nodes. In some systems, a node may also consider certain internal components within the node to be part of a path (e.g. a specific component intended to post-process a message, take traffic control actions with respect to a message, or mark a message with a special label or flag). The existence of multiple paths between two nodes may necessitate techniques for a node to select which path to send a message through in order to reach the other node.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 5 is a time diagram illustrating the movement of a packet through a network over time, as the packet is annotated and reflected;

DETAILED DESCRIPTION

Figure 1:
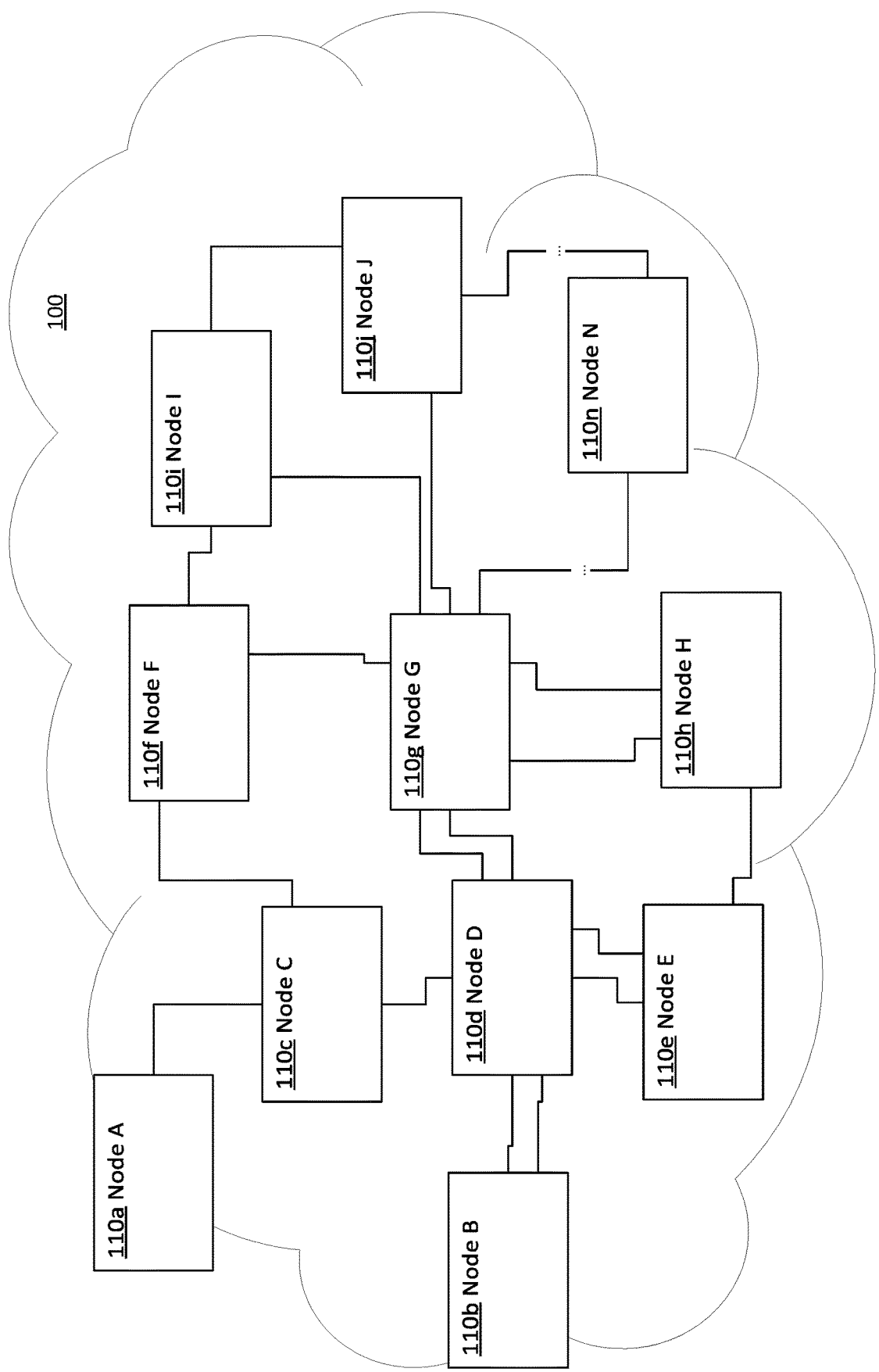
FIG. 1 is an illustrative view of various aspects of an example networking system, in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Network Messages
2.2. Network Paths
2.3. Network Device
2.4. Ports
2.5. Traffic Management
2.6. Forwarding Logic
2.7. Performance Monitoring Subsystems
2.8. Path Selection and Management
2.9. Miscellaneous
3.0. Collecting State Information through Reflected Packets
3.1. Illustrative Network
3.2. Probing
3.3. Annotation
3.4. Determining When to Reflect a Packet
3.5. Reflecting the Packet
3.6. Handling a Reflected Packet at Intermediate Hops
3.7. Reflecting Packets Within Tunnels
3.8. Collection
3.9. Instructions Not to Reflect
3.10. Device Logic
3.11. Miscellaneous
4.0. Dynamic Weighted Cost Multipathing
4.1. General Flow
4.2. Multipath Forwarding Implementation Example
4.3. Adjusting Weights
4.4. Packet Reordering
4.5. Miscellaneous
5.0. Visibility Packets
5.1. Transforming Packets into Special Visibility Packets
5.2. Visibility Tags
5.3. Visibility Queue
5.4. Healing Engine
5.5. Example Process Flows
6.0. Programmable Visibility Engines
6.1. Example PVE Architecture
6.2. Example PVE Process Flow
6.3. PVE Functions
6.4. PVE Inputs
6.5. PVE Outputs
6.6. PVE Actions
6.7. Multi-Layer PVEs
6.8. Implementing WRED with PVEs
6.9. Implementing Heatmaps with PVEs
7.0. Example Embodiments
8.0. Implementation Mechanism—Hardware Overview
9.0. Extensions and Alternatives 1.0. General Overview Approaches, techniques, and mechanisms are disclosed for improving performance of a network based on state information. According to an embodiment, nodes within a network are configured to adapt to changing path states, due to congestion (e.g. from long-lived data flows and/or other issues), node failures, and other factors. In an embodiment, the foregoing is enabled by, among other aspects, detecting path state changes and reporting the changes back to a source using messages capable of traversing a routable network. In an embodiment, the foregoing may involve, for example, collecting information about node and/or path state from other nodes in the network using reflected packets.

In an embodiment, a node may selectively convey path information and/or other state information to another node by annotating the information into packets it receives from the other node. A node may furthermore selectively reflect these annotated packets back to the other node, or these annotated packets may be reflected by yet other nodes that subsequently receive these packets. In various embodiments, this reflection may be performed by any node through which a packet is routed, regardless of whether the reflecting node is the final destination of the packet, and even if the reflecting node is in the middle of a tunnel. The information to be conveyed may be inserted into the original packet, and the original packet may then itself be reflected back to the source node. Or, the reflecting node may transparently duplicate the original packet, insert the information into the duplicate packet, and reflect the duplicate packet back to the source node while the original packet continues on to its next hop, assuming the reflecting node is not the destination of the packet.

The packet into which the reflecting node inserts the information, whether the original packet or a duplicate, is referred to herein as a "reflected packet." Using these reflected packets, state and other information may be conveyed over routable networks with varying levels of hierarchy. Moreover, nodes within the network may take various actions, such as changing routes, adjusting traffic flows, and so forth, based on the information collected from reflected packets.

According to an embodiment, a weighted cost multipathing selection technique is improved by dynamically adjusting the weights of the paths in response to feedback indicating the current state of the network topology. Such feedback may be collected, for instance, using probing and collection processes at some or all of the nodes within the network. The feedback indicates the current state of one or more paths, such as current congestion amounts, path faults, and so forth. As the path states change over time, the weights may also change. Both the gathering of feedback and dynamic adjustment may be automated using logic implemented by computing hardware at the nodes, thus allowing the techniques to scale to any arbitrary number of network nodes and paths.

In an embodiment, collected state information may be returned to and consumed by a path management process at the source node, at any other node between a reflecting node and the source node, and/or at another node designated as a collection point. The path management process analyzes the state information and assigns new weights to any relevant path(s) based on the analysis. For instance, a multipath forwarding table may be updated such that the number of entries for a more congested path is decreased at the same time the number of entries for a less congested path is increased.

According to an embodiment, a switch or other network node is configured to transform certain packets or other data units that would have been dropped into "special visibility" packets (or other data units). Similarly, in an embodiment, any data unit that is impacted in an unexpected manner (e.g. inflated latency) may also be transformed into a special visibility packet. The transformation may, in some cases, including duplicating the original packet and transforming the duplicate packet into a special visibility packet instead of the original.

Special visibility packets, or simply "visibility packets," may be used for a number of different purposes, depending on the embodiment. For instance, visibility packets may be stored for some period of time in a repository, where they may be viewed and/or analyzed through external processes. As another example, certain types of special visibility packets may be utilized by network reconfiguration logic for determining when and/or how to correct problems associated with those types of special visibility packets.

According to an embodiment, a computing construct referred to as a Programmable Visibility Engine ("PVE") is provided. The PVE receives instructions to execute one or more functions from a defined set of functions supported by the PVE. The PVE may be, for instance, a software-based engine executed by one or more general purpose processors within the node, or specialized hardware such as a special-purpose processor, FPGA, or ASIC (or a set of logic contained therein). By instructing the PVE, or a series of PVEs, to perform various functions, a customer may easily customize the capabilities of a switch or other device to support calculation and collection of arbitrary metrics, and performance of various actions in response to custom triggers.

In an embodiment, a node may have a fixed number of PVEs. These PVEs may be tied to input data from predefined areas of memories, or dynamically linked by the user to input data from different areas of memory. In other embodiments, a user may dynamically instantiate a number of PVEs within a node, and link those PVEs to desired areas of memory.

In other aspects, the inventive subject matter encompasses computer apparatuses and computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented using application-specific integrated circuits (ASICs) or field programmable gate arrays (FPGAs). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Network Messages

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment) to a second node 110 over a path that includes an intermediate node 110. This data unit 110 will be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g. packets or frames) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the node may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the message, a label to attach the message, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, in which context the described techniques have particular advantages. It will be recognized, however, that these techniques may also be applied to realize advantages in routing other types of data units conforming to other protocols and/or at other communication layers within a network. Thus, unless otherwise stated or apparent, the term "packet" as used herein should be understood to refer to any type of data structure communicated across a network, including packets as well as segments, cells, data frames, datagrams, and so forth.

2.2. Network Paths

Any node in the depicted network 100 may communicate with any other node in the network 100 by sending messages through a series of nodes 110 and links, referred to as a path. For example, Node B (110b) may send packets to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g. which egress port it should send the packet out on). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110. In this manner, the actual path of a packet is product of each node 110 along the path making routing decisions about how best to move the packet along to the destination node 110 identified by the packet.

In an embodiment, a node 110 may be configured to exercise greater control over a path. The node 10 may, for instance, be configured to include data within the packet that indicates, by a label or identifier, some aspect of the path that should be selected for the path. Other nodes 110 are configured to honor this information. Or, a node 110 may be configured to encapsulate a packet in a tunnel between two nodes. The packet is wrapped with a tunnel header that specifies a different destination than the destination of the packet. The packet is first directed to this tunnel destination, at which point the tunnel header is removed, and the packet continues on to the originally specified destination.

Moreover, there may be more than one link between two nodes 110. For instance, there is more than one link between Node B and Node D. Each different link between two nodes 110 may be considered a different path between those two nodes 110.

Some of the paths between two nodes 110 are clearly not optimal. For instance, a path that from Node B to Node D to Node C to Node F to Node I to Node J to Node N to Node G to Node H is likely less optimal than any of the paths mentioned thus far. A node may thus be configured not to make routing decisions that would select such paths. On the other hand, many other paths may be equally optimal, depending on the state of the network 100. To optimize use of network 100, nodes 110 may be configured to distribute, or "load-balance," traffic between a number of paths so as to reduce congestion at any one node or along any one path. This distribution may be equal, or weighted. Moreover, in accordance with some embodiments, the distribution may change over time in accordance with changes in the state of nodes 110 and/or paths.

In some embodiments, some or all of nodes 110 may be configured to contribute to various processes for collecting state information associated with nodes 110 and/or paths. Some or all of nodes 110 may be configured, for example, to selectively annotate packets with state information as they traverse the network 100. Some or all of nodes 110 may also or instead be configured to selectively reflect certain annotated packets back down a path, in reverse of the direction they were sent, to provide upstream feedback regarding the states of nodes 110 and/or paths. Some or all of nodes 110 may also or instead be configured to collect state information from such annotated packets. Some or all of nodes 110 may also or instead be configured to change various aspects of network 100 based on collected information, such as changing traffic flow control policies, rerouting traffic, rebooting nodes 110, and so forth. Specific examples of these processes are described subsequently.

2.3. Network Device

Figure 2:
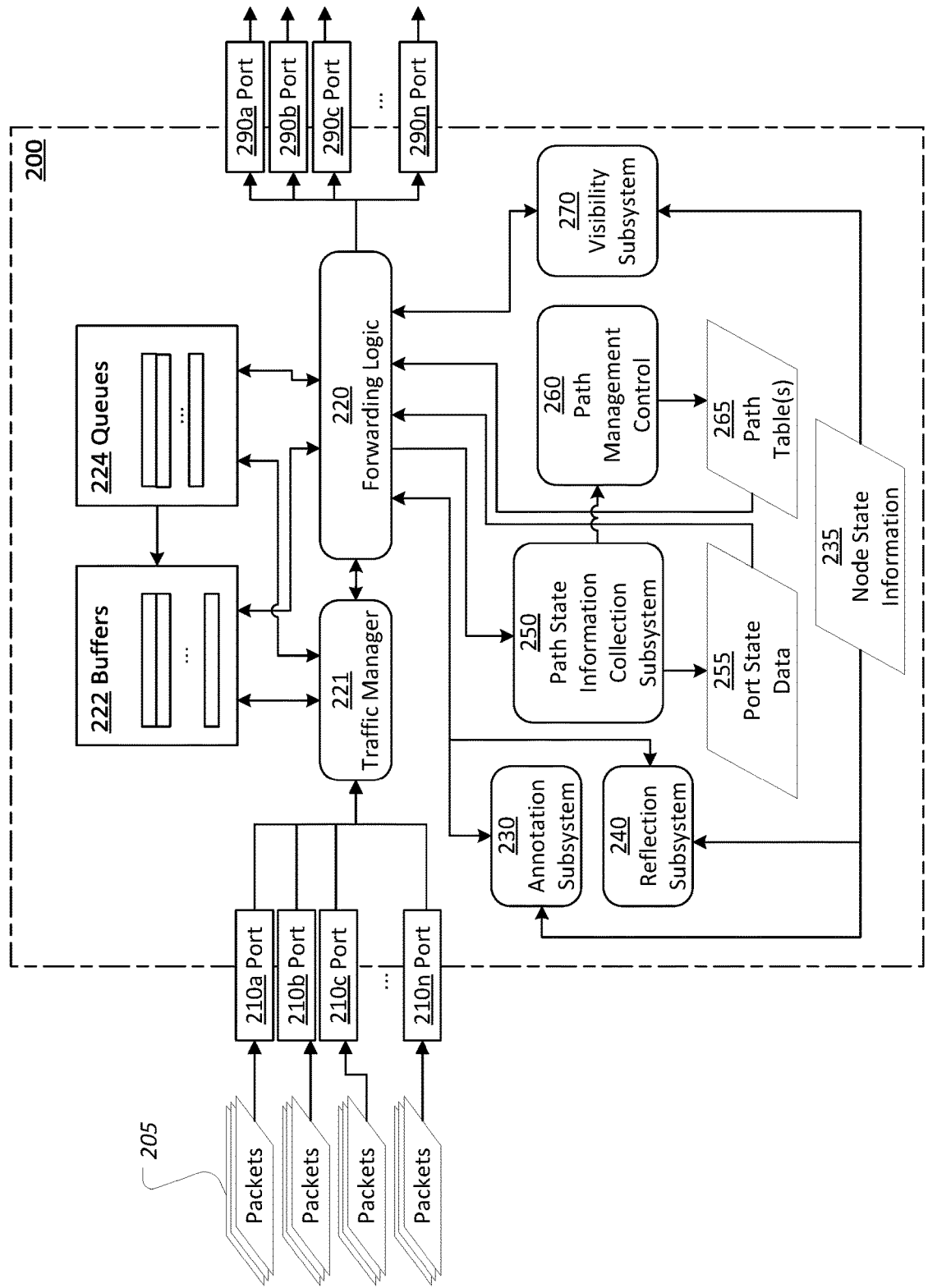
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. Note that, in an embodiment, some or all of the nodes 110 in system 100 may each be a separate network device 200.

2.4. Ports

Network device 200 includes ports 210/290. Ports 210, including ports 210a-n, are inbound ("ingress") ports by which data units referred to herein as packets 205 are received over a network, such as network 110. Ports 290, including ports 290a-n, are outbound ("egress") ports by which at least some of the packets 205 are sent out to other destinations within the network, after having been processed by the network device 200.

Ports 210/290 are depicted as separate ports for illustrative purposes, but may actually correspond to the same physical hardware ports on the network device 210. That is, a network device 200 may both receive packets 205 and send packets 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single ingress port 210 or egress port 290 into multiple ingress ports 210 or egress ports 290, or aggregate multiple ingress ports 210 or multiple egress ports 290 into a single ingress port 210 or egress port 290. Hence, in various embodiments, ports 210 and 290 should be understood as distinct logical constructs that are mapped to physical ports rather than simply as distinct physical constructs.

2.5. Traffic Management

Since not all packets 205 received by the device 200 can be processed by the packet processor(s) 250 at the same time, a traffic manager 221 of device 200 may store packets 205 in temporary memory structures referred to as buffers 222 while the packets 205 are waiting to be processed. For example, the device's forwarding logic 220 may only be capable of processing a certain number of packets 205, or portions of packets 205, in a given clock cycle, meaning that other packets 205, or portions of packets 205, must either be ignored (i.e. dropped) or stored. At any given time, a large number of packets 205 may be stored in the buffers 222 of the device 200, depending on network traffic conditions.

A buffer 222 may be a portion of any type of memory, including volatile memory and/or non-volatile memory. Device 200 includes a buffer manager configured to manage use of buffers 222 by device 200. Among other processing tasks, the buffer manager may, for example, allocate and deallocate specific segments of memory for buffers 222, create and delete buffers 222 within that memory, identify available buffer(s) 222 in which to store a newly received packet 205, maintain a mapping of buffers 222 to packets 205 stored in those buffers 222 (e.g. by a packet sequence number assigned to each packet 205 as the packet 205 is received), mark a buffer 222 as available when a packet 205 stored in that buffer 222 is dropped or sent from the device 200, determine when to drop a packet 205 instead of storing the packet 205 in a buffer 222, and so forth.

A packet 205, and the buffer(s) 222 in which it is stored, is said to belong to a construct referred to as a queue 224. A queue 224 may be a distinct, continuous portion of the memory in which buffers 222 are stored. Or, a queue 224 may instead be a set of linked memory locations (e.g. linked buffers 222). In some embodiments, the number of buffers 222 assigned to a given queue 224 at a given time may be limited, either globally or on a per-queue basis, and this limit may change over time.

The forwarding logic 220 of device 200 may process a packet 205 over one or more stages. A node may have many queues 224, and each stage of processing may utilize one or more of the queues 224 to regulate which packet 205 is processed at which time. To this end, a queue 224 arranges its constituent packets 205 in a sequence, such that each packet 205 corresponds to a different node in an ordered series of nodes. The sequence in which the queue 224 arranges its constituent packets 205 generally corresponds to the sequence in which the packets 205 in the queue 224 will be processed.

The traffic manager 221 is a component that manages the use of buffers 222 to store packets 205 (or copies thereof), assigns buffers 222 to queues 224, and manages the flow of packets 205 through the queues 224. The traffic manager 221 may, for instance, determine when to "dequeue" packets 205 from queues 224 and provide those packets 205 to specific packet processor(s) of forwarding logic 220. The traffic manager 221 may further identify a specific queue 224 to assign a packet 205 to.

2.6. Forwarding Logic

A device 200 comprises one or more packet processing components that collectively implement forwarding logic 220 by which the device 200 is configured to determine how to handle each packet the device 200 receives. Forwarding logic 220, or portions thereof, may, in some instances, be hard-coded. For instance, specific hardware or software within the node may be configured to always react to certain types of data units in certain circumstances in a certain way. Forwarding logic 220, or portions thereof, may also be configurable, in that the logic 220 changes over time in response to data collected from or instructions received from other nodes in the network in which the device 200 is located.

For example, a device 200 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For example, such attributes or characteristics may include a Quality-of-Service level specified by the data unit or associated with another characteristic of the data unit, a flow control group, an ingress port 210 through which the data unit was received, a tag or label in the packet's header, a source address, destination address, packet type, or any other suitable distinguishing property.

In an embodiment, forwarding logic 220 may read port state data 255. Port state data 255 may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic 220 may be configured to implement the associated rules or policies associated with the flow(s) to which a given packet belongs.

Forwarding logic 220 may process a data unit over multiple stages. At each stage, the data unit is placed in a buffer 222, which is said to belong to a queue 224. A device 200 may have many queues 224, and each stage of processing may utilize one or more of the queues 224. At any given processing stage, one or more packet processing components, such as a Field Programmable Gate Array (FPGA), Application-Specific Integrated Circuit (ASIC), or a general purpose processor executing software-based instructions, reads data units from associated queues 224 and determines how to handle the data units.

In an embodiment, different queues 224 may exist for different destinations. For example, each port 210 and/or port 290 may have its own set of queues 224. The queue 224 to which an incoming packet 205 is assigned may therefore be selected based on the port 210 through which it was received, while the queue 224 to which an outgoing packet is assigned may be selected based on forwarding information indicating which port 290 the packet should depart from. A different packet processor may be associated with each different set of one or more queues 224. Hence, the current processing context of the packet 205 may be used to select which queue 224 a packet 205 should be assigned to.

In an embodiment, there may also or instead be different queues 224 for different flows or sets of flows. That is, each identifiable traffic flow or group of traffic flows is assigned its own set of queues 224 to which its packets 205 are respectively assigned. In an embodiment, different queues 224 may correspond to different classes of traffic or quality-of-service (QoS) levels. Different queues 224 may also or instead exist for any other suitable distinguishing property of the packets 205, such as source address, destination address, packet type, and so forth.

For instance, a data unit may be forwarded to another queue 224 associated with another processing stage implemented by another set of processing components, sent out of the device 200 over an outbound port 290, discarded, delayed for flow control reasons, and so forth. The collective actions of these processing components over these multiple stages is said to implement the forwarding logic of the device 200.

An example flow of a packet 205 through device 200 is as follows. The packet 205 may be received by a port 210. The packet 205 is then processed by an initial packet processor (in some embodiments known as a packet pre-processor), and then delivered to a traffic manager 221. Traffic manager 221 stores the packet 205 in a buffer 222 and assigns the packet 205 to a queue 224. Traffic manager 221 manages the flow of the packet 205 through the queue 224 until the packet 205 is released to another packet processor. Depending on the processing, the traffic manager 221 may then assigned the packet 205 to another queue so that it may be processed by yet another processor, or the packet processor may send the packet 205 out another port 290.

In the course of processing a packet 205, a device 200 may replicate a packet 205 one or more times. For example, a packet 205 may be replicated for purposes such as multicasting, mirroring, debugging, and so forth. Thus, a single packet 205 may be replicated to multiple queues 224. Hence, though certain techniques described herein may refer to the original packet 205 that was received by the device 200, it will be understood that those techniques will equally apply to copies of the packet 205 that have been generated for various purposes.

Dropping Data Units

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

Many devices in networks with complex topologies, such as switches in modern data centers, provide limited visibility into drops and other issues that can occur inside the devices. Such devices can often drop messages, such as packets, cells, or other data units, without providing sufficient information to determine why the messages were dropped.

For instance, it is common for certain types of nodes, such as switches, to be susceptible to "silent packet drops," where data units are dropped without being reported by the switch at all. Another common problem is known as a "silent black hole," where a node is unable to forward a data unit due to a lack of valid routing instructions at the node, such as errors or corruption in forwarding table entries. Another common problem is message drops or routing errors due to bugs in particular protocols.

Beyond dropping data units, a variety of other low visibility issues may arise in a node, such as inflated latency. Inflated latency refers to instances where the delay in transmission of a data unit exceeds some user expectation of target threshold.

2.7. Performance Monitoring Subsystems

According to an embodiment, a device 200 may comprise any of a variety of subsystems configured to facilitate various aspects of monitoring the performance of a network, such as an annotation subsystem 230, reflection subsystem 240, path state information subsystem 250, and visibility subsystem 270.

Annotation subsystem 230 interfaces with forwarding logic 220 and/or traffic manager 221 to identify when to annotate packets with state information (e.g. using annotation criteria) and insert the state information into the identified packets. The annotated state information may include, for example, node state information 235 already stored at the device 200 due to the operation of other component(s) (not depicted) and/or node state information 235 generated by components within device 200. Node state information 235 may also, in some embodiments, impact when the device 210 chooses to annotate a packet (e.g. triggered by a congestion level or amount of delay). Suitable selective annotation techniques for annotation subsystem 230 are described elsewhere herein.

Reflection subsystem 240 interfaces with forwarding logic 220 and/or traffic manager 221 to identify when to reflect packets back along the path from whence the packets came (e.g. using reflection criteria), and interfaces with forwarding logic 220 to take appropriate actions to actually reflect packets identified for reflection. Node state information 235 may, in some embodiments, impact when the device 210 chooses to reflect a packet (e.g. triggered by a congestion level or amount of delay). Suitable selective reflection techniques for reflection subsystem 240 are described elsewhere herein.

Path state information subsystem 250 interfaces with forwarding logic 220 to identify when to collect information from packets that have been marked as reflected (i.e. by other nodes of the network in which device 200 resides), when to generate and store metrics based on annotated information therein, and optionally when to take one or more actions based thereon. Suitable information collection techniques for subsystem 250 are described elsewhere herein In an embodiment, the forwarding logic 220 may be configured such that certain packets that would have been dropped by the forwarding logic 220 or traffic manager 221, and/or certain related packets, are instead processed by a visibility subsystem 270 that transforms the packets into special visibility packets. Conceptually, the packets to be transformed may be viewed as being forwarded to a visibility path instead of the normal path to which they otherwise would have been forwarded. The visibility component 270 analyzes the visibility packets and optionally generates logs or reports based thereon. In this manner, the device 200 provides insight into drops or other events. The visibility subsystem 270 may further react to certain visibility packets, or trends based thereon, by changing the configuration of device 200 or by sending messages to other nodes in a network.

2.8. Path Selection and Management

A variety of path selection techniques exist for forwarding logic 220 to select a path for a packet. One of the most common of these techniques assigns weights to each path. The weights are intended to quantify some aspect of the path such as the total number of hops in the path and/or the speed or length of the path. Generally, the technique involves selecting a "shortest path" based on routing metrics, representing costs that are generally computed at least in part on these weights. The selected path typically (but not necessarily) corresponds to the path with the lowest cost. Though there are many varieties of algorithms for identifying path cost, one example type of algorithm is known as a "shortest path" algorithm. This algorithm, may, for example, be employed to identify and calculate the costs for all paths within a network topology, based on individual weights assigned to the nodes and links (also known as "edges") within that topology.

A number of issues may arise when assigning a path for a destination. For instance, many techniques may not consider the state of a path when performing path assignment. That is, assignments are made with no device and/or network state input. Path selection may also occur without considering alternate paths, which may not happen to be topological shortest paths, but may nonetheless be better suited to handle traffic due to current network conditions. Moreover, "shortest path" algorithms tend not to provide an intelligent mechanism for selecting a path when multiple paths are deemed "shortest."

Complex network topologies, such as those found in data centers having thousands or even millions of nodes, employ multiple paths among servers to deliver scalable, cost-effective network capacity. To more efficiently route traffic through a network, the forwarding logic 220 at some or all of the nodes in the network may include a load-balancing component configured to distribute traffic to the same destination across multiple paths. The simplest and the most widely deployed approach for load balancing among these paths, Equal Cost Multipath (ECMP), divides flows among the shortest paths toward a destination. ECMP is designed to utilize an ideally uniform hashing of balanced flow sizes to achieve fairness and good load balancing between paths.

However, ECMP assumes a balanced, regular, and fault-free topology, which is often an invalid assumptions in practice that can lead to substantial performance degradation and, worse, variation in flow bandwidths even for same size flows. This is particularly true where the topology is complex, such as in a data center.

Alternatively, a Weighted Cost Multipath (WCMP) approach is often used to balance traffic in such network topologies. WCMP is described in detail in J. Zhou, M. Tewari, M. Zhu, A. Kabbani, L. Poutievski, A. Singh, and A. Vandat, WCMP: weighted cost multipathing for improved fairness in data centers. New York, N.Y., USA: ACM, 2014, pp. 5-14, the entire contents of which is incorporated by reference for all purposes as if set forth herein. Generally, WCMP assigns weights to paths and distributes traffic to the paths roughly in proportion to their assigned weights. Note that these weights correspond to the relative frequency of assignment of packets to a path, and are therefore not to be confused with the weights that are used to calculate the cost of a path. The weights themselves may be determined in a variety of manners. For instance, Zhou et al. assigns each port a weight roughly proportional to the capacity of each port.

Unfortunately, a traditional WCMP approach is not optimal in certain contexts. For instance, among other weaknesses, traditional selection mechanisms, including hash-based selection mechanisms, do not consider path state when binding flows to paths, and are thus unable to react adequately to path congestion, path faults, and so forth.

In an embodiment, some of all of these problems are addressed by using dynamic weights in conjunction with the WCMP approach. A path management control subsystem 265 in device 200 is configured to analyze path state information, such as may be collected by subsystem 250 or forwarded from another node, and determine when network conditions warrant adjusting path weights. Alternatively, an external path management control subsystem 265 may send instructions to device 200 to adjust path weights.

In an embodiment, some or all of the foregoing techniques may be implemented using one or more path tables 265 that map destination addresses, subnets, or other components to paths through a network. In an embodiment with dynamic weights, a path management controller 260 adjusts weights by changing the number of entries assigned to a given path in a path table 265. In other embodiments, a state information collection subsystem 250 may be configured to adjust paths in a path table 265 to route traffic around congested links or nodes in a network, or towards favored links or nodes. In yet other embodiment, other suitable data structures may instead be utilized for path selection.

Additional example details of dynamic path management techniques are described elsewhere herein.

2.9. Miscellaneous

Device 200 illustrates only one of many possible arrangements of components configured to provide the functionality described herein. Other arrangements may include fewer, additional, or different components, and the division of work between the components may vary depending on the arrangement. For example, in some embodiments, subsystems 260 and/or 270 may be omitted, along with any other components relied upon exclusively by the omitted component(s).

As another example, in an embodiment, system 100 may include devices 200 with different combinations of subsystems 230, 240, and 250. For instance, some devices 200 may include only annotation subsystem 230, other devices 200 may further include a reflection subsystem 240, other devices may include only a path state information collection subsystem 250, and yet other devices may include none of these subsystems.

3.0. Collecting State Information Through Reflected Packets

As described in other sections, information about the state of various nodes and/or paths within a network may be collected through a mechanism referred to herein as reflected packets. Generally, a packet is annotated with state information at one or more nodes along a path along which it is travelling, and then reflected back towards its source. Further illustrative details of various embodiments featuring reflected packets are now described.

Figure 3:
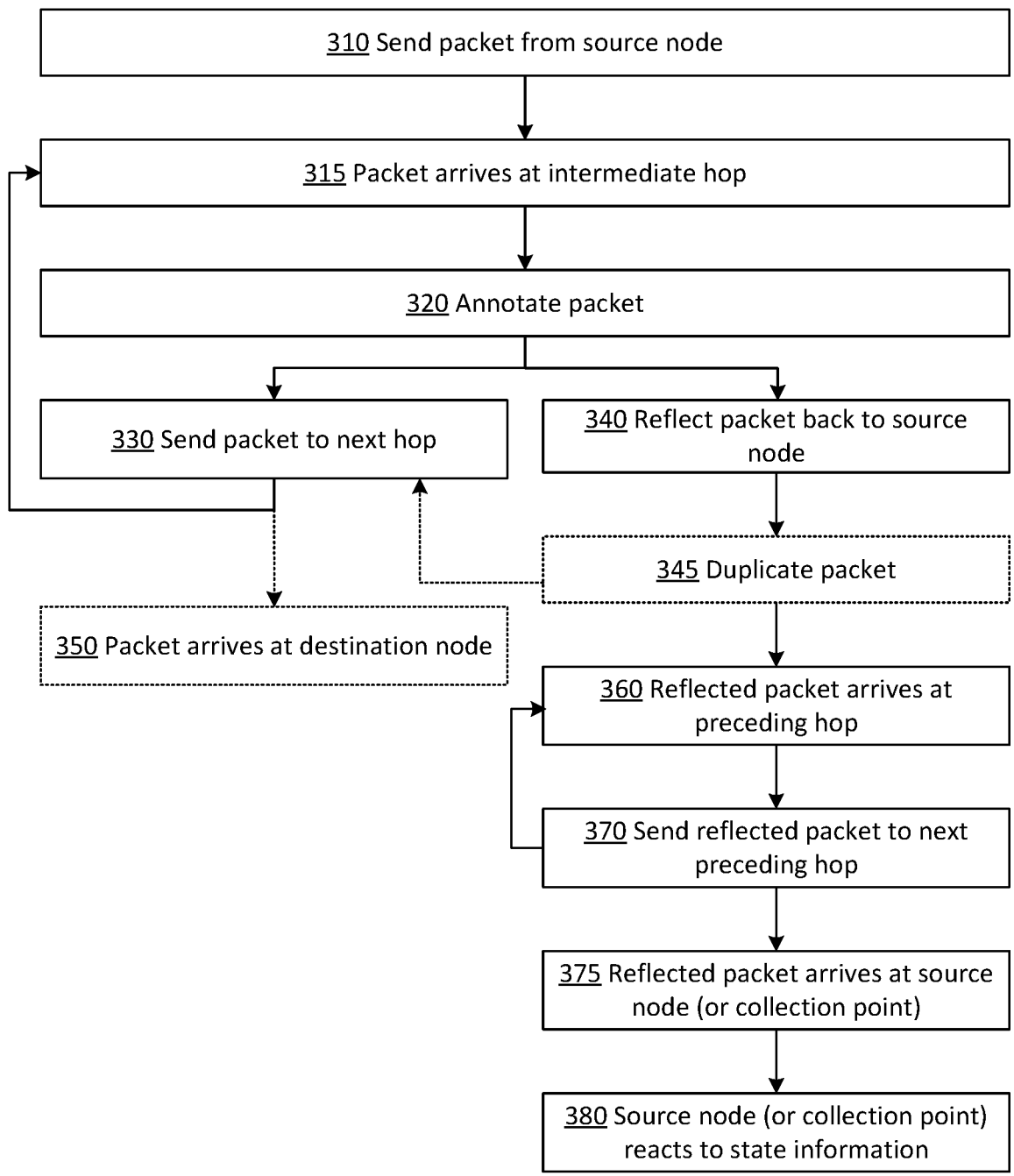
FIG. 3 illustrates an example flow for reflecting packets.

FIG. 3 illustrates an example flow 300 for reflecting packets, according to an embodiment. The various elements of flow 300 may be performed in a variety of systems, including systems such as system 100 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 310 comprises sending a packet, such as a packet 205, from a source node. The packet is addressed to a destination node. The packet is sent out of a port of the source node that corresponds to one of a plurality of possible paths to the destination node. In an embodiment, the packet may be a designated probe packet that the source node generates specifically to collect information about the path. In other embodiments, the packet is a normal packet generated by the source node or relayed by the source node for reasons entirely separate from collecting information about the path.

Block 315 comprises the packet arriving at an intermediate hop along the path from the source node to the destination node. The intermediate hop may be the node at which the packet arrives immediately after being sent from the source node, or the packet may traverse any number of nodes in the path before arriving at the intermediate hop of block 315.

Block 320 comprises the intermediate hop annotating the packet with state information, using processes as described elsewhere herein. In an embodiment in which the packet is a probe packet, the intermediate hop may be configured to annotate any packet designated as a probe packet. In an embodiment where the packet is a normal packet, the intermediate hop may select to annotate the packet based on annotation criteria. The annotation criteria may be based on certain characteristics of the packet (e.g. as determined from the packet header) and/or based on the state of intermediate hop itself (e.g. if the intermediate hop is congested). The annotation criteria may further include a random, pseudo-random, or sampling element, so not all packets that have the same characteristics are annotated. As another example, an intermediate hop may be configured to annotate any packet that already contains annotated information. Further criteria for selecting when to annotate a packet are described elsewhere herein.

In general, annotation is an optional aspect on a per-hop basis, such that not all intermediate hops will annotate each packet. However, in an embodiment, it is likely that a packet will be annotated at a node at which the packet is reflected.

From block 320, flow 300 may proceed to block 330, in which the packet is sent to a next hop. Flow 300 may then loop back to block 315, and the packet may be further annotated as it travels along the path.

Alternatively, or additionally, flow 300 may proceed from block 320 to block 340. At block 340, the intermediate hop determines to reflect the packet back towards the source node. Criteria for determining when to reflect a packet may be similar in nature to annotation criteria, and are further described elsewhere herein.

In some instances, reflection may involve duplicating the packet in a block 345. Either the original packet or the duplicate packet becomes the reflected packet, while the other of the two packets is sent to the next hop via block 330, so as to continue along the path and eventually arrive at the destination node in block 350. Optionally, the continuing packet may be marked in such a manner that it will not be reflected again as it continues along the path, and/or its annotated data may be removed. In other instances, such as if the packet is a probe packet, if the reflecting node is the destination node, and/or if the reflecting node determines that continued forwarding of the packet is no longer desirable, no duplication of the packet is needed.

The reflected packet is generally reflected by, among other steps, changing its destination to be that of the source node, or a collection point associated with the source node. The destination specified by the payload header may be manipulated directly, or a new header may be added to the packet (e.g. a tunnel header) that specifies the source node or collection point as the destination of the packet. Further explanation of the reflection process is described elsewhere herein.

Block 360 comprises the reflected packet arriving at a preceding hop along the path. Optionally, the reflecting node may have marked the reflected packet as being a reflected packet, and the preceding hop may accordingly treat the reflected packet in a special manner, as described elsewhere herein. The preceding hop then sends the packet to the next preceding hop in block 370, and the packet continues traversing along the original path in reverse until it arrives at the source node or a collection point in block 375, as described elsewhere herein.

For illustrative purposes, the term "preceding hop" is used to describe each node in the reverse path taken by the reflected packet. However, the term should not be interpreted to require that a node (other than the reflecting node or, as described elsewhere, the end of a tunnel) modify its forwarding logic to send the reflected packet to a "preceding" hop rather than to a "next" hop. Rather, since the reflecting node changes the destination address of the reflected packet, the reflected packet may be forwarded back to the source node using standard forwarding logic, and each "next preceding hop" is in reality simply the next hop in the path from the reflecting node to the source node.

Moreover, in some embodiments, the reverse path that a reflected packet takes need not exactly mirror the original path that the packet took from the source node to the reflecting node. That is, since each node may be configured to make its own routing decisions, packets travelling between two nodes may on occasions travel through different sets of nodes depending on the direction in which they are travelling and/or on a variety of other factors. Hence, the reflecting packet may travel through different nodes than the original packet.

In an embodiment, to reduce or eliminate this behavior, forwarding logic for reflected packets may be configured to try to replicate the reverse path using the annotated information within the packet and/or labels or identifiers within the packet. For instance, if a reflecting node is aware of one or more nodes that the packet traveled through, the reflecting node might first tunnel the packet to the most recently traversed one of these nodes to try to best replicate the reverse path. Similarly, that node may then tunnel the packet to the next known node in the list, and so forth.

At block 380, the source node, or any other collection point, reacts to the state information. Any node along the reverse path may function as a collection point. Moreover, in an embodiment, there may be multiple collection points, as an intercepting node in the reverse path that functions as a collection point may also be configured to continue forwarding the reflected packet back towards the source node.

In general, a collection point reacts to the state information by re-calculating certain performance metrics associated with paths or nodes within the network and/or reconfiguring one or more nodes in the network based on the state information or metrics. Specific examples of such actions are described elsewhere herein.

Flow 300 illustrates only one of many possible flows for collecting state information through reflected packets. Other flows may include fewer, additional, or different elements, in varying arrangements. For example, in some embodiments, blocks 345 and 350 may be omitted, along with any other elements relied upon exclusively by the omitted element(s).

As another example, in an embodiment, a flow may alternatively involve annotating reflected packets with state information from the nodes through which the reflected packet traverses. For instance, in such embodiments, a packet may be annotated with only reduced information, or at a reduced frequency, to limit the transmission requirements for reflected packets information, as the packet travels along its original path. When the decision is made to reflect the packet, the nodes in the reverse path may therefore be configured to supplement this information by annotating further information about the path state as the reflected packet travels in reverse. Or, the decision to annotate a packet may only be made once it is determined to reflect the packet. Then, each node in the reverse path, seeing that the packet is marked as reflected, would further annotate the packet.

3.1. Illustrative Network

FIG. 5 is a time diagram 500 illustrating the movement of a packet through a network over times t0-t5, as the packet is annotated and reflected, according to an embodiment. Times t0-t5 do not necessarily correspond to equal intervals of time.

At t0, packet 505 departs a Node A (510) for a Node B (511). Node A may be the original sender of packet 505, or packet 505 may have been relayed through Node A. Node B is an intermediate hop on a path between Node A and Node N (520), which is the destination address of packet 505. For simplification, other nodes in the path are not depicted. These additional nodes may optionally include one or more undepicted nodes between Node A and Node B.

At t1, packet 505 has been annotated by Node B by to include state information 506. The annotation may include adding additional information to packet 505 and/or updating the information in packet 505. Node B is now relaying packet 505 to Node C (512), which is another intermediate hop on the path to Node N. Again, there may optionally be one or more undepicted nodes between Node B and Node C.

At t2, packet 505 has been annotated by Node C by to further include state information 507. Node C is now relaying packet 505 to Node D (513), which is another intermediate hop on the path to Node N. Again, there may optionally be one or more undepicted nodes between Node C and Node D.

At t3, packet 505 is departing a Node F (514) for a Node G (515), both of which are other nodes along the path from Node A to Node N. As depicted, packet 505 still contains annotations 506 and 507, but does not contain additional annotations. This may be, for example, because Nodes D, F, and any other intervening nodes, either do not include an annotation subsystem, or did not determine packet 505 to meet their respective annotation criteria.

At t4, packet 505 has been reflected by a Node H (516) back to Node G. Prior to reflection, Node H annotates packet 505 with state information 508, by way of adding to and/or updating annotations 506 and 507. Optionally, Node H may duplicate packet 505 and also forward the duplicate copy on to Node N. In an embodiment, this duplicated copy may or may not include annotations 506-508.

At t5, packet 505 has been forwarded on through Nodes F-C, and is now departing Node B for Node A. Packet 505 continues to include annotations 506-508, which may be analyzed by Node A for a variety of purposes explained in other sections.

FIG. 5 illustrates but one example of how a packet may move through a network that implements techniques described herein. Other packets may take different routes, be reflected at different nodes, be annotated in different manners, and/or be collected by different nodes. Furthermore, in other embodiments, a network may have other arrangements of nodes, necessitating other routes of potentially different lengths.

3.2. Probing

A source node within the network, such as a server or a device, may initiate generation of path state information by sending designated probe messages (e.g. packets sent solely for the purpose of collecting state information) along certain paths. A probe message may be, for example, a packet that includes a special flag or other identifier in the packet header or payload. The payload may otherwise be empty, or the payload may contain instructions, metrics, path information, or other useful information. Some or all of the nodes along the path may recognize the packet as being a probe packet, as it is sent or as it is being returned, based on the flag or other identifier in the packet header, and, in response, annotate the probe message with state information. In an embodiment, annotation of a probe packet may further be conditioned on the packet and/or the node state meeting other annotation criteria.

Alternatively, or additionally, regular packets (i.e. packets sent as part of communications for purposes other than collecting state information) sent by the source node may be selectively annotated with state information by some or all of the nodes in a path. A source node may include a special flag or identifier within a field in the packet's header, by which certain other nodes may identify the packet as a probe packet. Or, another node along the path may selectively treat a regular packet as a probe packet in response to various rules or triggers (e.g. randomly, based on the current congestion state of the node or path, based on the source address, and/or based on any other suitable factor), as described elsewhere. For convenience, a regular packet selected for this purpose may henceforth also be referred to as a probe packet.

One concern with using a regular packet as a probe packet may be exceeding a packet's maximum possible size (e.g. the MTU) when annotating path state information. Among other ways of addressing this problem, a node may be configured to only annotate packets when the annotations will not exceed the maximum possible packet size.

Eventually, the probe packet may arrive at a "reflecting node." The reflecting node may be specified by the probe packet (e.g. the destination node of the packet). Or, in some embodiments, a node may selectively determine that the node is a reflecting node based on various rules or triggers (e.g. randomly, based on the current congestion state of the node or path, based on the source address, and/or based on any other suitable factor). The reflecting node reflects the collected state information back to the source node or another designated node, either by copying the probe packet and redirecting it back to the source node, or by generating a new packet with the relevant information and returning it to the source node.

3.3. Annotation

As mentioned, some or all of the nodes in a path may annotate a packet that is recognized as a probe packet, or any other packet, with state information. A node configured to perform such annotation for a particular probe packet is referred to herein as an annotating node. In some embodiments, however, the node need not be an annotating node for all probe packets, or all packets annotated by the network, but rather may selectively annotate packets using logic conditioned upon any suitable factor(s).

State information may take a variety of forms and be generated in a variety of manners depending on the embodiment. For example, network metrics generated by any of a variety of frameworks at the node may be used as state information. An example of such a framework is the In-band Network Telemetry ("INT") framework described in C. Kim, P. Bhide, E. Doe, H. Holbrook, A. Ghanwani, D. Daly, M. Hira, and B. Davie, "Inband Network Telemetry (INT)," pp. 1-28, September 2015, the entire contents of which are incorporated by reference as if set forth in their entirety herein. Examples of state information may further include, without limitation, information generated by the traffic manager 221, such as queue size, drop counters, queue delay, etc., and/or port state information, such as RX/TX bytes, RX/TX utilization, flow control state, etc.

In an embodiment, some or all of the annotating nodes may report per-port loading state (for one or more ports), resulting in per-port loading states for multiple nodes in a path being reported in a single message. This may enable, for example, communication of device state to one or more endpoints in a rapid manner, allowing a more responsive control algorithm. Alternatively, or additionally, a one-way total delay metric may be calculated at some or all of the annotating nodes. This metric may measure the total delay along the path up to the annotating node. Nodes may communicate one-way delay at full resolution (with high degree of precision) or using a quantized metric. In an embodiment, a quantized metric may be a quantized variance from an expected average (in order to save bits). For example, supposing the delay is expected to be 50 microseconds for a given path and the observed delay is 55.6 microseconds. The quantized difference from the norm could be transmitted (i.e. 55−50=>185 microseconds, so 5 microseconds is communicated).

In an embodiment, the P4-INT metric "Egress Port TX Link Utilization," for instance, is an example of a suitable metric that may be utilized in certain embodiments to convey path state on a per-hop basis. An example of a congestion metric that may be accumulated along a path is described, without limitation, in M. Alizadeh, T. Edsall, S. Dharmapurikar, R. Vaidyanathan, K. Chu, A. Fingerhut, V. T. Lam, F. Matus, R. Pan, N. Yadav, T. Edsall, S. Dharmapurikar, R. Vaidyanathan, K. Chu, A. Fingerhut, V. T. Lam, F. Matus, R. Pan, N. Yadav, and G. Varghese, CONGA: distributed congestion-aware load balancing for datacenters, vol. 44, no. 4. ACM, 2015, pp. 503-514, the entire contents of which are incorporated by reference as if set forth in their entirety herein.

In other embodiments, enhanced metrics may be provided by custom logic at the nodes themselves. In one embodiment, the probe message is annotated to form a single message containing port loading state for many or all ports at each annotating node, thereby increasing the path state information collection process update rate. The port loading state may optionally be quantized. In at least one embodiment, the state information may be state information collected through processes such as described in U.S. application Ser. No. 14/958,830 (filed Dec. 3, 2015) and Ser. No. 14/973,541 (filed Dec. 17, 2015), the entire contents of both of which are hereby incorporated by reference as if set forth in their entirety herein. In an embodiment, the state information may be user-defined statistics collected through the use of programmable visualization engines.

The annotated state information may be placed within one or more annotation fields within the header or the payload. When the probe packet is a regular packet, it may be preferable to annotate the header, so as not to pollute the payload. If annotated state information is already found within the packet, the state information from the currently annotating node may be concatenated to or summed with the existing state information, depending on the embodiment. In the former case, for instance, each node may provide one or more current metrics, such as a congestion metric. In the latter case, for instance, each node may add the value of its congestion metric to that already in the packet, thus producing a total congestion metric for the path.

In an embodiment, the annotated information may be annotated as an additional header that wraps the original packet. In another embodiment, the annotated information may be annotated by repurposing existing fields within the packet, such as reserved fields or unused fields.

The path itself may be identified within the probe packet. In an embodiment, the packet includes a path ID assigned by the source node, which may be any unique value that the source node maps to the path. In an embodiment, the path may be specified using a load balancing key, which is a value that is used by load balancing functions at each hop in the network.

3.4. Determining when to Reflect a Packet

A node may selectively determine when to reflect a packet, based on the packet itself, node state information, path state information, and/or other conditional logic (e.g. using sampling techniques).

According to an embodiment, a node monitors various quantifiable attributes of the node and/or traffic flows being conveyed through the node to determine when certain specified reflection criteria are met. If the reflection criteria are met when the node processes a specific packet, the node reflects the packet. The criteria may be general (i.e. applicable to all packets) and/or specific to individual packets or flows. The reflection criteria may be based on statistics kept by the node and/or characteristics of the individual packets. The reflection criteria may further include some randomization or sampling function, as well as a tracking mechanism, so as to avoid reflecting all packets from a given source or in a given flow. For instance, the reflection criteria may be such that a node may only reflect a small sample of packets (e.g. 1%, 01%, etc.), even when all other reflection criteria are met.

One example of a suitable reflection criteria is an egress queue congestion condition. A node may monitor a queue fill level and reflect a packet if the fill level exceeds a specified threshold. Another example of a suitable reflection criteria is a path imbalance condition. A node may monitor next-hop load distribution indicators to determine when a given next-hop is overloaded relative to other next-hops in its group. Another example of a suitable reflection criteria is a link utilization condition. A node may monitor a link bandwidth utilization metric to determine when the percentage of the link bandwidth that is currently used is above a specified threshold. These conditions may be utilized, in isolation or in conjunction with other conditions, to determine when a packet that would be routed through the relevant queue, next-hop, and/or link should be reflected.

Reflection criteria may be hard-coded into a node, or adjusted programmatically using administrative instructions to the node. Although reflection criteria may take any suitable form, in a particular embodiment, reflection criteria are divided into reflection eligibility conditions and monitoring conditions. Forwarding logic or other suitable logic may be configured to determined when a packet is "reflection eligible." That is, the characteristics of the packet, such as the packet source, destination, label(s), size, forwarding type, traffic class, and location in the path to, and so forth may be utilized to determine if the packet is the type of packet that can be reflected. For example, in an embodiment, reflection criteria might preclude reflecting multicast packets from being reflected, or packets at their last hop from being reflected. Such logic may further include historical conditions, such as whether another packet from the source and/or flow has been reflected within a recent time period.

Monitoring conditions may be utilized to determine when a packet is a "reflection candidate." For instance, the node may monitor device attributes at the node, such as buffer or queue fill level, to determine the state of a path for a given flow. When the buffer or queue fill level for the flow exceeds a certain threshold, the packets in the flow, or at least a random sample of packets from the flow, may be designated as reflection candidates. Or, the node may monitor an internal congestion state or an administrator-induced reporting state for the node. When the internal congestion state exceeds a certain value, or when the reporting state is set, each packet routed through the node may be considered a reflection candidate.

Packets that are both "reflection eligible" and "reflection candidates" may then be reflected. In some embodiments, packets are only tested for reflection candidacy if they are reflection eligible, while in other embodiments, packets are only tested for eligibility if they are reflection candidates. In yet other embodiments, any other suitable technique may be utilized to determine when reflection criteria are met.

3.5. Reflecting the Packet

Generally, reflecting a packet, whether a duplicate or the original, involves modifying the packet such that 1) the reflected packet is destined for the source of the original packet, 2) the packet is flagged as being a reflected packet, and 3) the packet includes annotated state information and/or any other information the reflecting node wishes to convey. This process may involve inserting and/or modifying relevant fields within packet header(s) to include the foregoing, though in some embodiments the payload of a packet may instead be modified to include a flag and/or state information. In some embodiments, no explicit flag is needed to indicate that a reflected packet is in fact a reflected packet. Rather, the existence of a special field for carrying the annotated state information serves as an implicit flag that the packet is reflected.

In an embodiment, to reduce resource utilization, the reflecting node may truncate the payload of a reflected packet to reduce the size of the reflected packet. In an embodiment, the reflecting node may elevate the service priority of the reflected packet to ensure that the reflected packet has higher processing priority than the original data packet, for faster transmission on the path back to the source.

3.6. Handling a Reflected Packet at Intermediate Hops

When a packet is reflected, the reflected packet may be marked in some manner to indicate that the packet is in fact a reflected packet. For instance, as described above, a pass-thru-reflect flag may be set within the packet. Among other purposes, this marking may assist intermediate hops between the reflecting node and the source node in handling the reflected packet on its return journey.

When an intermediate node detects a reflected packet (i.e. through the existence of an explicit or implicit flag), the intermediate node may handle the reflected packet differently than a regular packet. For instance, the intermediate node may bypass its own reflection logic, so as to avoid reflecting a reflected packet back to the reflecting node. As another example, the intermediate node may elevate the service priority of the reflected packet to ensure that the reflected packet has higher processing priority than the original data packet, for faster transmission on the path back to the source. As another example, the intermediate node may itself annotate the reflected packet to include state information from the intermediate node, so as to provide a more comprehensive picture of the (reverse) path state. As yet another example, the intermediate node may also or instead truncate the reflected packet.

3.7. Reflecting Packets within Tunnels

In the case of reflecting a packet at a reflecting node through which the packet is being tunneled, the reflecting process may be slightly modified. The packet is first reflected back to the source specified by the tunnel header (i.e. the start of the tunnel). The tunnel source then tunnels the reflected packet back to the source address specified by the source node of the original packet. Or, in the case of multiple encapsulation, the reflected packet is tunneled back to the source of another tunnel the packet must traverse before proceeding to the source node. For instance, the tunnel source may be configured to reflect the packet back to the location specified in the payload's source address, which will be either the source node itself, or the source of another tunnel.

Example Reflection of Tunneled Packet

Figure 6A:
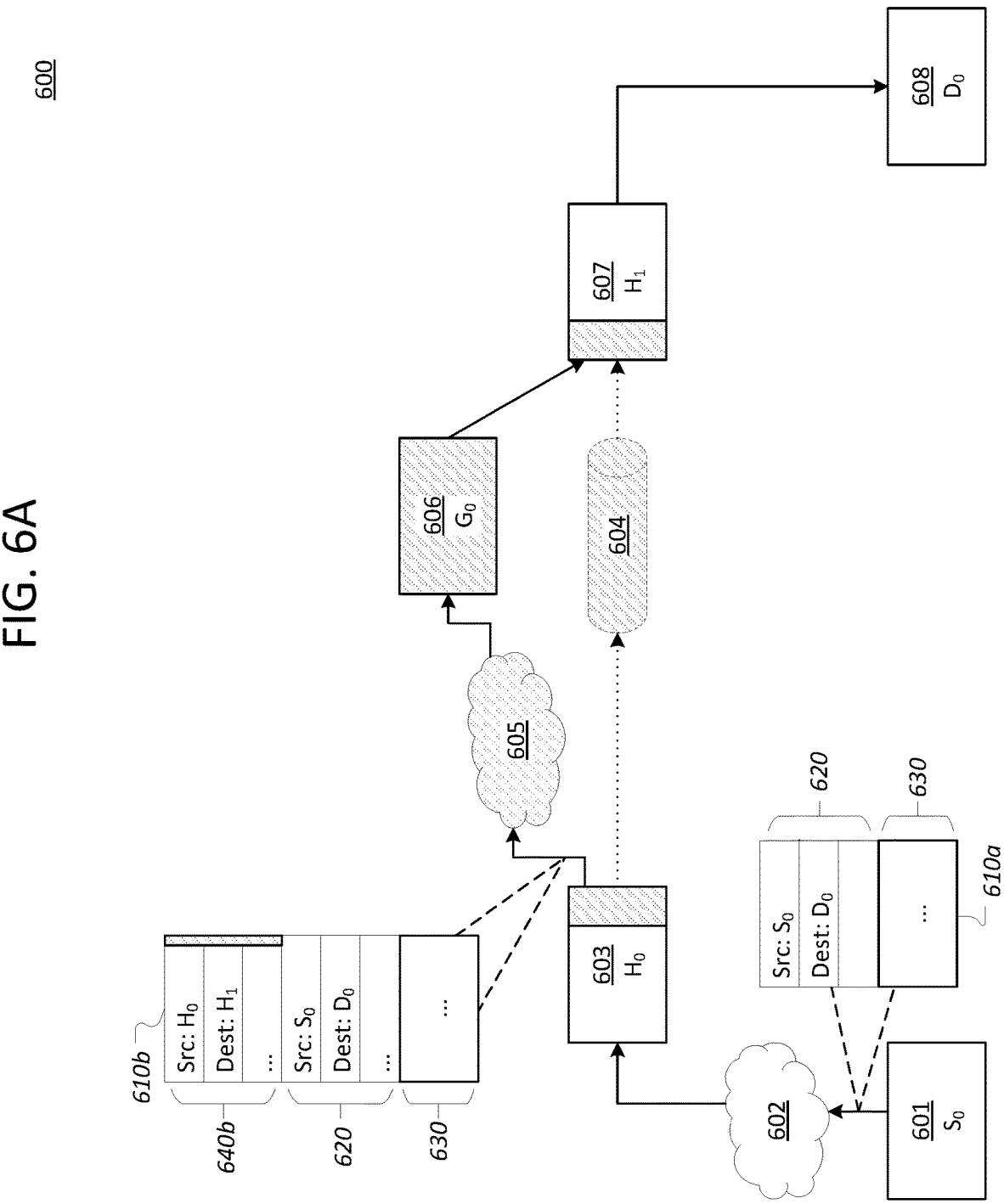
FIGS. 6A and 6B illustrate the reflection of a tunneled packet in a network.
Figure 6B:
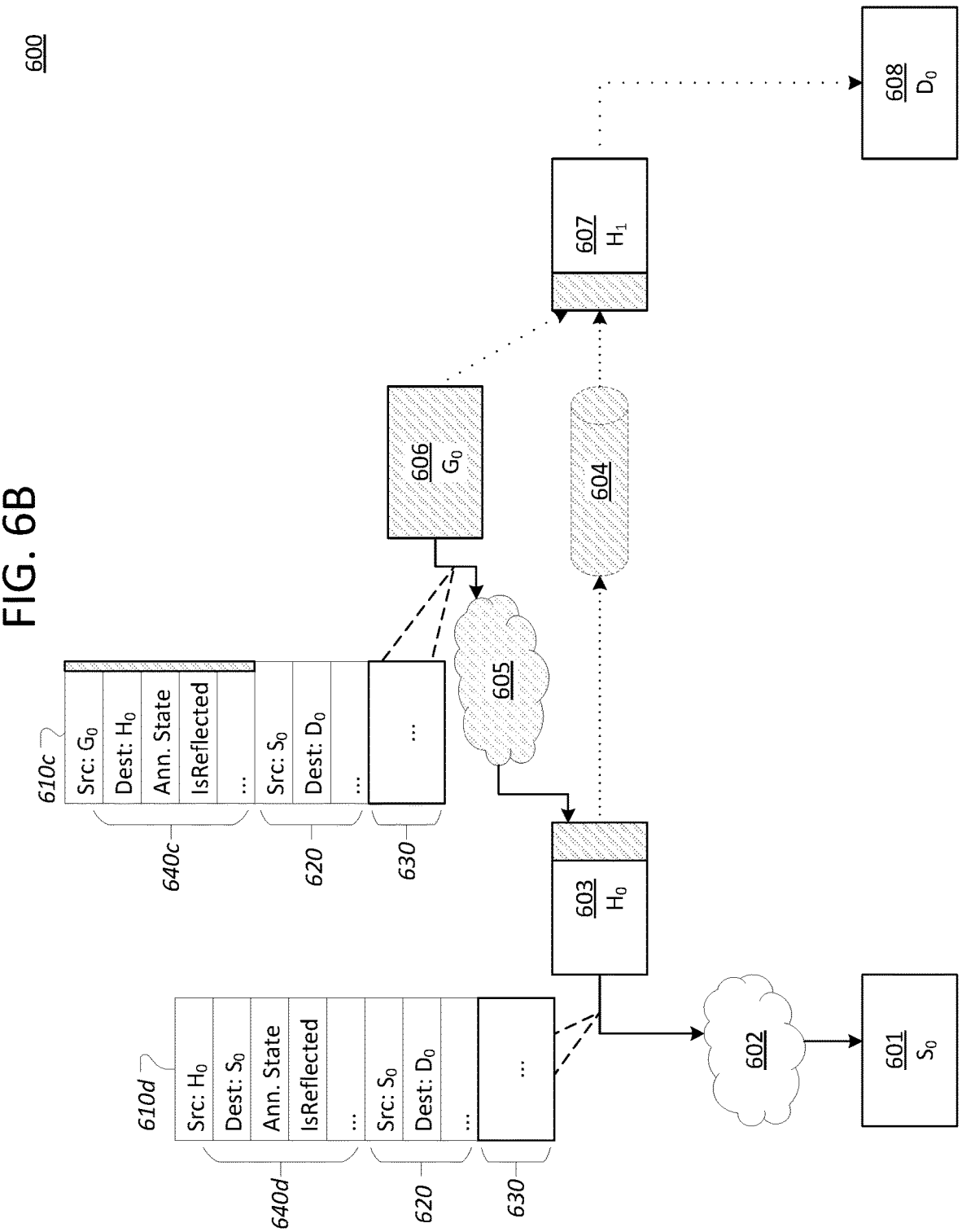
Figure 7:
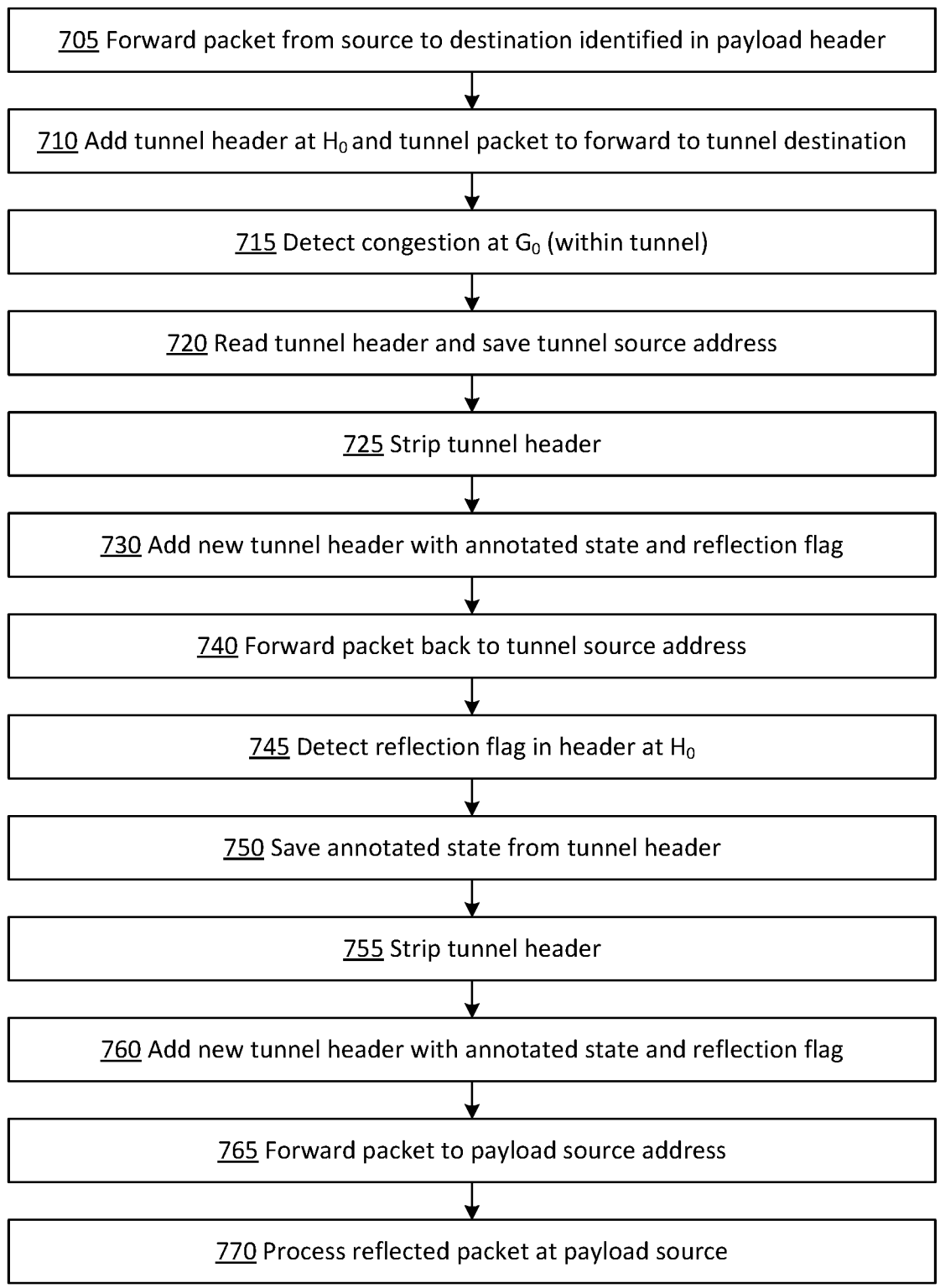
FIG. 7 illustrates a flow for reflecting such a tunneled packet.

FIGS. 6A and 6B illustrate the reflection of a tunneled packet 610 in a network 600, according to an embodiment. FIG. 7 illustrates a flow 700 for reflecting such a tunneled packet, according to an embodiment. In block 705 of flow 700, a packet 610 departs a Node S0 (601) and passes through a set of nodes 602 as the packet begins its route to destination Node D0 (608). The contents of the packet 610 as the packet departs from Node S0 are illustrated as packet structure 610a. The contents include a packet header 620 and a payload 630. Packet header 620 includes a source address, which is set to S0, and destination address, which is set to D0. Packet header 620 may further include other fields (not depicted).

Packet 610a eventually arrives at a Node H0 (603), which determines that packet 610 should be sent via a tunnel 604 to Node H1 (607). Accordingly, in block 710, Node H0 prepends a tunnel header 640b to packet 610a, resulting in tunneled packet 610b. Tunnel header 640b includes a source address, which is set to the start (H0) of tunnel 604 and a destination address, which is set to the end (H1) of tunnel 604. Tunnel header 640b may further include other fields (not depicted).

The journey of packet 610b through tunnel 604 involves passing through a set of nodes 605 until a node G0 (606) is eventually reached. For a variety of reasons, such as reflection criteria described elsewhere herein, in block 715, Node G0 may determine to reflect packet 610*b*. For instance, congestion may be detected at Node G0. Node G0 may thus begin to manipulate the packet 610*b*, or a copy thereof, to generate a reflected packet 610*c*. Simultaneously, in some embodiments, packet 610*b* may continue on through one or more nodes to the end of tunnel 604, at Node H1, which strips tunnel header 640*b* and then forwards packet 610*a* on through another one or more nodes to destination Node D0.

Referring now to FIG. 6B, the reflected packet 610*c* may have a new tunnel header 640*c*, with the source (H0) of tunnel 604 becoming the destination of the tunnel header and the current node (G0) becoming the source of the tunnel header. An annotated state information field may optionally be added to the header 640*c*, as is a reflection flag or indicator, to signify that packet 610*c* has been reflected. The packet header 620 remains unchanged, while the payload 630 also remains unchanged, though in certain embodiments payload 630 may be truncated or stripped.

Generating the reflected packet structure 610*c* may involve any suitable steps, depending on the embodiment. For instance, in block 720, G0 may read the tunnel header 640*b* and save the tunnel source address found therein. In block 725, Node G0 may then strip the tunnel header 640*b*. In block 730, Node G0 may add the new tunnel header 640*c*, with the tunnel source address as the tunnel destination address. In another embodiment, rather than stripping the tunnel header, the reflecting node may replace fields within the existing tunnel header.

In block 740, the reflected packet 610*c* is then forwarded over the set of nodes 605 back to Node H0. In block 745, Node H0 reads the tunnel header 640*c* and detects the reflection indicator, signifying that packet 610*c* is a reflected packet. In block 750, Node H0 saves the annotated state information field from the tunnel header 640*c*. In block 755, Node H0 strips the rest of the tunnel header 640*c*, leaving behind the original packet header 620 and payload 630 (if payload 630 remains in packet 610*c*). In block 760, a new tunnel header 640*d* is added to packet header 620 and payload 630 (if found). This new tunnel header 640*d* identifies the current node (H0) as the source address, and the source node S0, as found in header 620, as the destination address. The saved annotated state information is also added to tunnel header 640*d*, along with a reflection indicator.

The resulting structure is reflected packet 610*d*, which is then, in block 765, forwarded over the set of nodes 602 back to Node S0. In block 770, Node S0 then processes the reflected packet 610*d*, and more particularly the annotated state information found in tunnel header 640*d*.

The packet 610, and movement thereof, as illustrated in FIGS. 6A, 6B, and 7, are provided for example purposes only. Other packets may be tunneled and/or reflected in different manners, and other networks 600 may comprise other arrangements of nodes.

3.8. Collection

A probe packet may be reflected back to the source node and/or to a designated node, such as a network controller device. The reflected packet may also be intercepted by an intermediate node between the reflecting node and the node to which the reflected probe packet is directed. Any one of these nodes (source node, designated node, or intermediate node) may be considered a "collecting" node for the purposes described herein. In an embodiment, the collecting node forwards the state information to a Path Management Control (PMC) subsystem, which may be an internal or external CPU subsystem, an ASIC or FPGA, an external host, or any other component suitable for implementing path management logic such as described herein.

The collection node then processes the collected path state information, either immediately upon receipt, or in batches with other recently collected state information at periodic or other intervals. The collection node may simply record the collected path state information in a given packet in association with the path along which the probe packet was sent. Or, the collection node may generate its own metrics for a path based on the returned information. For instance, the collection node may compute metrics based both on the newly returned path state information and on historical path state information.

When the collection node recognizes the packet as being a reflected packet, the collection node can use the information conveyed therein to determine whether any of a number of actions are warranted. The action may be taken by the collection node itself, and/or the collection node may send an instruction to the original source node to take the action if the collection node is different from the source node. For instance, if the state information indicates that congestion levels along a path are above a threshold, the collection node may determine to reduce the rate at which packets are sent in a flow associated with the reflected packet. The rates of other flows having attributes that are the same as or similar to the reflected packet may also be reduced, in certain embodiments. As another example, the collection node may instead determine to stop or issue flow control to one or more entities. As yet another example, the collection node may determine to reroute new packets for the flow or similar flows along a new path.

In an embodiment, the collection node may be an intermediate node configured to recognize reflected packets destined for certain addresses and respond in a manner based on the information in the reflected packet. For instance, an administrative node may be configured to intercept reflected packets and send administrative instructions to one or more nodes in the network based on the information observed. Or an intermediate node may be configured to instigate rate control or flow control measures itself. Such behavior may be useful, for example, if the intermediate node supports capabilities that the source node might not support, or if the intermediate node is capable of responding to changing status information more quickly than the source node.

3.9. Instructions not to Reflect

In an embodiment, a packet may optionally be marked with a special flag (e.g. in the header) that instructs downstream nodes to not reflect the packet, or to lower the probability of reflection. This flag may be utilized for a number of purposes. For instance, a source node (or intermediate node) may wish to proactively avoid receiving reflected packets, and thus insert this flag. In an embodiment, this flag may be utilized to avoid reflecting a single packet twice. That is, a single packet may be reflected as it is passing through an initial congestion point (Node A), and also subsequently reflected as it continues on through a secondary congestion point (Node B), triggering multiple reflections back to the same source. Such behavior may not necessarily be desirable. To prevent such behavior, the first node to reflect the packet may insert a special flag into the original packet (as opposed to the reflected packet) that instructs subsequent nodes not to reflect the packet. Similar techniques may be utilized temporarily or permanently to mark all packets within a flow as being ineligible for reflection after a certain number of packets from the flow have been reflected within a period of time.

Conversely, in some embodiments, a packet is assumed to be ineligible for reflection unless it contains a special flag marking the packet as reflection-eligible. A source node may insert such a flag, or an intermediate node that is configured to intercept reflected packets may insert such a flag. The flag may be removed by an intermediate node to avoid reflecting a single packet twice, or to avoid reflecting too many packets from a flow within a period of time.

3.10. Device Logic

Figure 4:
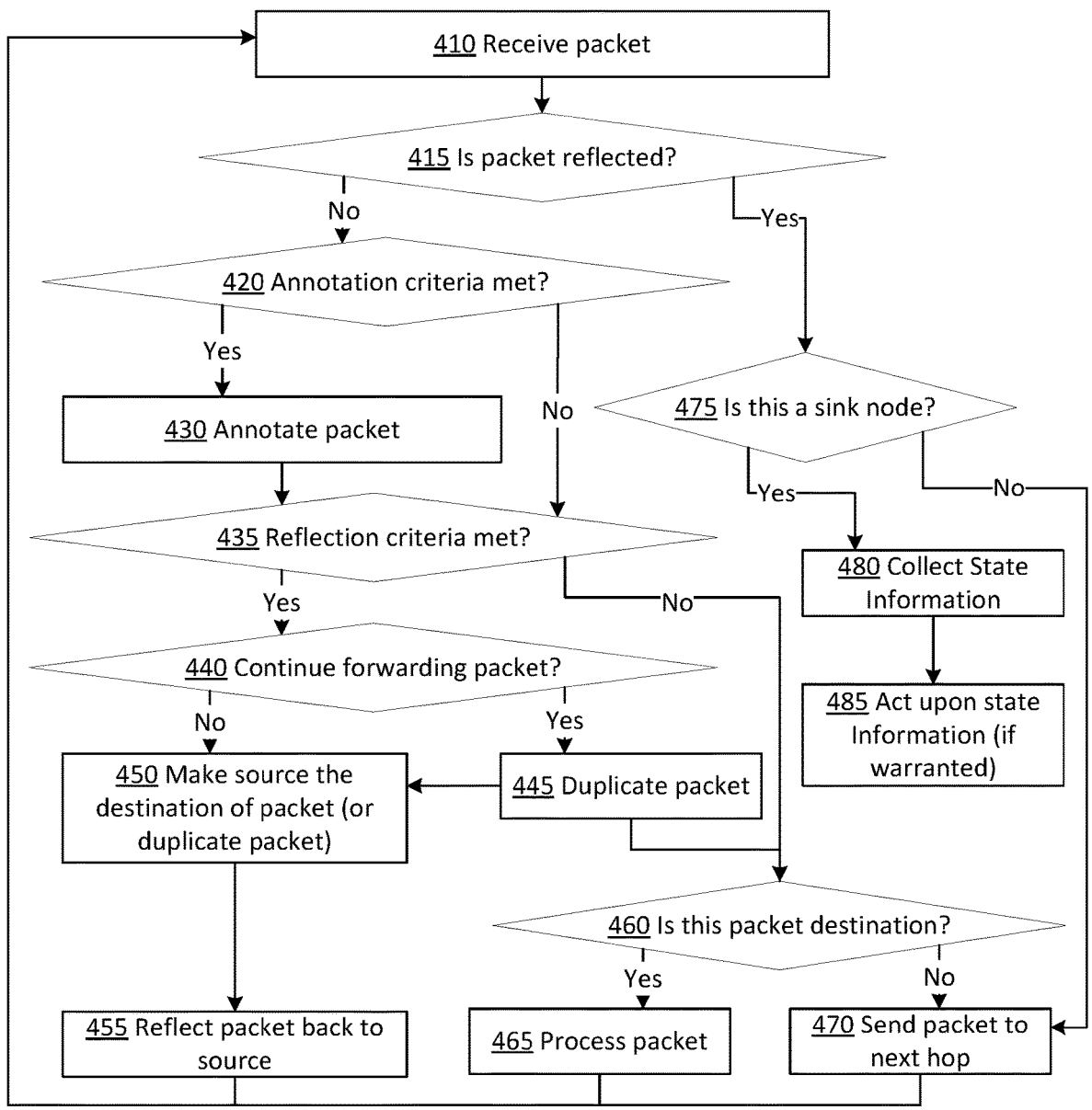
FIG. 4 illustrates an example flow for forwarding logic of an apparatus in a network with reflected packets.

FIG. 4 illustrates an example flow 400 for forwarding logic of an apparatus in a network with reflected packets, according to an embodiment. The various elements of flow 400 may be performed in a variety of apparatuses, including devices such as device 200 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 410 comprises receiving a packet at a device, such as a packet 205. The packet may be received and then processed by the forwarding logic of the device.

Block 415 comprises determining whether the packet is reflected. A reflected packet will generally comprise some flag or indicator that indicates that the packet is reflected, as described in other sections. Assuming the packet is not reflected, flow 400 proceeds to block 420.

Block 420 comprises determining whether annotation criteria are met. As described elsewhere herein, the annotation criteria may include threshold eligibility criteria based on such factors as the inclusion of a probe flag or previous annotations in the packet, factors based on packet characteristics, and/or factors based on current node state information. The annotation criteria may further include a random, pseudo-random, or sampling element to ensure that only a small portion of packets are annotated for a given flow, path, or other attribute. In an embodiment, block 420 may optionally comprise determining to annotate packets with reverse path information when reflected back along the source path, so as to collect path state information for a reflected packet that may lack such information.

If annotation criteria are met, flow 400 proceeds to block 430. Block 430 comprises annotating the packet, as described elsewhere herein. Once the packet is annotated, or if annotation criteria are not met in block 420, flow 400 proceeds to block 435.

Block 435 comprises determining whether reflection criteria are met. As described elsewhere herein, the reflection criteria may include threshold eligibility criteria based on such factors as the current node being designated as a reflection node by the packet, factors based on certain packet characteristics, and/or factors based on current node state information. The reflection criteria may further include a random, pseudo-random, or sampling element to ensure that only a small portion of packets are reflected for a given flow, path, or other attribute. In an embodiment, the reflection criteria are such that packets are reflected less frequently than annotated.

If reflection criteria are met, flow proceeds to block 440. Block 440 comprises determining whether, in addition to reflecting the packet, the node should also continue forwarding the packet to its intended destination. If forwarding of the packet is to continue, then in block 445 the packet is duplicated before proceeding to block 450. Otherwise flow simply proceeds to block 450.

Block 450 comprises making the source address of the packet (or its duplicate) the destination of the packet, and making the address of the current node the source of the packet (or its duplicate), either by manipulating the packet header directly, or encapsulating the packet within a new header. The packet (or its duplicate) is now considered to be a reflected packet. Flow proceeds to block 455, where the reflected packet is sent back to the source of the packet (i.e. the new destination of the reflected packet).

If a duplicate packet is generated in block 445, or if reflection criteria were not met in block 435, flow 400 proceeds to block 460. Block 460 comprises determining whether the current node is the packet's destination. If so, then the packet is processed at the node in block 465. Otherwise, the packet is forwarded along to the next hop on a path to the destination address of the packet in block 470.

Returning to block 415, if the packet is reflected, then in block 475, it is determined whether the current node is a "sink node" or "collection node" for the packet, using techniques such as described elsewhere herein. If not, flow proceeds to block 470, thereby bypassing the annotation and reflection logic of blocks 420-440. In an alternative embodiment, the annotation logic may not necessarily be bypassed. In yet other embodiments, to ensure timely delivery of the reflected packet, the reflected packet is processed and sent by the node in an expedited manner relative to other packets being processed by the node.

If it is determined that the current node is a collection node in block 475, then flow proceeds to block 480, which comprises collecting state information from the reflected packet, as described elsewhere herein. The collection process may optionally comprise, for example, calculating aggregate metrics for the path and/or nodes traversed by the reflected packet, as indicated in annotations within the reflected packet's header. Flow then proceeds to block 485, which comprises taking one or more actions based on the state information, if warranted. Examples of such actions are described in other sections.

Flow 400 may be repeated any number of times for any number of packets, and multiple packets may be processed concurrently depending on the available hardware resources.

Flow 400 illustrates only one of many possible flows for the forwarding logic of an apparatus. Other flows may include fewer, additional, or different elements, in varying arrangements. For example, the forwarding logic has been simplified to address only decisions related to annotation, reflection, and collection mechanisms. It will be recognized that a device's forwarding logic includes a number of other elements utilized for other purposes, and these elements may result in logical decisions that precede and obviate certain steps of flow 400, and/or that occur after some or all of the steps in flow 400. Moreover, in an embodiment, different nodes may be configured to support different features, and thus feature forwarding logic that omits certain steps, such as blocks 420, 430, 435, 440, 480, 485, and so forth.

3.11. Miscellaneous

Although packet reflection techniques may be utilized for conveying information within any context, it will be noted that in at least one embodiment, packet reflection is one mechanism by which a node within a system configured to dynamically modify path weights may return path state information to a source node. Examples of such systems are described in other sections of this disclosure.

4.0. Dynamic Weighted Cost Multipathing

In general, weighted cost multipathing involves assigning a weight to each possible path for a destination (the destination being either a single destination node or a group of nodes such as a subnet). The technique used to select a path utilizes these weights to ensure that the probability of a data unit being assigned to a given path is approximately proportional to the weight of that path relative to the weights of the other paths to the destination. For instance, a path with a weight of two might be selected twice for every time a path with a weight of one is selected.

Typically, the selection technique also involves identifying the path using a function of selected information within the data units, such as of address information. One example of a suitable function is a hash function that uses a modulo operation to calculate the remainder when the address fields (either summed or concatenated) are divided by the sum of the weights. Each possible path is assigned a number of entries (hereinafter "multipath entries") within a table or list of paths, in proportion with its weight. The remainder is used to identify the index of the path to be selected.

Dynamic WCMP, meanwhile, involves adjusting these weights dynamically based on metrics for the paths. In some embodiments, the metrics may be obtained using state information collected from reflected packets. In other embodiments, metrics may be obtained using state information collected via any other suitable means.

4.1. General Flow

Figure 8:
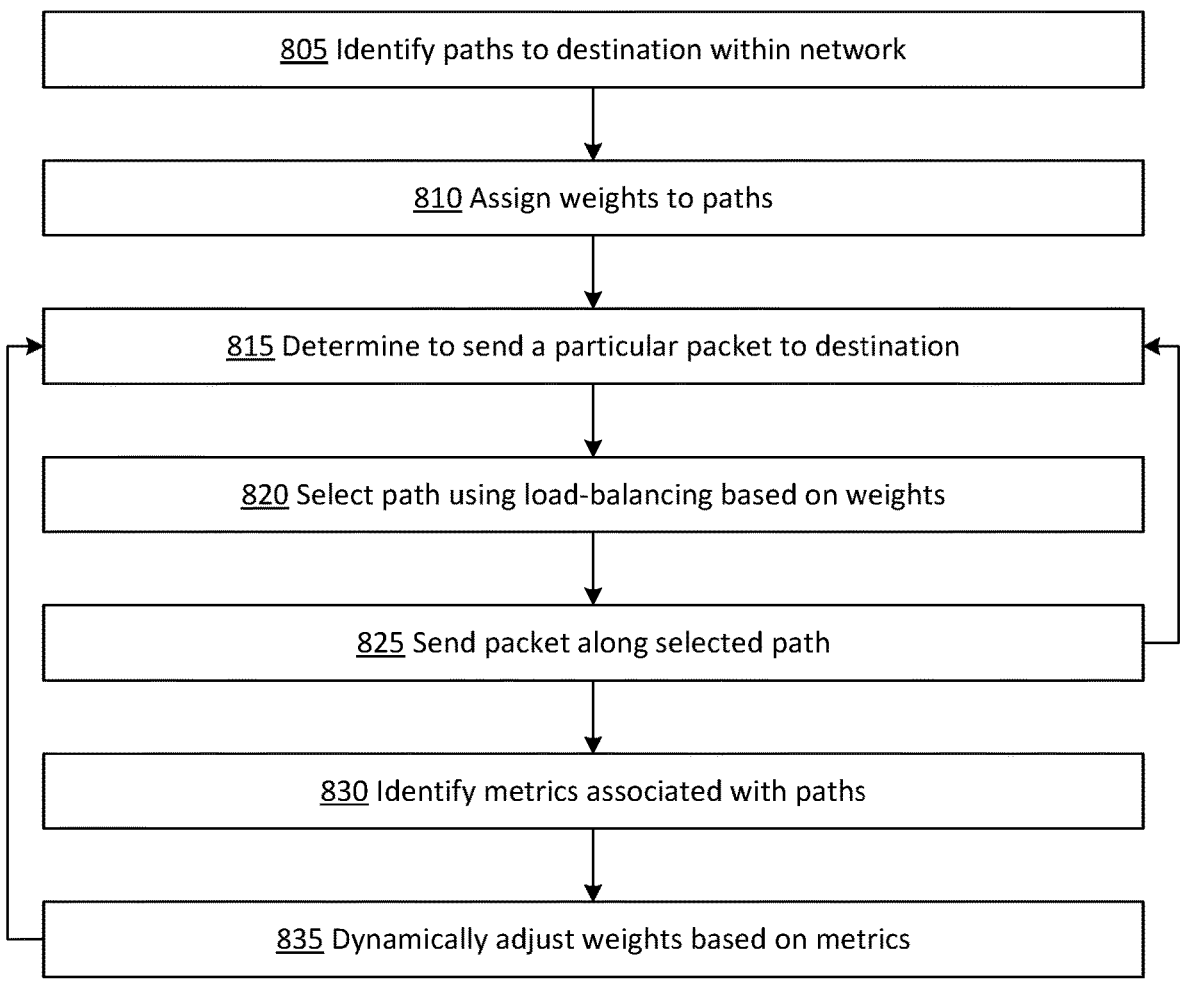
FIG. 8 illustrates an example flow for implementing dynamic weighted cost multipathing.

FIG. 8 illustrates an example flow 800 for implementing dynamic weighted cost multipathing, according to an embodiment. The various elements of flow 800 may be performed in a variety of systems, including systems such as system 100 and/or 200 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 805 comprises identifying paths to a destination within a network. The destination may be a specific address or a group of addresses. Various mechanisms may exist for defining and representing a group of addresses, such as sets, ranges, and so forth. In an embodiment, a group of addresses is defined as a "subnet," which typically includes all addresses that begin with a certain prefix, such as the group of all addresses that begin with "192.168.1" or the group of addresses that begin with "10.0." A subnet may be defined in a number of manners, such as by the combination of an address and a subnet mask that is applied to the address to yield a range or other grouping of addresses. Commonly, in switches and other network devices, a group of addresses is represented using a "prefix" having a format known as CIDR notation. Generally, the format includes an address (e.g. an IPv4 or IPv6 address), followed by a slash, and then followed by a number signifying how many leading bits in the address, when represented in binary form, must be the same for each device in the group.

Depending on the embodiment, paths may be identified by specific sequences of nodes that constitute the path, labels, identifiers, or egress ports. A node need not necessarily know each node in a path, as may be the case for example where an egress port is used to identify a path. In some such embodiments, packets that are sent out of the node through the same port may be said to follow the same path, even if the packets may actually be routed differently downstream. In other words, in such embodiments, the node's logic for selecting a path is concerned solely with the port selected by the node, and not the complete path that the packet will eventually take.

Block 810 comprises assigning weights to each of the paths to the destination. The weights may be determined using any suitable functions, including functions based on factors such as bandwidth, QoS levels, port or queue congestion levels, path latency or congestion levels (as determined using collected path state information), and so forth. A device may assign its own weights, or the weights may be specified via instructions from an external device.

Block 815 comprises determining to send a particular packet to the destination. To make this determination, a destination address identified for the packet (e.g. specified by a destination field in the packet's header) is compared to a number of different destinations to which the device has mapped routing decisions (e.g. using a routing table). This comparison process, often involving a process known as prefix matching, identifies a specific destination to which the packet should be sent. For instance, if the destination address specified by the packet is 192.168.0.107, a prefix matching process might determine that the destination for the packet should be the prefix 192.168.0.1/24, and thus the device would utilize routing decision(s) mapped to that prefix to handle the packet.

Block 820 comprises selecting a particular one of the paths identified for the destination using a load-balancing mechanism based on the weights. Ideally, the load-balancing mechanism is configured such that, on average, packets will be assigned to each of the identified paths at a frequency that is proportional to or otherwise based on the weights associated with those paths. For instance, if the weight of a Path A is 4 and the weight of a Path B is 5, it would be expected that, on average, for every four packets that are sent along Path A, five packets would be sent along Path B. Of course, it may be difficult for a load-balancing mechanism to ensure that this ideal is always met for all traffic patterns, particularly when employing measures to avoid packet reordering. Hence, the load-balancing mechanism need not be configured to ensure that this ideal is always met. One example of a suitable load-balancing mechanism is WCMP, as described elsewhere herein.

Block 825 comprises sending the packet along to the destination via the selected path. Blocks 815-825 may be repeated for any number of packets. Generally, blocks 815-825 are performed concurrently with blocks 805, 810, 830, 835.

Block 830 comprises identifying metrics associated with the paths to the destination. The metrics may be identified in any suitable manner, including, but not limited to, the reflection mechanism described in other sections. Block 835 comprises dynamically adjusting weights of the paths based on the metrics. The adjustment occurs as the device continues processing packets, per blocks 815-825. Hence, at least some portion of traffic that would have been assigned to a certain path may be reassigned to a different path in response to changing network conditions, as indicated by the different metrics.

Flow 800 illustrates only one of many possible flows for implementing dynamic weighted cost multipathing. Other flows may include fewer, additional, or different elements, in varying arrangements.

4.2. Multipath Forwarding Implementation Example

According to an embodiment, a device may implement multipath forwarding to a given destination by creating and mapping "multipath groups," which represent an array of "equal cost" egress ports, for the destination. Each egress port corresponds to one of the multiple paths available to reach the destination. The device calculates hash values based on the packet headers of packets bound for the destination, and uses these hash values to determine which egress port to use for which packets. Hashing on specific fields in the packet header, or a key generated based thereon, ensures that all packets in the same flow follow the same network path (as long as the path weights remain the same), avoiding packet re-ordering.

To implement weighted hashing, weights are assigned to each egress port in a multipath group. An array of egress ports with weights is referred to as a WCMP group. Each WCMP group distributes flows among a set of egress ports in proportion to the weights of each port. The weight assigned to an egress port is in turn proportional to the anticipated capacity of the path(s) associated with that egress port.

According to an embodiment, a device may implement WCMP groups using a path table in which each port mapped to the destination has a number of entries in proportion to its weight. Such a path table is referred to as a multipath table. The device uses an identifier found in or derived from the packet (e.g. the afore-mentioned hash value) to locate the index of an entry within the path table to which the packet is considered to be mapped. The port (or path) assigned to that entry is used to send the packet out of the device.

Example Multipath Table and Logic

Figure 9:
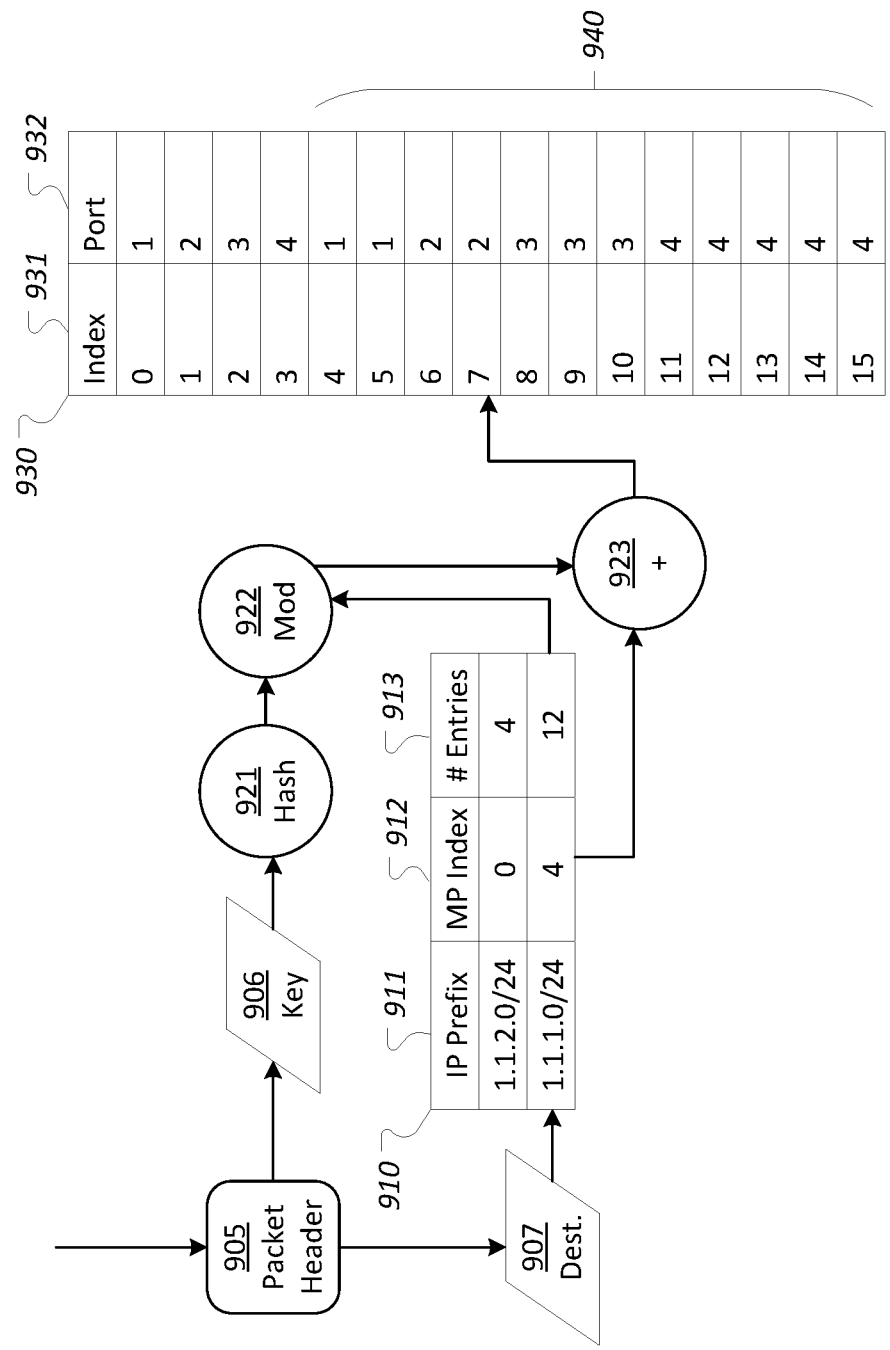
FIG. 9 is a block diagram of a system comprising an example multipath table and associated logic.

FIG. 9 is a block diagram of a system 900 comprising an example multipath table 930 and associated logic, according to an embodiment. System 900 may, in some embodiments, be compatible with system 200, in that path table 930 may be an example of a path table 265, while logic 921-923 may be components of forwarding logic 220. In other embodiments, system 900 may be implemented in systems other than system 200.

Multipath table 930 includes entries for two groups, including WCMP group 940. Each group includes a number of entries (rows), each having a different index 931. The index 931 need not necessarily be stored, but rather each index 931 may simply correspond to a different address in memory corresponding to the entry. Each entry is further associated with a port 932. Optionally, additional data such as a last sent time may be stored in table 930 as well.

Each group is associated with a different group identifier 911 identified in table 910. Group identifier 911 is depicted as a prefix for illustrative purposes, but may be any suitable identifier. Table 910 defines a starting index 912 and number of entries 913 for each group. Hence, in accordance with the depicted example, the first four entries in table 930 store an ECMP group for traffic destined to prefix 1.1.2.0/24. The next 12 entries in the table store a WCMP group 940 for weighted distribution of traffic destined to prefix 1.1.1.0/24.

Figure 10:
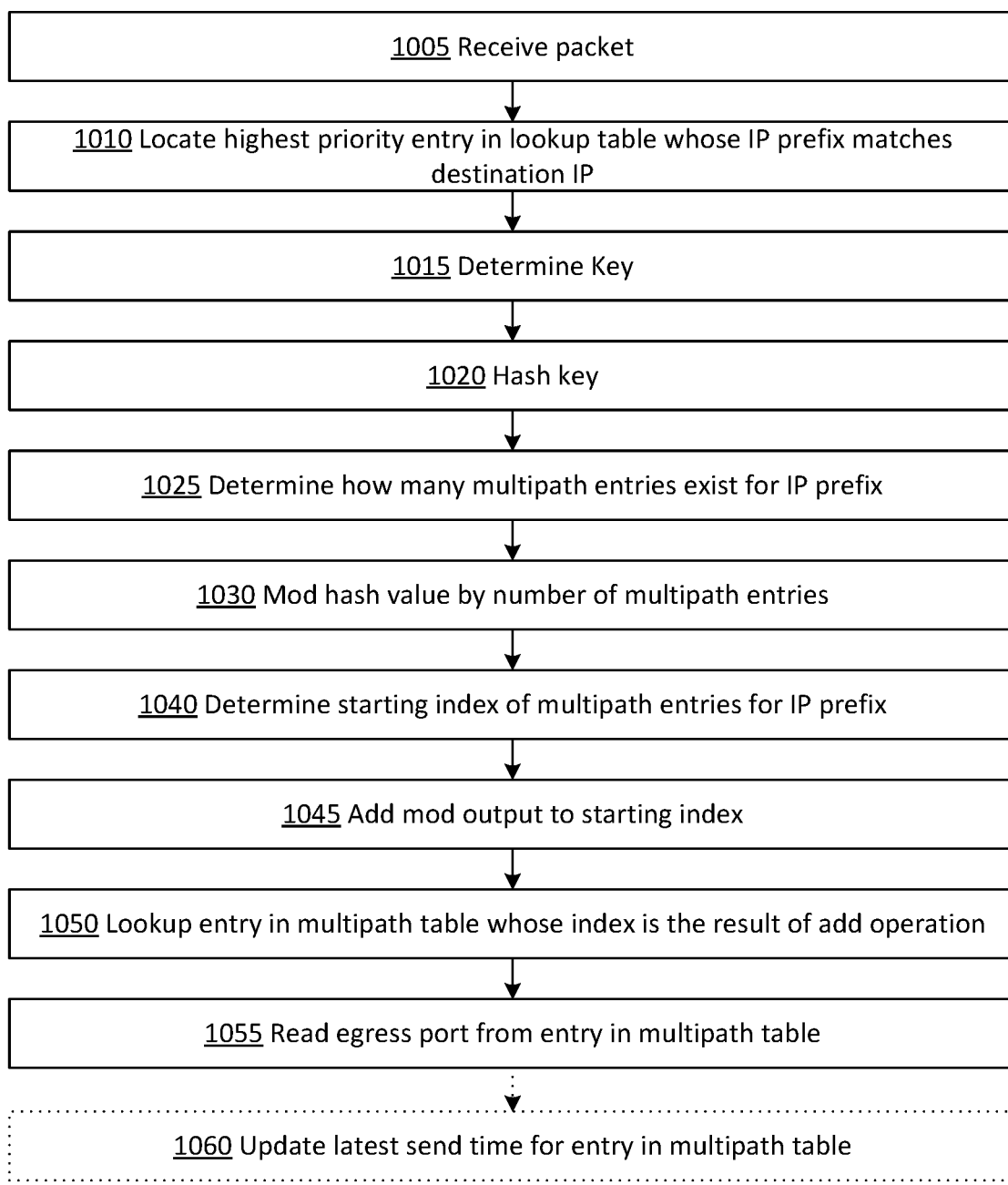
FIG. 10 illustrates a flow for processing a packet in a system comprising the example multipath table and associated logic.

FIG. 10 illustrates a flow 1000 for processing a packet in a system such as system 900. Block 1005 comprises receiving a packet, which includes a packet header 905.

In block 1010, the packet is resolved to a multipath group identifier in table 910. For instance, the destination address 907 of the packet may be matched against the Longest Prefix Match (LPM) entries. The entry selected is the highest priority entry whose prefix 911 matches the destination address 907. The selection of the entry can be said to select the multipath group to which the packet belongs. Although the example embodiment illustrates table 910 as identifying groups by prefix, it will be recognized that table 910 may simply identify each group by some identifier, and that the process of resolving a packet to a group identifier may be implemented by prefix matching or other suitable process without the involvement of table 910.

The packet header is used to derive a key 906 in block 1015 (e.g. a "five-tuple" key derived from various packet fields). In block 1020, the key 906 is entered into hash function 921 to compute a hash value.

In block 1025, system 900 consults the table 910 to determine the number of multipath entries 913 in the selected multipath group, as indicated by the selected entry in table 910. In block 1030, system 900 performs a mod operation 922 between the hash value and the number of multipath entries 913 in the selected multipath group.

In block 1040, system 900 consults the table 910 to determine the starting index 912 for multipath entries in path table 930 for the selected multipath group, again as indicated by the selected entry in table 910. In block 1045, system 900 performs an addition operation 923 between the output of the mod operation 922 and the identified starting index 912.

In block 1050, system 900 looks up the entry in multipath table 930 whose index matches the output of addition operation 923. In block 1055, the egress port of this entry is read from the multipath table 930. This port may then be used to send the packet. Optionally, in block 1060, a last sent timestamp associated with the entry in the multipath table 930 may be updated to reflect the current time.

For example, as illustrated, a packet with destination 1.1.1.1 matches the LPM table entry pointing to the WCMP group with base index of 4 in the multipath table. The switch determines the offset into the multipath table for a particular packet by hashing over header fields e.g., IP addresses, UDP/TCP ports, as inputs. The hash modulo the number of entries for the group added to the group's base index determines the table entry with the egress port for the incoming packet ((15 mod 12)+4=7).

Replicating entries for assigned weights for each possible multipath group can, in many common devices, easily exceed the number of path table entries available, typically numbering in the small thousands. To overcome this hardware limitation on table entries, one may map the "ideal" WCMP port weights onto a smaller set of integer weights, with the optimization goal of balancing consumed multipath table 930 resources against the impact on flow fairness. For example, as illustrated, the egress port numbers 1, 2, 3, 4 in the WCMP group have weights 2, 2, 3, 5 respectively (weight ratio 1:1:1.5:2.5) and use 12 entries in the multipath table 930 to provide ideal fairness. If one were to change these weights to 1, 1, 2, 3 respectively, one would reduce the number of table entries required from 12 to 7 with small changes to the relative ratios between the weights. This reduction is useful in implementing weighted hashing as this helps in significantly lowering memory cost requirements.

FIGS. 9 and 10 illustrate but one example of mechanisms for implementing dynamic weight cost multipathing. Other embodiments may include fewer or additional elements in varying arrangements. Other types of data structures may be utilized instead of or in addition to those depicted, and of course the contents of those data structures may vary depending on the architecture of the system in which they are utilized.

4.3. Adjusting Weights

From the collected path state information, a path management subsystem, such as path management controller 260, determines each path's ranking relative to each other path for a given source/destination combination. For instance, the path management subsystem may rank paths by a collected metric or computed metric, including without limitation, path or node bandwidth, throughput, latency, congestion, or combinations thereof. The path management subsystem then determines an updated weighted path distribution for the given source. The weights may be assigned based on the rankings in any number of ways. For instance, each slot in the rankings may have a pre-defined associated weight, or the weight may be at least partially a function of the metric upon which the paths are ranked.

The path management subsystem then updates the network configuration based on the updated weights. For example, if the path management subsystem is within the source node, the path management subsystem may update the multipath forwarding tables at the source node (or send a message to another component configured to do so). Or, if path information is computed for source/destination combinations where another node is the source, the path management subsystem may instead or additionally send instructions to a component at the other node to update its multipath forwarding table.

As a consequence of the foregoing, some fraction of entries for paths within a multipath list or table may be reassigned to other paths, resulting in some fraction of traffic flows being reassigned accordingly. For paths that the collected state information indicates are no longer valid (e.g. as a result of path faults), the path may be removed altogether, with its entries reassigned to paths that remain valid.

The path management subsystem may repeat the above process for any number of source/destination combinations. For instance, probe packets may be collected from any number of reflecting nodes in a network, with respect to any number of source nodes, corresponding to any number of paths through the network.

In an embodiment, a path management subsystem may utilize information in a reflected probe packet to refresh metrics for other paths in addition to the path along which the probe packet traveled, such as may happen when probe packet includes state information for nodes along other paths (e.g. as a result of overlap or information sharing techniques). In the latter case, it may be helpful for the path management subsystem to collect state information for individual nodes and links instead of paths as a whole, and then compute metrics for the paths based on the individual nodes and links within the path.

To adjust weights in systems that use replicated entries in a multipath table to implement multipath forwarding, one need simply reassign certain indexes 931 in the multipath table 930 to different ports 932. For instance, suppose that metrics indicate congestion along a path to destination 907 that departs from port 3. System 900 may be configured to react to this congestion by reassigning any of the indexes 8, 9, or 10 to any other of ports 1, 2, or 4, thus changing the weight of port 3 relative to the other ports.

4.4. Packet Reordering

In some embodiments, dynamic updates to WCMP path weights can result in packet reordering for flows that are active when the weights are updated (e.g. when multipath entries are reassigned). For instance, suppose a flow A comprises 10 packets. Packets 1-8 from a flow A are routed to a path P1 specified in the $10^{th}$ entry in a multipath table. However, before packets 9 and 10 are routed, the $10^{th}$ entry is updated to specify a path P2 as a result of reweighting paths in the multipath table. Packets 9 and 10 are thus routed through P2. If P2 is significantly faster than P1, packets 9 and 10 may arrive at their destination node before some or all of packets 1-8, which may cause problems at the destination node. Such packet reordering can lead to poor performance for a number of transport protocols (e.g. TCP).

In an embodiment, packet reordering may be avoided by monitoring each multipath entry and observing the last time the entry has been visited (e.g. the last time the node routed a packet that hashed to the index number of the entry). If the entry has not been visited within an acceptable time duration (e.g. a time duration chosen to prevent reordering), and/or meets other prescribed reordering conditions, then the entry can be updated. An update to an entry is held back until the reordering conditions are met for that entry. In an embodiment, if reordering conditions are not met within a particular window of time, the update is dropped, as it may no longer be a beneficial update due to network state changes.

Figure 11:
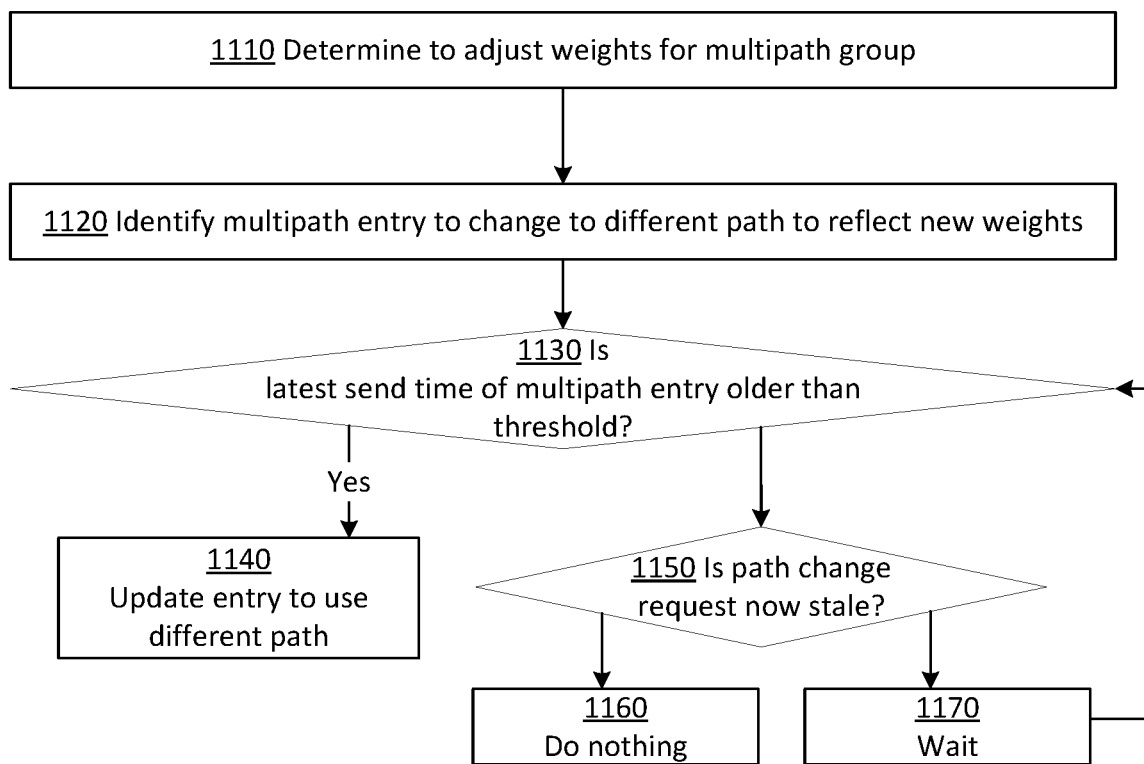
FIG. 11 illustrates a flow for adjusting path weights in a system configured to avoid packet reordering.

FIG. 11 illustrates a flow 1100 for adjusting path weights in a system configured to avoid packet reordering. The various elements of flow 1100 may be performed in a variety of systems, including systems such as systems 200 and/or 900 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 1110 comprises determining to adjust weights for a multipath group. As described elsewhere, such a determination may be made for a variety of reasons, including in response to changes in node and/or path state indicated by information collected through reflected packets. In an embodiment, a determination of whether to adjust weights for a multipath group is performed periodically, in response to receiving a reflected packet, and/or in response to other triggers.

Block 1120 comprises identifying a multipath entry in a multipath table, such as table 930, whose associated path should be changed to reflect the new weights. The strategy used to select an entry may vary, depending on the embodiment. For example, an entry may be selected so as to keep all of the entries assigned to a path consecutive. Or, the entry with the oldest last sent times may be selected for reassignment. Or, an entry may be randomly selected.

Block 1130 comprises determining whether the last sent time of the selected entry is older than some threshold. Such a threshold may be chosen to minimize the likelihood of packet reordering. The threshold may be global across a network, specific to a device, specific to a set of ingress or egress ports, specific to a class or flow of traffic, specific to a destination, and so forth. The threshold may further change based on observed traffic patterns.

If the last sent time is older than the threshold, then in block 1140, the entry is updated to a different path. Otherwise, in block 1150, it is determined whether the path change requested in block 1120 is still valid (e.g. not stale on account of having waited too long to make the change). The amount of time to wait may, like the threshold, vary depending on the context. In an embodiment, a request is considered invalid if a different change has subsequently been requested (e.g. based on new state information obtained since the change request was made). If the request is still valid, then in block 1170, the system may wait for some period of time and try block 1130 again. Otherwise, the entry is not changed.

Blocks 1120-1170 may be performed, potentially concurrently, for each of multiple entries to reassign, should the weights indicate that multiple entries need to be reassigned.

Flow 1100 illustrates only one of many possible flows for adjusting weights. Other flows may include fewer, additional, or different elements, in varying arrangements. For example, in some embodiments, block 1150 may be omitted, along with any other elements relied upon exclusively by the omitted element(s). In an embodiment, blocks 1130 and 1150-1170 may be omitted.

4.5. Miscellaneous

While the techniques described herein are advantageous in the context of the WCMP approach to routing decisions, it will also be recognized that the techniques described herein may be applied to dynamically weight routing options in a variety of other contexts. For instance, there are many possible techniques in which a node may decide how to route a packet based on weights attached to paths, nodes, links, ports, and/or other elements in a network topology. Information collected using the described techniques may be utilized to dynamically adjust those weights accordingly.

5.0. Visibility Packets

The techniques described in this section aim to, among other aspects, improve debugging capabilities in switches and other types of network devices to provide greater visibility and handling of packet drops and/or other issues.

According to an embodiment, a switch or other network node is configured not to drop a packet in certain situations when the node might otherwise have dropped the packet. Packets, cells, or other data units that become corrupted and/or invalid (e.g. due to table look-up failures) are transformed into "special visibility" packets (or other data units). In some embodiments, the node may even be configured to never drop a data unit—that is, any data unit that conventionally would have been dropped instead becomes a special visibility packet. In other embodiments, only data units that meet certain criteria are transformed into a special visibility packets.

According to an embodiment, any data unit that is impacted in an unexpected manner (e.g. inflated latency) may also be transformed into a special visibility packet. The transformation may, in some cases, including duplicating the original packet and transforming the duplicate packet into a special visibility packet instead of the original.

Special visibility packets may be used for a number of different purposes. For instance, they may be stored for some period of time in a repository, where they may be viewed and/or analyzed through external processes. As another example, certain types of special visibility packets may be sent or consumed by custom hardware and/or software-based logic (deemed a "healing engine") configured to send instructions to one or more nodes within the network to correct problems associated with those types of special visibility packets.

In an embodiment, information from visibility packets may be utilized to adjust weights of a path for dynamic WCMP techniques. For instance, if large number of packets are dropped by an egress port corresponding to a certain path, the weight of the path may be lowered.

5.1. Transforming Packets into Special Visibility Packets

In an embodiment, the forwarding logic of a node may be configured such that certain packets, such as packets that are experiencing certain issues or that would have been dropped, are additionally or instead processed by special visibility logic that transforms the packets into special visibility packets. Conceptually, the packets to be transformed may be viewed as being forwarded to a visibility path instead of or in addition to the normal path to which they otherwise would have been forwarded.

For instance, the forwarding logic may implement special visibility transformation logic by default when no other forwarding rule applies, and/or if a packet ever needs to be dropped because of resource constraints, errors, or special policies. Or, the forwarding logic may be configured to identify packets undergoing a special visibility issue, such as having an unexpected amount of latency, and apply the transformation logic to such packets.

In general, the special visibility logic transforms a packet by first associating a visibility tag with the packet. Once tagged as a special visibility packet, the packet is placed in a visibility queue, which is any suitable memory or storage structure for storing the special visibility packet for analysis, as described in subsequent sections. For example, the tagged packet may be removed from processing (e.g. removed from its current buffer) and transferred to traffic management logic. The traffic management logic then accesses the special visibility packet, observes the visibility tag, and links the packet to a special visibility queue.

In an embodiment, only a portion of the packet is actually tagged, with the rest of the packet being discarded. For instance, if a switch is operating at a cell or frame level, a certain cell or frame may be detected as the "start of packet" (SOP), and include information such as the packet header. This cell or frame, and optionally a number of additional following cell or frames, may form the special visibility packet, and other cells or frames of the packet (e.g. cells or frames containing the payload and/or less important header information) may be discarded.

In some embodiments, a packet undergoing certain types of issues may be duplicated before being transformed, so that the original packet continues to undergo normal processing (e.g. in cases where an issue is observed, but the issue does not preclude normal processing of the packet), and the duplicate becomes the special visibility packet.

5.2. Visibility Tags

A visibility tag may be any suitable data in or associated with a packet that is recognized as indicating that the packet is a special visibility packet. Aside from the existence of the visibility tag marking the packet as a special visibility packet, the visibility tag may include other information, including without limitation information indicating the location of the drop or other issue (e.g. a node identifier, a specific processing stage, and/or other relevant information) and the type of drop or other issue that occurred.

A visibility tag may, for instance, be communicated as a sideband set of information that travels with the packet to the visibility queue (and/or some other collection agent). Or, a visibility tag may be stored inside the packet (e.g. within a field of the packet header, or by way of replacing the packet payload) and communicated in this way to an external element that consumes the tag. Any packet or portion of the packet (e.g. cell or subset of cells) that has an associated visibility tag is considered to be a visibility packet.

5.3. Visibility Queue

In an embodiment, one or more special queues, termed visibility queues, are provided to store packets containing visibility tags. A visibility queue may be represented as a queue, FIFO, stack, or any other suitable memory structure. Visibility packets may be linked to the visibility queue only (i.e. single path), when generated on account of packet corruption. Or, visibility packets may be duplicated to the visibility queue (i.e. copied or mirrored) such that the original packet follows its normal path, as well as traverses the visibility path.

Visibility queue data may be provided to various consuming entities within the node and/or network through a variety of mechanisms, depending on the embodiment. For example, a central processing unit within the node may be configured to read the visibility queue. As another example, traffic management logic may be configured to send some or all of the visibility packets directly to a central processing unit within the node as they are received, or in batches on a periodic basis. As yet another example, traffic management logic may similarly be configured to send some or all of the visibility packets to an outgoing interface, such as an Ethernet port, external CPU, sideband interface, and so forth. Visibility packets may be sent to a data collector, which may be one or multiple nodes (e.g. cluster of servers) for data mining. As yet another example, traffic management logic may similarly be configured to transmit some or all of the visibility packets to a healing engine, based on the visibility tag, for on-the-fly correction of specific error types.

5.4. Healing Engine

In an embodiment, certain error types may be correctable by taking action if certain criteria are satisfied. Hence, a healing engine within or outside of a node may be configured to access the visibility packets in the visibility queue. For instance, the healing engine may periodically read the visibility queue directly. Or, as another example, a node's forwarding logic may be configured to send the visibility packets (or at least those with certain types of visibility tags) to an external node configured to operate as a healing engine.

A healing engine inspects the visibility tags and/or the contents of those visibility packets it accesses. The healing engine may further optionally inspect associated data and input from the other parts of the node which tagged the packet (e.g. port up-down status). Based on rules applied to the visibility packet, or to a group of packets received over time, the healing engine is configured to perform a healing action.

For example, a forwarding table entry lookup failure for a packet may have triggered a corresponding visibility tag to be set for the packet, indicating that the forwarding table entry lookup failure occurred. The healing engine observes the visibility tag, either in the visibility queue or upon receipt from traffic management logic. The healing engine inspects the packet and determines that the forwarding table entry lookup failure may be fixed using a prescribed corrective action, such as adding an entry to the forwarding table. The healing engine then automatically performs this action, or instructs the node to perform this action.

The corrective set of actions for a tag are based on rules designated as being associated with the tag by either a user or the device itself. In at least one embodiment, the rules may be specified using instructions to a programmable visibility engine. However, other suitable mechanisms for specifying such rules may instead be used.

5.5. Example Process Flows

Figure 12:
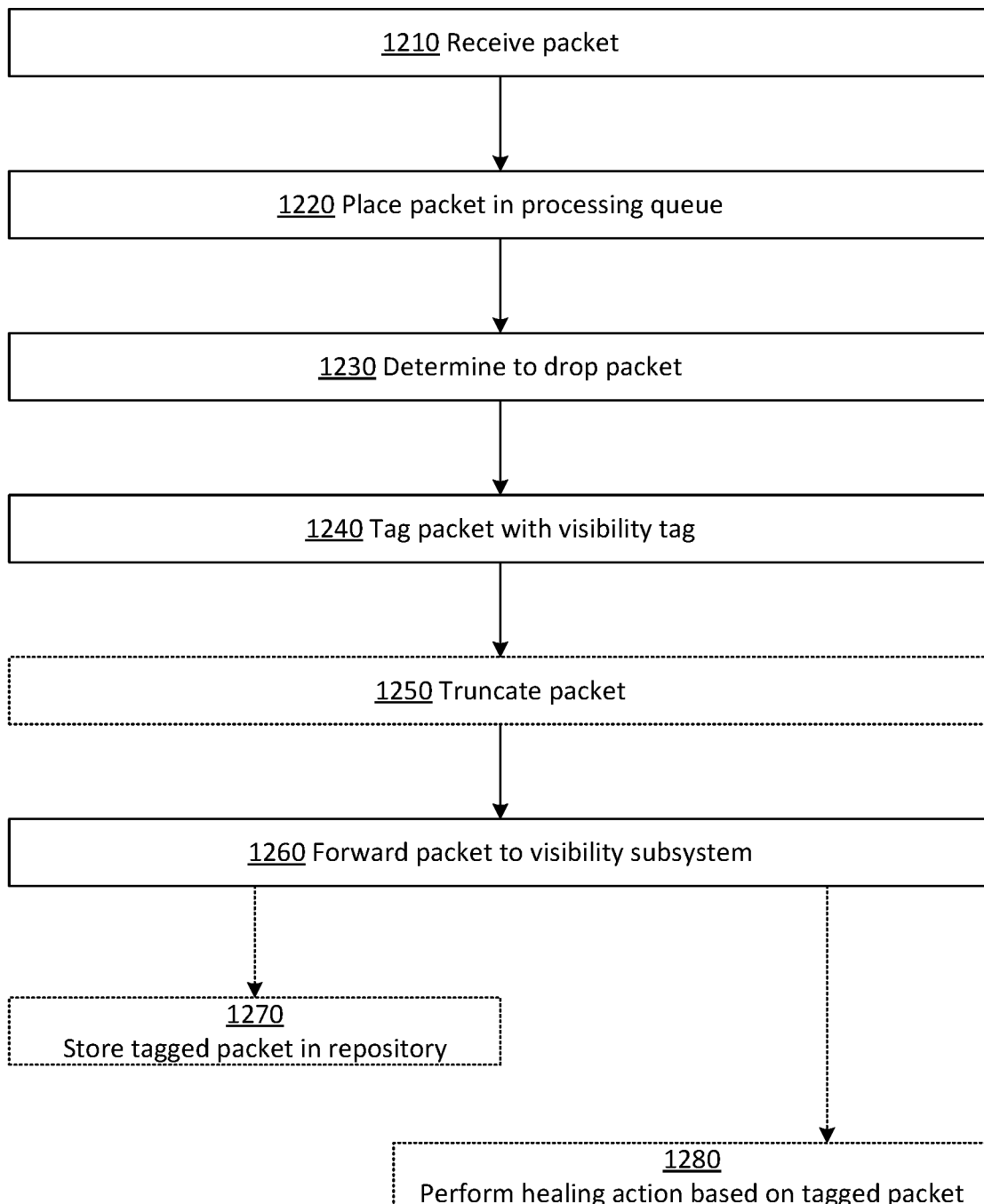
FIG. 12 illustrates an example flow for transforming dropped packets into visibility packets.
Figure 13:
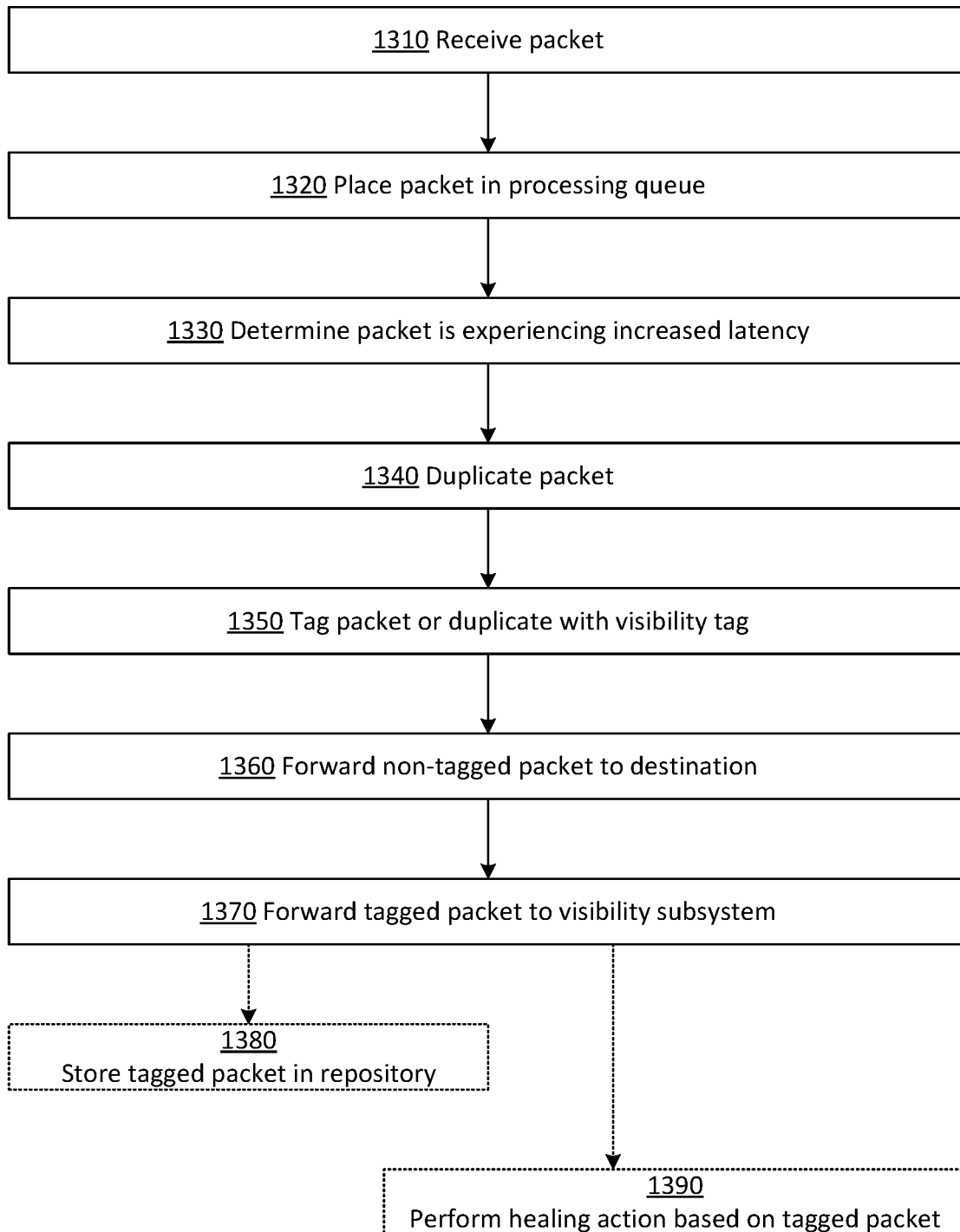
FIG. 13 illustrates an example flow for generating visibility packet for delayed packets.

FIG. 12 illustrates an example flow 1200 for transforming dropped packets into visibility packets, according to an embodiment. FIG. 13 illustrates an example flow 1300 for generating visibility packet for delayed packets, according to an embodiment. The various elements of flows 1200 and 1300 may be performed in a variety of systems, including systems such as system 100 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer. Depending on the embodiment, a device may be configured to perform flow 1200 or 1300 at least partially concurrently with other flows described herein, or a device may be configured only to perform flow 1200 and/or 1300.

Block 1210 comprises receiving a packet, such as a packet 205, at a device, such as device 200. Block 1220 comprises placing the packet in a processing queue while the packet awaits processing by the forwarding logic of the device. The queue may be selected based on a variety of characteristics of the packet, such as the ingress port through which it was received, the destination address of the packet, a type or class of the packet, a flow of the packet, and so forth. The packet may, in some embodiments, have already been processed in one or more other queues by one or more other stages of processing.

Block 1230 comprises determining to drop the packet. Such a determination may be made for a variety of reasons, such as described elsewhere herein. For instance, there may be a table lookup failure whereby the forwarding logic of the device cannot find a valid path for the packet's destination address in the device's forwarding table. Or, the packet itself may be corrupt, the packet may be delayed for more than a threshold amount of time, or there may simply be no available queues or buffers for handling or storing the packet.

The determination to drop the packet may be an implicit determination. That is, rather than explicitly determining to drop the packet, the forwarding logic may revert to performing blocks 1240-1280 by default when certain events, such as those mentioned above, occur. For instance, blocks 1240-1280 may correspond to a default or "catch-all" path in a forwarding table, that applies to any packets that the forwarding logic cannot resolve to other paths.

Block 1240 comprises tagging the packet with a visibility tag in response to the determination to drop the packet. The tagging of the packet effectively transforms the packet into a visibility packet.

Block 1240 may be performed for any packet that is to be dropped, or only for packets that meet other additional criteria. For example, block 1240 may only be performed for packets associated with certain flows, destinations, sources, packet types, service classes, and so forth. Additionally, or instead, qualifying packets may be selected only at a certain frequency (e.g. once a second, one out of every twenty dropped packets, etc.), which optionally may vary based on characteristics of the packet. Hence, block 1240 may be preceded by one or more steps of determining whether these additional criteria are met. Criteria may be fixed for the device, specified programmatically, and/or adjusted by logic internal to the device.

The forwarding logic may tag the packet with a visibility tag in any number of ways, depending on the embodiment. For example, the forwarding logic may annotate the header of the packet, replace some or all of the payload with the tag, or generate sideband information that is associated with an identifier of the packet or its corresponding buffer. The visibility tag may include a flag, label, or other identifier that is recognized as signifying that the packet is a visibility packet and should thus be handled by a visibility subsystem. The tag may optionally include other information to help diagnose problem(s) that may have led to the drop, such as an identifier of the processing queue to which the packet was assigned, an identifier of the network device, an error or drop type, related statistics, and so forth.

In an embodiment, not all of the packet need be tagged. For example, where different subunits of the packet may be processed independently (e.g. where the packet is subdivided into cells or frames) a start-of-packet subunit of the packet may be tagged. Other portions of the packet may be unaffected.

Block 1250 comprises optionally truncating the packet. This may involve, for example, truncating the packet to a certain size, or removing certain designated portions (such as any portion of the payload that does not correspond to the tag). Or, where separate subunits of the packet are processed individually (e.g. cells or frames), this may involve discarding subunits of the packet other than the start-of-packet subunits and optionally one or more following subunits.

Block 1260 comprises forwarding the tagged packet to a visibility subsystem. The visibility subsystem may take different forms in different embodiments. For example, in an embodiment, the visibility subsystem is internal to the network device that transformed the packet into a visibility packet. The packet is "forwarded" to the subsystem by being placed in (or linked to) a visibility queue, from which it is eventually read by the visibility subsystem. As another example, the visibility subsystem may be on a network device, designated as a "data collector," that is external to the device that transformed the packet into a visibility packet. After waiting in a visibility queue, the packet may be forwarded to the subsystem by encapsulating the packet within another header that targets the address at which the visibility subsystem is found. In yet other embodiments, there may be multiple visibility subsystems. For example, after performing some preliminary analysis, a device's internal visibility processing logic may forward all visibility packets that it has generated, or a sample of those visibility packets, to an external device for additional analysis.

The visibility subsystem may perform a variety of actions with visibility packets. Two non-limiting examples of such actions are illustrated in blocks 1270 and 1280. Block 1270 comprises storing the visibility packet in a repository. The repository may serve, for example, as a log which may be inspected by a network administrator to diagnose network problems. The repository may keep all visibility packets, or only those that meet certain filtering conditions specified by the network administrator. Visibility packets may be kept in the repository for a certain period of time, and/or aged out as necessary to make room for new visibility packets.

Block 1280 comprises performing one or more healing actions based on the tagged packet. Block 1280 presupposes that the visibility subsystem is a healing engine, or that the repository of block 1270 is monitored and analyzed by a healing engine. Actions may be taken solely on the basis of the tagged packet, or based on trends or metrics related to a number of similarly generated visibility packets.

A healing action may involve reconfiguring any aspect of the network in which flow 1200 is performed. For instance, the healing action may involve updating a forwarding table, adjusting a path weight, restarting a system, changing a policy or priority level for a flow or class of traffic, and so forth. In some cases—for example, if the healing engine is external to the device at which the visibility packet is generated—performing the healing action may involve sending an instruction to another device to update its configuration. Specific actions may be defined by various customizable rules stored at the healing engine.

Turning now to FIG. 13, flow 1300 begins with blocks 1310 and 1320, which are the same as blocks 1210 and 1220, respectively.

Block 1330 comprises determining that the packet is experiencing increased latency. The determination may be made based on timestamps associated with the packet itself, or may be inferred more generally based on metrics associated with device. That is, if a certain port to which the packet is to be forwarded is experiencing high levels of congestion, an increase in latency may be inferred for the packet.

Optionally, block 1330 may comprise determining whether additional criteria for transforming the packet into a visibility packet are met. For example, in addition to requiring increased latency, the forwarding logic of the device may check to see whether the packet has certain other specified characteristics, such as being associated with certain flows, destinations, sources, packet types, service classes, and so forth. Additionally, or instead, qualifying packets may be selected for transformation only at a certain frequency (e.g. once a second, one out of every twenty dropped packets, etc.), which optionally may vary based on characteristics of the packet.

In yet other embodiments, block 1330 may more generally be viewed as determining whether visibility transformation criteria, such as described above, apply. The existence of high latency may be viewed as but one of several criteria to be evaluated. The criteria may include evaluating for other events instead of or in addition to the packet experiencing increased latency. Criteria may be fixed for the device, specified programmatically, and/or adjusted by logic internal to the device.

Block 1340 comprises duplicating the packet. In an embodiment, the entire packet need not be duplicated, but rather only a certain portion of the packet may be duplicated (e.g. the first n bytes of the packet, the packet header, the start-of-packet, etc.).

Block 1350 comprises tagging the packet or duplicate packet with a visibility tag in response to the determination to drop the packet, as described with respect to block 1240. Since the packet and duplicate packet are the same, in an embodiment, it does not matter which packet is tagged. However, in embodiments where only a portion of the packet is duplicated, then the duplicate packet is tagged.

Block 1360 comprises forwarding the non-tagged packet to its specified destination. That is, unlike in flow 1200 where the packet is dropped, the packet of flow 1300 (or its duplicate) continues to be forwarded to its destination address.

Meanwhile, block 1370 comprises forwarding the tagged packet to a visibility subsystem, as described with respect to block 1260. Blocks 1380 and 1390 then correspond to blocks 1270 and 1280, respectively.

Flows 1200 and 1300 illustrates only one of many possible flows for the forwarding logic of an apparatus. Other flows may include fewer, additional, or different elements, in varying arrangements. For example, blocks 1250, 1270, and/or 1280 may be optional for flow 1200, while blocks 1380 and 1390 may be optional for flow 1300. As another example, a visibility subsystem may perform yet other actions than those identified in blocks 1270, 1280, 1380, and 1390.

As another example, the forwarding logic has been simplified to address only decisions related to visibility tagging. It will be recognized that a device's forwarding logic includes a number of other elements utilized for other purposes, and these elements may result in logical decisions that precede and obviate certain steps of flows 1200 and 1300, and/or that occur after some or all of the steps in flow 1200 or 1300.

6.0. Programmable Visibility Engines

What limited visibility is provided by switches and similar devices in complex networks is often rigid in implementation, requiring customers to request enhancements from the vendors of such devices. It is often difficult for the vendors to add requested capabilities to a device until the next release of the device, and moreover the capabilities may be of limited application and/or something that the customer wishes to keep proprietary for use only in their networks. The techniques described in this section, among other aspects, provide customers with flexibility to define metrics, create statistics that are specific to their applications, and/or program network devices to perform certain actions under prescribed conditions.

A computing construct referred to as a Programmable Visibility Engine ("PVE") is provided. The PVE receives instructions to execute one or more functions from a defined set of functions supported by the PVE. The PVE may be, for instance, a software-based engine executed by one or more general purpose processors within the node, or specialized hardware such as a special-purpose processor, FPGA, or ASIC (or a set of logic contained therein). By instructing the PVE, or a series of PVEs, to perform various functions, a customer may easily customize the capabilities of a switch or other device to support calculation and collection of arbitrary metrics, and performance of various actions in response to custom triggers.

In an embodiment, a node may have a fixed number of PVEs. These PVEs may be tied to input data from predefined areas of memories, or dynamically linked by the user to input data from different areas of memory. In other embodiments, a user may dynamically instantiate a number of PVEs within a node, and link those PVEs to desired areas of memory.

In an embodiment, a visibility subsystem such as, such as visibility subsystem 270, may be or comprise a set of one or more programmable visibility engines.

6.1. Example PVE Architecture

Figure 14:
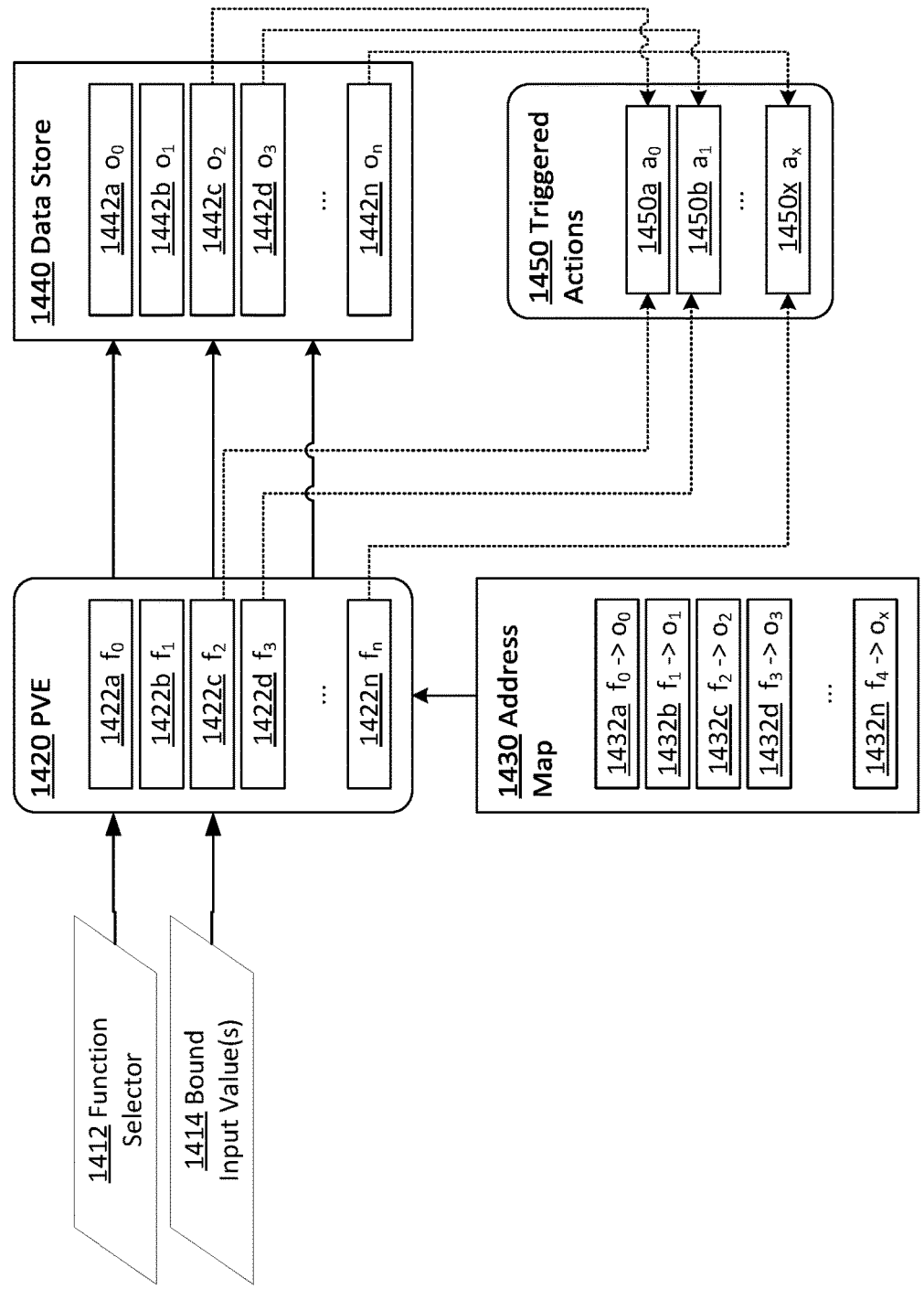
FIG. 14 is a block diagram illustrating an example architecture for a Programmable Visibility Engine.

FIG. 14 is a block diagram 1400 illustrating an example architecture for a PVE 1420, according to an embodiment. PVE 1420 may be implemented using one or more ASICs, FPGAs, or logic therein. PVE 1420 is configured to implement a defined set of functions 1422a-1422n, collectively functions 1422. Example of functions 1422 are described in subsequent sections.

PVE 1412 receives function selector input 1412, that specifies a specific subset of the functions 1422 that should be active at a given time. PVE 1420 is configured to repeatedly execute the selected functions 1422 over a number of execution cycles. The number of execution cycles may, in an embodiment, be limited to a number supplied by a counter (not shown). PVE 1420 executes each selected function 1422 once per execution cycle. PVE 1420 may receive function selector input 1412 as signals from another component, or may read the function selector input 1412 from a bound memory address at the start of each execution cycle (or at any other suitable time). Function selector input 1412 may change over time.

The selected functions 1422 are executed on one or more bound input values 1414. The bound input value(s) may be supplied by signals from another component, or PVE 1420 may read the one or more input values 1414 from a bound memory address. Each function 1422 may perform different calculations using the one or more input values 1422, or some functions 1422 may perform the same calculations. Some functions 1422 need not necessarily use all of the supplied input values 1412, or even any of the input values 1412.

PVE 1420 is configured to output data generated by execution of functions 1422 to at least one data store 1440. An address map 1430 includes mappings 1432 of specific functions 1422 to specific locations 1442 in the data store. Depending on the embodiment, a function 1422 may read and/or write to its mapped memory location 1442. Although memory locations 1442 are illustrated as a sequence of locations, each memory location 1442 may actually be any location within one or more data stores 1140, without regard to the locations 1442 mapped to other functions 1422. Moreover, in an embodiment, multiple functions 1422 may be mapped to the same memory location 1442. The address map 1430 may, in an embodiment, be altered dynamically by a user and/or by automated logic within the network device.

In an embodiment, some or all of functions 1422 may be linked to one or more triggered actions 1450. A triggered action 1450 is a specific set of processing logic, beyond simply writing to a data store 1420, that is to be performed when the result of a selected function 1422 is within some range or set of values. For example, if the result of a comparison function is 1, a linked action may be performed, while the linked action may not be performed if the result is 0. Or, a first linked action may be performed if the result of a function is in a first range, a second linked action may be performed if the result is in a second range, and no action may be performed otherwise.

The processing logic may be performed by the PVE 1420 directly, or PVE 1420 may be configured to send one or more instructions to another processing component to execute the linked action. In another embodiment, a separate component may be configured to periodically read values at locations 1442 and determine whether to perform linked actions 1450 based thereon.

Diagram 1400 illustrates only one of many possible arrangements of a system comprising a PVE. Other arrangements may include fewer, additional, or different components, and the division of work between the components may vary depending on the arrangement. For example, in some embodiments, at least some functions 1422 may not be mapped to memory locations 1442, and instead only trigger actions 1450 based on their respective calculations. In another embodiment, triggered actions 1450 are not linked to functions 1422 or even necessarily performed at all.

6.2. Example PVE Process Flow

Figure 17:
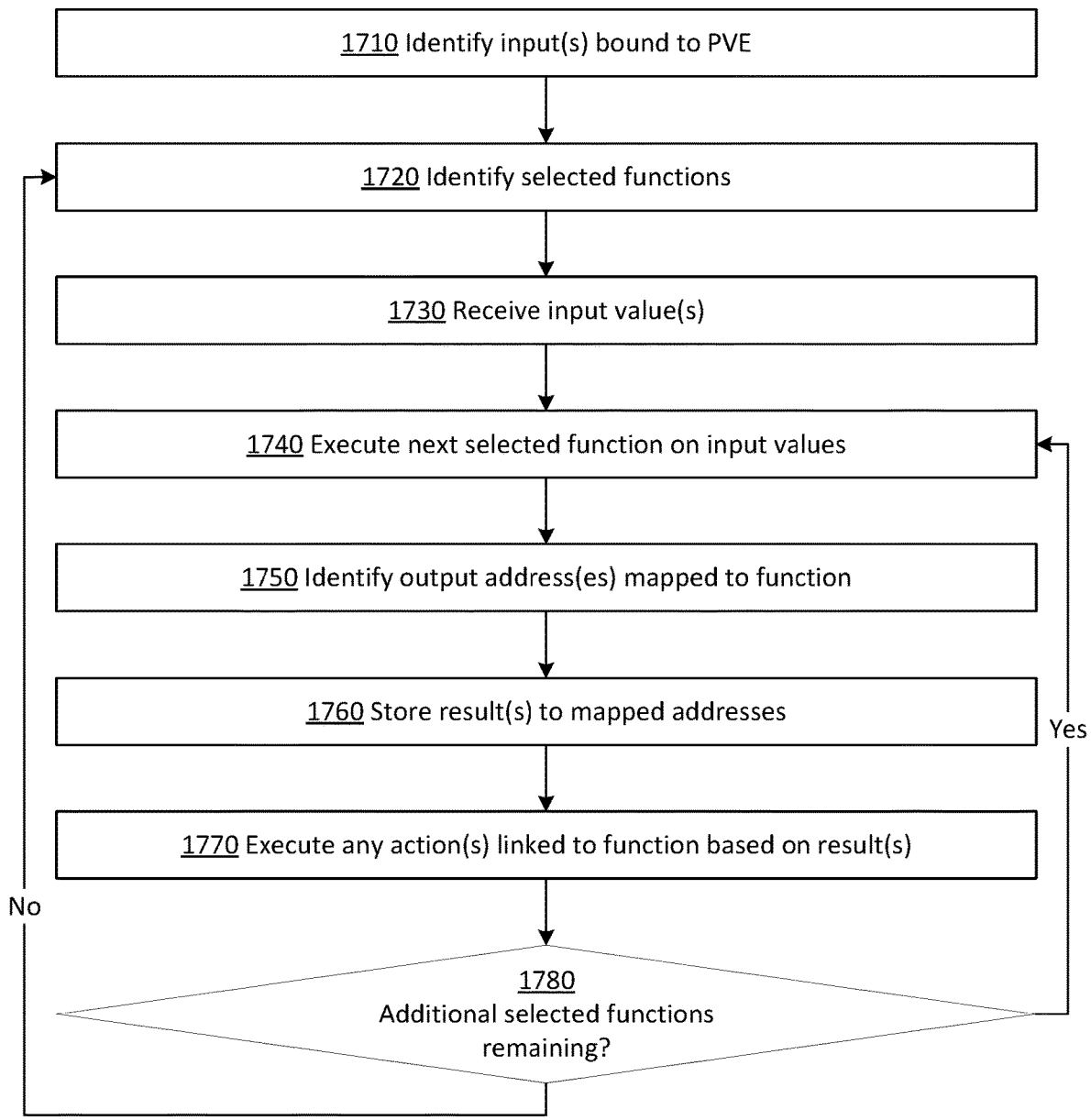
FIG. 17 illustrates an example flow for utilizing a Programmable Visibility Engine.

FIG. 17 illustrates an example flow 1700 for utilizing a PVE, such as PVE 1420, according to an embodiment. The various elements of flow 1700 may be performed in a variety of systems, including in network devices such as device 200 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 1710 comprises identifying one or more inputs bound to the PVE. The inputs may be signals from another component, bound addresses in memory, and/or combinations thereof.

Block 1720 comprises identifying one or more selected functions for the PVE to execute. The functions may be identified, for example, using function selection input such as a list of functions to be executed or bitmap. The function selection input may, in some embodiments, be part of the bound input identified in block 1710.

Block 1730 comprises receiving one or more input values from the one or more bound inputs. Receiving the value(s) may comprise, for instance, reading the values from memory or receiving signals from another component.

Blocks 1740-1780 are performed for each function that was selected in block 1720. Blocks 1740-1780 may be performed serially, in parallel, or partially serially and partially in parallel, depending on the architecture of the PVE.

Block 1740 comprises executing a next selected function. Depending on the function, none, some, or all of the input value(s) may be input into one or more calculations to produce one or more result values.

Block 1750 comprises identifying one or more memory addresses mapped to the executed function. Depending on the embodiment, the addresses may be specified by a memory address map and/or hard-coded. Block 1760 comprises writing the one or more result values to the one or more mapped addresses.

Block 1770 comprises executing any actions that are linked to the function based on the one or more result values. For example, if the result value is above a certain threshold, an action linked to the function may be triggered.

Block 1780 comprises determining whether any additional selected functions remain to be performed. If so, flow returns to block 1740. Otherwise, flow returns to block 1720 for the next execution cycle.

Flow 1700 illustrates only one of many possible flows for collecting state information through reflected packets. Other flows may include fewer, additional, or different elements, in varying arrangements. For example, in some embodiments, blocks 1750, 1760, 1770, and/or 1780 may be omitted for some or all functions, as well as any elements relied thereupon.

6.3. PVE Functions

The exact set of functions implemented by a PVE vary depending on the embodiment. Example functions supported by a PVE may include, without limitation, some or all of the following:

- an accumulate by value function that updates a data store by summing it with an input value (which may be positive or negative);
- a count function that updates a data store to indicate the number of times the count function has been called;
- a count function that updates a data store to indicate the number of times the count function has been called and then triggers a linked action;
- a compare function that compares an input value to some input threshold and either updates a data store to indicate true or false, or triggers an action based on the comparison;
- a count-and-compare function that updates a data store to indicate the number of times the function has been called and then triggers a linked action when the value of the data store surpasses an inputted threshold;
- an accumulate-and-compare function that updates a data store by summing it with an input value and then triggers a linked action when the value of the data store surpasses an inputted threshold; or
- a probabilistic (random) function that causes performance of an action when a randomly selected number surpasses some inputted probability threshold;
- an Exponentially Weighted Moving Average ("EWMA") function that accepts an input value V and uses it to update a weighted moving average A in a data store as follows: $A!=A+alpha(V-A)$, where alpha may be a predefined value or an input value between 0 and 1, and A! is the new value that replaces A in the data store;
- other statistical functions; or
- combinations of the foregoing.

A PVE may, at any given time, perform some, none, or all of the functions that it supports, depending on programmable function selection instructions stored in association with the PVE (either hard-coded, or specified by the user). In an embodiment, the PVE repeatedly executes a set of functions specified by the instructions over multiple iterations, occurring at periodic or other intervals (e.g. every clock cycle, every other clock cycle, etc.). In an embodiment, the instructions may be modified at any given time, which of course changes the functions performed in subsequent intervals. The PVE may execute some or all of the functions in the set in parallel. Alternatively, some or all of the functions may be executed in series. For instance, a subset of the functions may be executed in one clock cycle, followed by another subset in another clock cycle, until all of the functions specified by the instructions have been performed.

In an embodiment, the programmable function selection instructions that specify which functions to perform may take the form of a bitmap of size N, where N is the number of functions implemented by the PVE. In other words, there is a bit for each function. If the bit corresponding to a function is set to 1, the function is executed in each iteration. Otherwise the function is not executed. Of course, the programmable instructions may instead take any other suitable form.

In an embodiment, a count is specified for the PVE. The PVE is executed only for a number of iterations equal to the count, with the count being decremented in each iteration. Upon the count reaching 0, the PVE stops executing until some other process (e.g. a periodic reset process, or an action performed by another PVE) resets the count. A predefined value in the count may be used to indicate that the PVE is to be executed indefinitely.

6.4. PVE Inputs

Each PVE function may be bound to a specific data source, which may be one or more areas of memory from which it reads data, or one or more outputs from one or more other components of the node. For instance, a PVE function may be bound to various count columns in a table that tracks an amount of buffers currently used within a node for each of a plurality of different queues or resources within the node. Or, a PVE function may be bound to a data store in which another PVE outputs values. Different PVE functions may be bound to the same data source. In an embodiment, in fact, all PVE functions may be bound to the same column(s) of data in a table.

In an embodiment, an array of single-value or multi-value inputs is bound to a PVE. The PVE is configured to operate on each member of the array either in parallel or in series. For instance, the node may track statistics for each of a plurality of queues. The PVE may be executed with respect to each queue's statistics in parallel. Optionally, different members of the array may be associated with different sets of programmable instructions (e.g. different function bitmaps), such that different sets of functions are executed for at least some of the members of the array. Thus, from one perspective, the function selection instructions indicating which function(s) to perform is a portion of the input fed to the PVE when executing the PVE.

In an embodiment, data values may be passed through message processing logic prior to being input into a specific PVE function. Each function may have its own associated message processing logic. The message processing logic, in essence, prepares the values of the data source for consumption by the function. For instance, if the data source includes extra information not needed for a given function, the message processing logic may filter the data to only include relevant values. Or, if the input is not arranged in a format expected by the function, the message processing logic may be configured to restructure the data source's input.

6.5. PVE Outputs

The result of the function(s) performed by the PVE may be output to one or more areas of memory allocated to the PVE, referred to as data stores. Each function may be bound to a specific location or set of locations within the data store(s) of the PVE. These locations may be specified, for instance, in a special function-to-memory mapping associated with the PVE. A PVE function may both read and write to its bound location(s) within data store.

In an embodiment, only a certain number of memory accesses are permitted by the PVE during a given clock cycle. If the functions selected for execution would require more memory accesses than permitted, the PVE may utilize a function prioritization scheme to determine which functions actually get to access the data store. For instance, each function may be assigned a predefined, or user configurable, prioritization level. The functions are ranked, with the highest priority functions given first access to the data store. Once the limit on memory access is reached, the other functions requiring memory access are not executed, or executed on a delayed basis.

6.6. PVE Actions

In an embodiment, beyond outputting data, a user may associate a PVE with one or more defined actions. In an embodiment, the output(s) of a PVE may trigger performance of different actions. For instance, in a simple embodiment, if a non-zero value is output by a function that the user associates with an action, the action is performed. More complicated rules for determining when to perform a function exist, such as comparing the value(s) output by the PVE to various thresholds and executing actions associated with those thresholds. In an embodiment, a PVE function does not output a value at all, but rather performs different actions (or no actions) in accordance with conditional logic in the function executed by the PVE.

Any suitable action may be linked to a function. Examples of actions include, without limitation: dropping a packet, issuing flow control, marking a packet for rate control, sampling a packet and sending it to a special processor for analysis, duplicating (or mirroring) a packet and sending it to a data collector component, sending information to a healing engine.

6.7. Multi-Layer PVEs

A PVE may be chained, or layered, together with one or more additional PVEs, such that the output of one PVE serves as the input of another PVE. In this manner, a user may utilize function composition (e.g. f(g(x)) to define rich metrics in arbitrary manners. For example, a second PVE may operate as an aggregator of outputs generated by functionality from a first PVE, thus enabling functions such as averaging, sums, and so forth.

In an embodiment, feedback layering of PVEs is supported, such that the outputs of PVE provide feedback to other PVEs. In this manner, PVEs may behave as control algorithms. For example, the output of one PVE may determine how or even whether another PVE executes a particular one of its functions. As another example, feedback layering may allow for implementation of complex control algorithms that enable the node to respond to unexpected conditions and self-heal.

Example Multi-Layered PVEs

Figure 15:
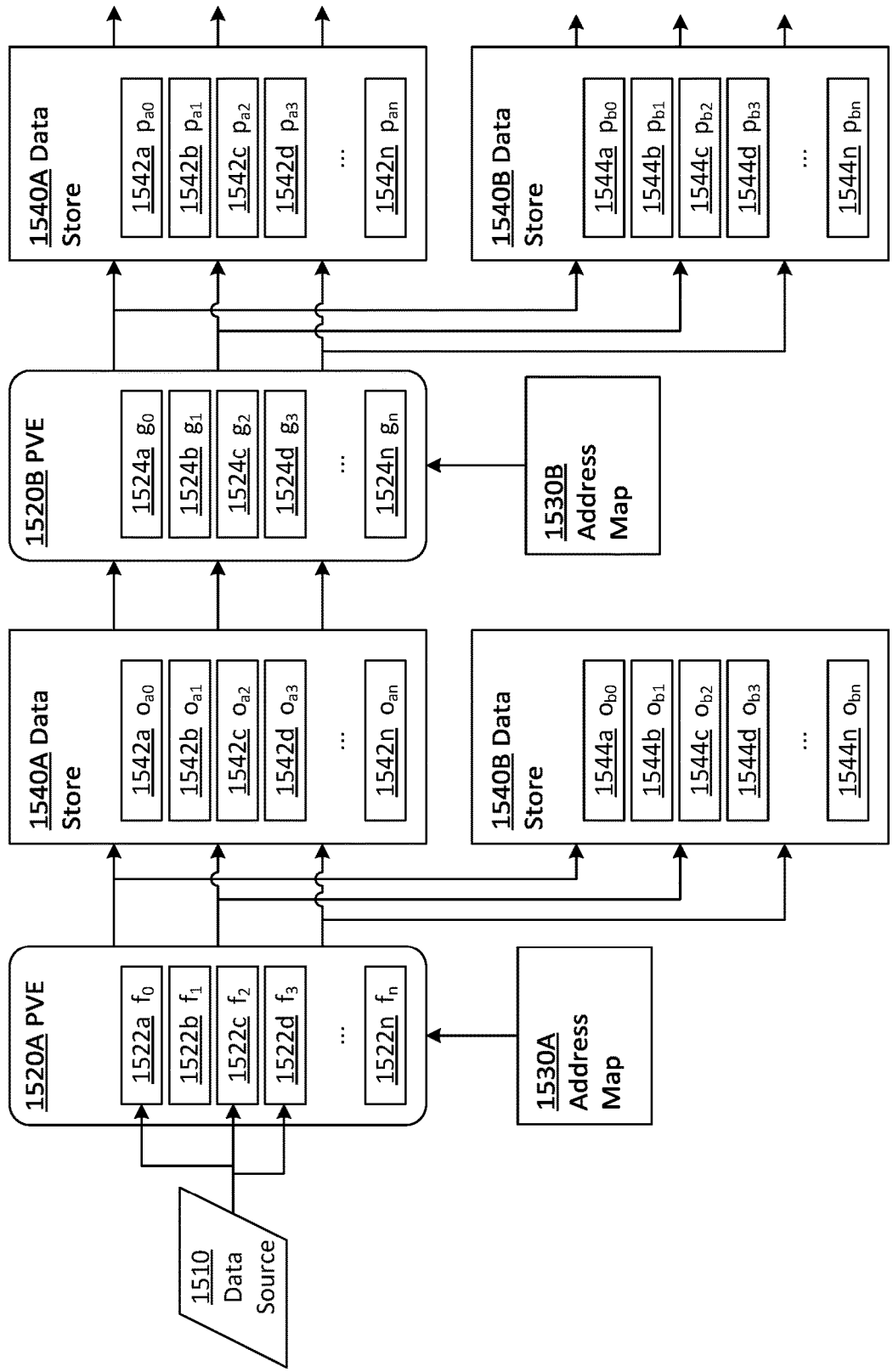
FIG. 15 is a block diagram illustrating an example of layered Programmable Visibility Engines.

FIG. 15 is a block diagram 1500 illustrating an example of layered PVEs, according to an embodiment. Two PVEs are illustrated: PVE 1520A and PVE 1520B. PVE 1520A implements logic for performing a set of functions 1522*a-n*, collectively functions 1522. PVE 1520B implements logic for performing a set of functions 1524*a-n*, collectively functions 1524, which may be the same set of functions, or a different set of functions.

For illustrative purposes, each PVE 1520 is associated with two output data stores, 1540A and 1540B, comprising entries 1542 or 1544, respectively. The total number of depicted entries in each data store 1540 is the same as the number of functions 1522 and 1524. However, in other embodiments, a PVE may have any number of associated data stores 1540, each with any number of entries 1542/1544. PVEs 1520A and 1520B are also associated with address map 1530A and 1530B, respectively. Like address map 1430, each address map 1530 indicates, for each of the functions 1522/1524 of the associated PVE 1520, which data addresses 1542/1544 in the data stores 1540 are mapped to the function.

PVE 1520A is bound to input from the input data source 1510 depicted on the far left. The data source 1510 may in fact be any suitable data source, such as tables within the node, output data stores from other PVEs (possibly including those of PVE 1520B), or output from another component of the node.

Three arrows leading from this data store to various functions of PVE 1520A, illustrating that the data from the data store is being fed into three different functions (1522*a*, 1522*c*, and 1522*d*) executed by PVE 1520A, while the rest of the functions 1522 are not being executed. These three functions may have been selected, for example, by instructions associated with the PVE 1520A or the data source 1510 currently being processed, such as a function bitmap or interpreted code. The selection may or may not be different for different data entries in data source 1510 and/or for different iterations of executing PVE 1520A, depending on the embodiment.

PVE 1520B is bound to input from PVE 1520A's data stores 1540A/1540B. That is, the output of PVE 1520A becomes the input of PVE 1520B. The exact set of functions executed by PVE 1520B is not illustrated, though of course any combination of one or more of the functions 1524 may be executed with respect to the data output by PVE 1520A.

Though not depicted, PVE 1520A and/or PVE 1520B may optionally trigger the performance of actions specified by a user.

Diagram 1500 illustrates only one of many possible arrangements of a system comprising layered PVEs. Other arrangements may include fewer, additional, or different components, and the division of work between the components may vary depending on the arrangement. For example, in other embodiments, any number of PVEs may be chained together. Moreover, different PVEs may write to different data stores.

6.8. Implementing WRED with PVEs

One common congestion management algorithm implemented within computer networks is Weighted Random Early Detection (WRED). According to an embodiment, this algorithm may be implemented using a series of PVEs arranged in similar manner to that depicted in FIG. 15. For example, the data source for PVE 1520A may be an array comprising, for each queue of a group of queues (Q1 to QN), a congestion value, threshold information, a function bitmap, and optionally a count of a number of times PVE 1520A should be called. The array is processed by PVE 1520A serially, in parallel, or partially serially and partially parallel. The array is further processed repeatedly over time, as the values with the array change.

Figure 16:
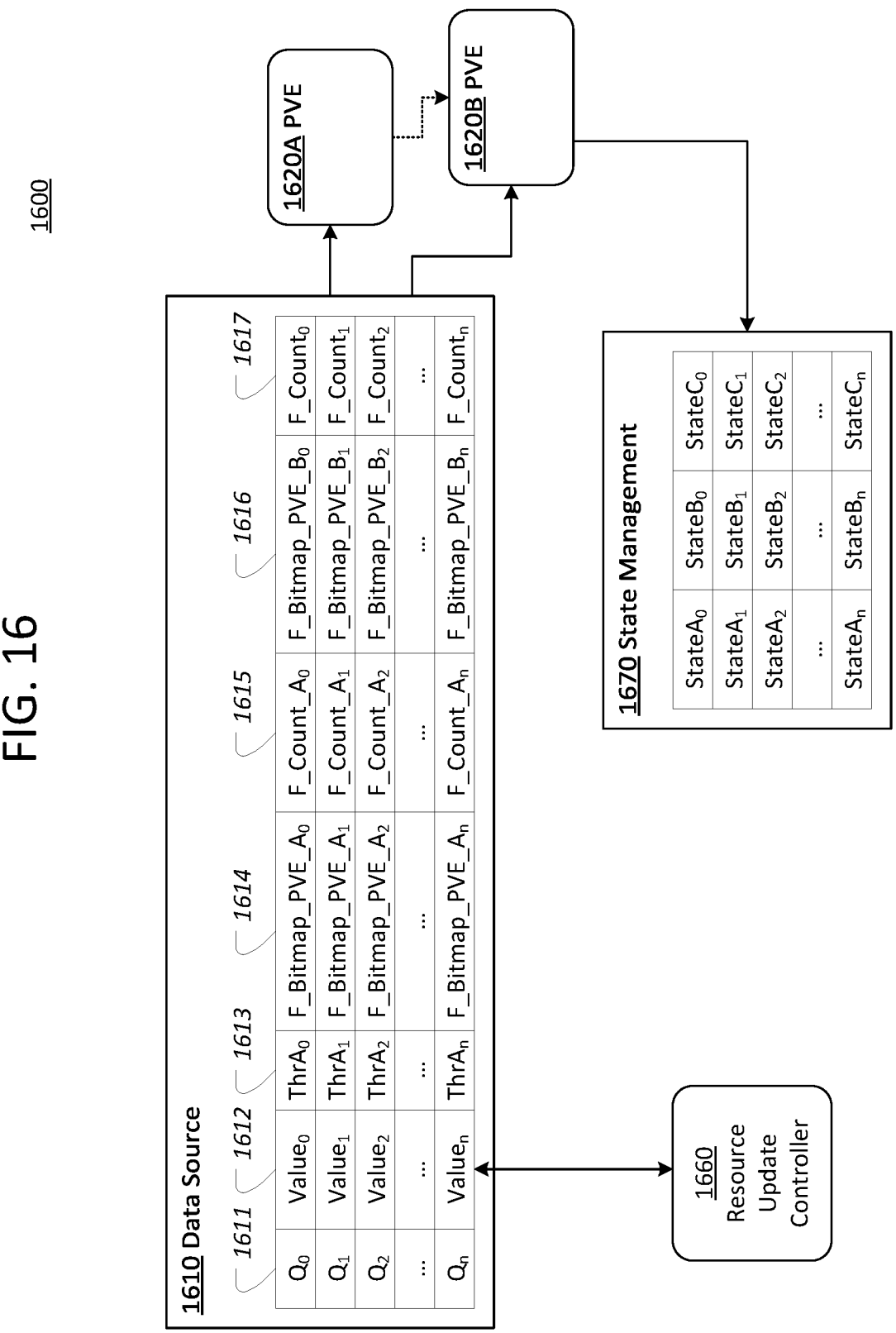
FIG. 16 is a block diagram of an input data source suitable for implementing Weighted Random Early Detection using a layered Programmable Visibility Engines.

FIG. 16 is a block diagram of an input data source 1610 suitable for implementing WRED using layered PVEs 1620A and 1620B, according to an embodiment. PVEs 1620A and 1620B may be, for example, PVES 1520A and 1520B, respectively.

Input data source 1610 is depicted as a table comprising an entry for each queue 1611, though of course the input data may in fact take a variety of other formats, including multiple tables, signals sent over time, and so forth. For each queue, the input data source 1610 includes a resource value 1612, such as an estimated queue size, and one or more threshold values 1612 used to determine whether the queue is in various states. According to an embodiment, the input values 1612 and thresholds 1613 may be derived from those found in a bifurcated counting table, such as described in U.S. application Ser. No. 14/958,830 (filed Dec. 3, 2015) and Ser. No. 14/973,541 (filed Dec. 17, 2015), the entire contents of both of which are hereby incorporated by reference as if set forth in their entirety herein. However, any other suitable values may be utilized.

Data source 1610 further comprises, for each queue, a function bitmap 1614 for PVE 1520A and function bitmap 1616 for PVE 1520B. The function bitmaps 1614/1616 select which functions of PVEs 1620 are to be executed.

Data source 1610 further comprises counts 1615 and 1617 for each queue 1611. In an embodiment, counts 1615 and 1617 may be decremented each time the entry for the associated queue 1611 is processed by the corresponding PVE 1620. When counts 1615/1617 reach 0, the corresponding PVEs 1620 are no longer executed, until such a time as an external process (or potentially another PVE) resets the counts 1615/1617. In this manner, the layered PVEs 1620 may be utilized to perform diagnostic testing, statistics collection, healing measures, or other actions on a specific queue 1611 for a limited amount of time, and then idled until needed again.

Note that the function bitmaps 1614/1616 and counts 1615/1617 for each queue 1611 may be the same, or different. Depending on the embodiment, the PVEs 1620 may process the entry for each queue 1611 serially, or as a group of up to n queues.

According to an embodiment, the functions selected for PVE 1620A are used, among other aspects, to compute the exponentially weighted moving average (EWMA) queue size. For instance, PVE 1620A may be instructed to perform an EWMA function on each queue 1611, with current size value of queue being the input value 1612 from the table. PVE 1620A writes the EWMA to entries in the data store entry that is assigned to the EWMA function.

PVE 1620B is also bound to input data from the data source, including its own function bitmap 1616 and optional count 1617. PVE 1620B is also bound to the outputs from PVE 1620A. PVE 1620B is instructed to execute a comparison function, comparing the EWMA of each queue 1611 (as output by PVE 1620A) to the threshold information of each queue. PVE 1620B outputs an operating region based on the comparison, which may take one of three different values. Different actions are associated with the output regions. A first region indicates that no drop is to occur, since no congestion is present. A second region indicates that random drops are occur. That is, a probabilistic drop is performed to prevent the queue 1611 from becoming saturated. A third region indicates a tail drop. All packets are to be dropped because the queue 1611 is saturated. PVE 1620B sends an instruction to perform the relevant action to a traffic manager within the node, and the relevant information may also be written to a state table 1670 for the queue 1611.

6.9. Implementing Heatmaps with PVEs

Another example use of PVEs is generating a congestion heat map, such as described in U.S. application Ser. No. 14/973,541 (filed Dec. 17, 2015). In this case, a two-layer PVE is used to identify top buffer consumers based on destination and, for a subset of destinations, top consumers based on source.

A first PVE, PVE1, identifies top consumers based on destination for a given resource. PVE1 does this by processing, at intervals, the statistics collected for a particular resource (e.g. egress partition buffers). State updates for egress ports that have consumed the most resources are output to a second PVE, PVE2. That is, a compare function is utilized to determine which ports have the highest values (e.g. over a threshold), and states are written only for those ports. PVE1 outputs each of the relevant egress port congestion states as 2-bit values into a PVE1 data store.

PVE2 identifies top consumers based on a source for a given resource, grouped by destination. PVE2 stores each egress port's congestion state as a 2-bit value into a PVE2 data store to an address that is determined based on the update's source port.

Of course, PVEs are highly flexible and may be used to implemented a variety of calculations and algorithms. The examples given above are intended solely to illustrate some of the many applications PVEs, and the uses of PVEs are not limited to these examples.

7.0. Example Embodiments

Examples of some embodiments are represented, without limitation, in the following clauses:

According to an embodiment, a system comprises a network of nodes, each of the nodes being a network device configured to send, receive, and forward packets over the network, the nodes including: load-balancing nodes configured to load balance network traffic over network paths through which the load-balancing nodes send packets, the load-balancing based on weights that the load-balancing nodes dynamically adjust in accordance to metrics associated with the network paths; annotating nodes configured to annotate selected packets with state information as the selected packets traverse through the annotating nodes; collection nodes, configured to collect annotated packets and record and/or generate the metrics associated with the network paths based on the state information in the reflected packets.

In an embodiment, the load-balancing nodes are configured to load-balance based on the weights using Weighted Cost MultiPathing ("WCMP").

In an embodiment, the system further comprises: reflecting nodes configured to reflect certain of the selected packets back to the load-balancing nodes from which the selected packets were respectively sent and/or forwarded, or to collection nodes associated with the load-balancing nodes.

In an embodiment, a given node in the network may function as any one or more of the load-balancing nodes, annotating nodes, reflecting nodes, and/or collection nodes depending on whether the given node is sending, receiving, or forwarding network traffic, wherein at least some of the nodes in the network function as both load-balancing nodes and collection nodes, and wherein at least some of the nodes in the network function as both annotating nodes and reflecting nodes.

In an embodiment, the load-balancing nodes are configured to inject probe packets into the network for the purpose of obtaining updated state information for the network paths, wherein the annotating nodes are configured to select the probe packets for annotation, and wherein the reflecting nodes are configured to reflect the probe packets.

In an embodiment, the reflected packets are copies of packets, the reflecting nodes forwarding at least some of the packets from which the reflected packets are copied on to intended destinations of those packets; and the annotating nodes are configured to select packets to annotate based upon measures of delay or congestion associated with the annotating nodes and/or the packets, and/or wherein the reflecting nodes are configured to select packets to reflect based upon measures of delay or congestion associated with the annotating nodes and/or the packets.

According to an embodiment, a method comprises: identifying paths from a network device to a destination within a network; assigning weights to each of the paths; determining to send particular packets from the network device to the destination; selecting, from the identified paths, particular paths along which to send the particular packets from the network device using load-balancing based at least partially upon the weights; dynamically adjusting the weights based on metrics associated with the paths.

In an embodiment, the method further comprises at least one of receiving the metrics from one or more other nodes in the network or calculating the metrics based on feedback received from one or more other nodes in the network.

In an embodiment, the method further comprises: receiving at least some of the particular packets reflected back from one or more reflecting nodes along the one or more of the paths; identifying the metrics based upon data annotated to the reflected particular packets.

In an embodiment, the reflected packets are particular packets that have been generated by the network device for the purpose of probing the network.

In an embodiment, the reflected packets are selected packets from the particular packets that the network device annotated with a special identifier or flag before sending the selected packets to the address.

In an embodiment, the metrics include one or more of: measures of path delays derived from the data annotated to the reflected particular packets, or measures of congestion associated with nodes in the paths derived from the data annotated to the reflected particular packets.

In an embodiment, the frequency with which a first path of the paths is selected relative to a second path of the paths is based in part on a size of a first weight of the first path relative to a size of a second weight.

In an embodiment, the method further comprises: assigning each of the paths to a different set of buckets, the set of buckets assigned to a given path being proportional, in number, to a given weight assigned to the given path; reassigning buckets to different paths as the weights are adjusted to keep the set of buckets assigned to a given path proportional, in number, to a given weight assigned to the given path; wherein selecting the particular paths comprises, for a given packet of the particular packets: determining a key for the given path based on contents of the given packet; determining a bucket that is mapped to the key; determining a specific path assigned to the bucket; selecting to send the specific packet along the given path.

In an embodiment, the buckets are each separate entries in a multipath forwarding table.

In an embodiment, the method further comprises: for each bucket of the buckets, storing a last sent time that the network device last handled a packet whose key mapped to the bucket; waiting to reassign a given bucket that has been designated for reassignment on account of the adjusted weights until the last sent time stored for the bucket is older than a threshold age.

In an embodiment, if the last sent time of the given bucket does not become older than the threshold age within a certain amount of time after the given bucket has been designated for reassignment, the reassignment of the bucket is canceled.

In an embodiment, determining to send the particular packets to the destination comprises determining that one or more destination addresses of the particular packets is reachable via another network device at the destination.

According to an embodiment, an apparatus comprises: a path identification component configured to identify paths from the apparatus to a destination within a network; a weight assignment component configured to assign weights to each of the paths, and further configured to dynamically adjust the weights based on metrics associated with the paths; a forwarding component configured to determine to send particular packets from the apparatus to the destination; and a load balancing component configured to select, from the identified paths, particular paths along which to send the particular packets from the apparatus, based at least partially upon the weights.

In an embodiment, the apparatus further comprises a metric collection component configured to receive the metrics from one or more other nodes in the network and/or calculate the metrics based on feedback received from one or more other nodes in the network.

In an embodiment, the apparatus is further configured to receive at least some of the particular packets reflected back from one or more reflecting nodes along the one or more of the paths; and identifying the metrics based upon data annotated to the reflected particular packets.

In an embodiment, the metrics include one or more of: measures of path delays derived from the data annotated to the reflected particular packets, or measures of congestion associated with nodes in the paths derived from the data annotated to the reflected particular packets.

In an embodiment, the weight assignment component is further configured to: assign each of the paths to a different set of buckets, the set of buckets assigned to a given path being proportional, in number, to a given weight assigned to the given path; reassign buckets to different paths as the weights are adjusted to keep the set of buckets assigned to a given path proportional, in number, to a given weight assigned to the given path; wherein selecting the particular paths comprises, for a given packet of the particular packets: determining a key for the given path based on contents of the given packet; determining a bucket that is mapped to the key; determining a specific path assigned to the bucket; selecting to send the specific packet along the given path.

In an embodiment, the weight assignment component is further configured to: for each bucket of the buckets, store a last sent time that the network device last handled a packet whose key mapped to the bucket; wait to reassign a given bucket that has been designated for reassignment on account of the adjusted weights until the last sent time stored for the bucket is older than a threshold age.

According to an embodiment, a system comprises a network of nodes, each of the nodes being a network device configured to send, receive, and forward packets over the network, the nodes including: sending nodes configured to send and/or forward packets over network paths within the network; annotating nodes configured to annotate selected packets with state information as the selected packets traverse through the annotating nodes; reflecting nodes configured to reflect certain of the selected packets back to the sending nodes from which the selected packets were respectively sent and/or forwarded, or to collection nodes associated with the sending nodes; the collection nodes, configured to collect reflected packets and record and/or generate metrics based on the state information annotated to the reflected packets; action nodes, configured to reconfigure one or more settings affecting traffic flow on the network based on the metrics.

In an embodiment, a given node in the network may function as any one or more of the sending nodes, annotating nodes, reflecting nodes, collection nodes, and/or action nodes, depending on whether the given node is sending, receiving, or forwarding network traffic, wherein at least some of the nodes function as both sending nodes and collection nodes, and wherein at least some of the nodes function as both annotating nodes and reflecting nodes.

In an embodiment, the reflected packets are copies of packets, the reflecting nodes forwarding at least some of the packets from which the reflected packets are copied on to intended destinations of those packets; and the annotating nodes are configured to select packets to annotate based upon measures of delay or congestion associated with the annotating nodes and/or the packets, and/or wherein the reflecting nodes are configured to select packets to reflect based upon measures of delay or congestion associated with the reflecting nodes and/or the packets.

In an embodiment, the state information includes one or more of a measure of delay along a path in the network, a measure of congestion at a node, a switch identifier, a timestamp, a buffer or queue fill level, or a buffer use count.

In an embodiment, reconfiguring the one or more settings includes adjusting a rate associated with a particular traffic flow or adjusting a cost associated with a node or a link between nodes.

In an embodiment, intermediate nodes between the reflecting nodes and the collecting nodes are configured to prioritize the reflected packets.

In an embodiment, a given reflecting node is configured to reflect a tunneled packet in a tunnel, the tunnel being from a tunnel source node to a tunnel destination node, the given reflecting node not being the tunnel destination node, the given reflecting node configured to tunnel the reflected tunneled packet back to the tunnel source node, the tunnel source node being configured to forward the reflected tunneled packet to a given collection node.

According to an embodiment, a method comprises: receiving packets at a first network device; for a first set of the packets, each packet in the first set meeting annotation criteria, annotating the packets in the first set with state information associated with the first network device; for a second set of the packets, each packet in the second set meeting reflection criteria, each packet in the second set having been annotated with state information associated with the first network device and/or one or more other network devices in a path through which the packet has traveled, reflecting the packets in the second set back to one or more collection points along paths through which the packets in the second set have respectively travelled; for a third set of the packets, including at least some of the packets in the first set, forwarding the packets in the third set to respective destinations identified by the packets in the third set.

In an embodiment, the third set also includes at least some of the packets in the second set.

In an embodiment, the annotation criteria and/or the reflection criteria include one or more of: whether a packet to be annotated is marked as a probe packet or a reflected packet, whether the packet to be annotated belongs to a particular traffic flow or queue, whether a measure of delay associated with the packet to be annotated exceeds a certain threshold, whether a measure of congestion at the first network device exceeds a certain threshold, and/or an annotation frequency.

In an embodiment, annotating a given packet of the packets comprises one or more of: inserting a measure of delay or a measure of congestion associated with the first network device into a header of the given packet; or updating a measure of delay in the header of the given packet by adding a measure of delay associated with the first network device to a measure of delay previously annotated to the packet.

In an embodiment, the state information includes one or more of a measure of delay at the first network device, a measure of congestion at the first network device, a switch identifier, a timestamp, a buffer or queue fill level, or a buffer use count.

In an embodiment, reflecting a given packet comprises copying the given packet and sending the copy of the given packet back along a path from which the given packet came, the given packet being forwarded onward to a destination identified by the given packet.

In an embodiment, reflecting a given packet comprises removing at least a portion of a payload of the given packet or of a copy of the given packet.

In an embodiment, for a given packet in the second set, the collection point to which the given packet is reflected is a second network device through which the given packet traveled on its way to the first network device.

In an embodiment, the method further comprises: for a fourth set of packets, each packet in the fourth set marked as a reflected packet, performing one or more of: expediting forwarding of the packets in fourth set, bypassing reflection logic on the packets in the fourth set to ensure that the packets in the fourth set are not reflected again, annotating the packets in the fourth set with state information, or taking one or more actions based at least partially upon state information annotated to the packets in the fourth set.

In an embodiment, the method further comprises reflecting a given packet that is in a tunnel by tunneling the given packet back to a source device at which the tunnel began.

According to an embodiment, an apparatus comprises: one or more communication interfaces configured to send, receive, and forward packets; annotation logic configured to, for a first set of the packets, each packet in the first set meeting annotation criteria, annotate the packets in the first set with state information associated with the first network device; reflection logic configured to, for a second set of the packets, each packet in the second set meeting reflection criteria, each packet in the second set having been annotated with state information associated with the first network device and/or one or more other network devices in a path through which the packet has traveled, reflect the packets in the second set back to one or more collection points along paths through which the packets in the second set have respectively travelled; forwarding logic configured to, for a third set of the packets, including at least some of the packets in the first set, forward the packets in the third set to respective destinations identified by the packets in the third set.

In an embodiment, the annotation criteria and/or the reflection criteria include one or more of: whether a packet to be annotated is marked as a probe packet or a reflected packet, whether the packet to be annotated belongs to a particular traffic flow or queue, whether a measure of delay associated with the packet to be annotated exceeds a certain threshold, whether a measure of congestion at the first network device exceeds a certain threshold, and/or an annotation frequency.

In an embodiment, annotating a given packet of the packets comprises one or more of: inserting a measure of delay or a measure of congestion associated with the first network device into a header of the given packet; or updating a measure of delay in the header of the given packet by adding a measure of delay associated with the first network device to a measure of delay previously annotated to the packet.

In an embodiment, reflecting a given packet comprises copying the given packet and sending the copy of the given packet back along a path from which the given packet came, the given packet being forwarded onward to a destination identified by the given packet.

In an embodiment, reflecting a given packet comprises removing at least a portion of a payload of the given packet or of a copy of the given packet.

In an embodiment, for a given packet in the second set, the collection point to which the given packet is reflected is a second network device through which the given packet traveled on its way to the first network device.

In an embodiment, the apparatus further comprises reflection handling logic configured to, for a fourth set of packets, each packet in the fourth set marked as a reflected packet, perform one or more of: expediting forwarding of the packets in fourth set, bypassing reflection logic on the packets in the fourth set to ensure that the packets in the fourth set are not reflected again, annotating the packets in the fourth set with state information, or taking one or more actions based at least partially upon state information annotated to the packets in the fourth set.

In an embodiment, the reflection logic is configured to reflect a given packet that is in a tunnel by tunneling the given packet back to a source device at which the tunnel began.

In an embodiment, the state information includes one or more of a measure of delay at the first network device, a measure of congestion at the first network device, a switch identifier, a timestamp, a buffer or queue fill level, or a buffer use count.

According to an embodiment, an apparatus comprises: one or more communication interfaces configured to receive packets from one or more devices over a network; queue management logic configured to queue the packets in one or more processing queues while the packets await processing by forwarding logic; the forwarding logic, configured to: process first packets of the packets and, based thereon, forward the first packets to destinations identified by the first packets; determine that a particular packet of the packets is to be dropped from a particular processing queue without being forwarded to a particular destination identified by the particular packet; in response to the determining that the particular packet is to be dropped, tag the particular packet with a visibility tag; forward the particular packet, with the visibility tag to, to a visibility subsystem instead of the particular destination.

In an embodiment, tagging the particular packet comprises embedding the visibility tag in a header of the particular packet or replacing a payload of the particular packet. In an embodiment, tagging the particular packet comprises associating the particular packet with sideband information that forms the visibility tag.

In an embodiment, the visibility tag includes at least an identifier of the network device or an identifier of the particular processing queue.

In an embodiment, tagging the particular packet comprises tagging one or more cells at the start of the particular packet, the forwarding logic further configured to discard one or more cells at the end of the particular packet before forwarding the particular packet to the visibility subsystem.

In an embodiment, the visibility subsystem is a data collector executing external to the network device. In an embodiment, the visibility subsystem is a visibility packet processor within the network device, wherein forwarding the particular packet comprises moving the particular packet to a visibility queue associated with the visibility packet processor.

In an embodiment, the visibility subsystem is configured to store the particular packet in a repository of visibility packets.

In an embodiment, the visibility subsystem is a healing engine, the healing engine configured to: input a plurality of tags tagged with the visibility tag; based on the plurality of tags, reconfigure the network device.

In an embodiment, reconfiguring the network device comprises updating a forwarding table of the network device.

In an embodiment, determining that the particular packet of the packets is to be dropped comprises one or more of: determining that the particular packet is corrupt, determining that a forwarding table look-up failure occurred with respect to a destination specified by the particular packet, determining that a resource constraint prevents the network device from using a particular resource to forward the particular packet, determining that the particular packet is experiencing a certain amount of latency, or determining that a policy prevents the network device from forwarding the particular packet.

According to an embodiment, an apparatus comprises: one or more communication interfaces configured to receive packets from one or more devices over a network; queue management logic configured to queue the packets in one or more processing queues while the packets await processing by forwarding logic; the forwarding logic, configured to: process first packets of the packets and, based thereon, forward the first packets to destinations identified by the first packets; determine that a particular packet of the packets, in a particular processing queue, is undergoing inflated latency, the particular packet addressed to a particular destination; in response to the determining that the particular packet is experiencing inflated latency, duplicate the particular packet; tag the particular packet or the duplicate particular packet with a visibility tag; forward the tagged packet, with the visibility tag to, to a visibility subsystem instead of the particular destination; forward the other of the particular packet or the duplicate particular packet to the particular destination.

In an embodiment, the visibility subsystem is a healing engine, the healing engine configured to: input a plurality of tags tagged with the visibility tag; based on the plurality of tags, reconfigure the network device.

In an embodiment, tagging comprises tagging one or more cells at the start of the tagged packet, the forwarding logic further configured to discard one or more cells at the end of the tagged packet before forwarding the tagged packet to the visibility subsystem.

According to an embodiment, a method comprises: receiving, at a network device, packets from one or more devices over a network; queueing the packets in one or more processing queues while the packets await processing by forwarding logic of the network device; based on the processing by the forwarding logic, forwarding first packets of the packets to destinations identified by the first packets; determining that a particular packet of the packets is to be dropped from a particular processing queue without being forwarded to a particular destination identified by the particular packet; in response to the determining that the particular packet is to be dropped, tagging the particular packet with a visibility tag; forwarding the particular packet, with the visibility tag to, to a visibility subsystem instead of the particular destination.

In an embodiment, the visibility tag includes at least an identifier of the network device or an identifier of the particular processing queue.

In an embodiment, tagging the particular packet comprises tagging one or more cells at the start of the particular packet, the method further comprising discarding one or more cells at the end of the particular packet before forwarding the particular packet to the visibility subsystem.

In an embodiment, the visibility subsystem is a data collector executing external to the network device.

In an embodiment, the visibility subsystem is a healing engine, the method further comprising: the healing engine inputting a plurality of tags tagged with the visibility tag; based on the plurality of tags, the healing engine reconfiguring the network device.

In an embodiment, reconfiguring the network device comprises updating a forwarding table of the network device.

In an embodiment, determining that the particular packet of the packets is to be dropped comprises one or more of: determining that the particular packet is corrupt, determining that a forwarding table look-up failure occurred with respect to a destination specified by the particular packet, determining that a resource constraint prevents the network device from using a particular resource to forward the particular packet, determining that the particular packet is experiencing a certain amount of latency, or determining that a policy prevents the network device from forwarding the particular packet.

According to an embodiment, a method comprises: receiving, at a network device, packets from one or more devices over a network; queueing the packets in one or more processing queues while the packets await processing by forwarding logic of the network device; based on the processing by the forwarding logic, forwarding first packets of the packets to destinations identified by the first packets; determining that a particular packet of the packets, in a particular processing queue, is undergoing inflated latency, the particular packet addressed to a particular destination; in response to the determining that the particular packet is experiencing inflated latency, duplicating the particular packet; tagging the particular packet or the duplicate particular packet with a visibility tag; forwarding the tagged packet, with the visibility tag to, to a visibility subsystem instead of the particular destination; forwarding the other of the particular packet or the duplicate particular packet to the particular destination.

In an embodiment, the visibility subsystem is a healing engine, the method further comprising: the healing engine inputting a plurality of tags tagged with the visibility tag; based on the plurality of tags, the healing engine reconfiguring the network device.

In an embodiment, tagging comprises tagging one or more cells at the start of the tagged packet, the method further comprising discarding one or more cells at the end of the tagged packet before forwarding the tagged packet to the visibility subsystem.

According to an embodiment, an apparatus comprises: a programmable visibility engine bound to one or more input data sources, the programmable visibility engine comprising logic implementing a defined set of functions, the one or more input data sources specifying function selection data that selects which one or more functions in the defined set to execute, the programmable visibility engine configured to execute the selected one or more functions on one or more input values specified by the one or more input data sources; one or more data stores storing data output by the programmable visibility engine; an address map that maps memory locations in the one or more memories to functions in the defined set of functions, the programmable visibility engine configured to write a result value of a given function of the defined set of functions to a given memory location, of the memory locations, that has been mapped to the given function.

In an embodiment, the apparatus further comprises: one or more communication interfaces configured to receive packets over one or more networks; one or more memories storing queues of the packets in which the packets await processing by forwarding logic; wherein the one or more input data sources pass values calculated based on statistics related to the queues.

In an embodiment, at least a first function of the defined set of functions instructs the forwarding logic to perform an action with respect to at least one packet based on a value output by the first function to the one or more data stores.

In an embodiment, the action is dropping the packet, issuing a flow control instruction, marking the packet for rate control, sampling the packet and sending the packet to a special processor component for analysis, duplicating the packet and sending the duplicate packet to a data collector, or sending information about the packet to a healing engine.

In an embodiment, at least a first function of the defined set of functions is further configured to trigger performance of an action by a processing component of the apparatus based on a value output by the first function.

In an embodiment, the programmable visibility engine repeatedly executes the one or more functions selected by the function selection data in iterations, the function selection data changing between at least a first iteration and a second iteration.

In an embodiment, the programmable visibility engine is a first programmable visibility engine of multiple programmable visibility engines in the apparatus, wherein a second programmable visibility engine is bound to first data output by the first programmable visibility engine as an input data source for the second programmable visibility engine.

In an embodiment, the first data output includes function selection data for the second programmable visibility engine.

In an embodiment, the second programmable visibility engine implements a different set of functions than the first programmable visibility engine.

In an embodiment, the input data source for the first programmable data engine includes a memory location to which the second programmable visibility engine writes data.

In an embodiment, the second programmable visibility engine inputs different function selection data than the first programmable visibility engine.

In an embodiment, the defined set of functions includes two or more of: an accumulate-by-value function that updates a data store by summing the data store with an input value; a count function that updates a data store to indicate the number of times the count function has been called; a compare function that compares an input value to an input threshold and updates a data store to indicate true or false based on the comparison; a probabilistic function that causes performance of an action when a randomly selected number surpasses an inputted probability threshold; or an Exponentially Weighted Moving Average function that accepts an input value and uses the input value to update a weighted moving average in a data store.

In an embodiment, the apparatus is a network switch.

In an embodiment, the programmable visibility engine is implemented by one or more Field Programmable Gate Arrays or Application-Specific Integrated Circuits.

In an embodiment, write operations to the data store from the programmable visibility engine are limited to a certain number per an interval of time, wherein the functions in the defined set of functions are associated with prioritization data indicating priorities for selecting which of the selected one or more functions are to perform write operations in a given interval of time.

According to an embodiment, a method comprising: binding a data input source to a programmable visibility engine configured to implement a defined set of functions; receiving one or more input values from the data input source; receiving function selection data, the function selection data selecting which one or more of the functions of the defined set of functions to execute on the one or more input values; executing the selected one or more functions on the one or more input values; identifying memory addresses mapped to the defined set of functions; writing results of the selected one or more functions to specific memory addresses mapped to the selected one or more functions.

In an embodiment, the method further comprises: receiving packets over one or more networks; storing queues of the packets while the packets await processing by forwarding logic; wherein the one or more input data sources pass values calculated based on statistics related to the queues.

In an embodiment, at least a first function of the defined set of functions instructs the forwarding logic to perform an action with respect to at least one packet based on a value output by the first function to the one or more data stores.

In an embodiment, action is dropping the packet, issuing a flow control instruction, marking the packet for rate control, sampling the packet and sending the packet to a special processor component for analysis, duplicating the packet and sending the duplicate packet to a data collector, or sending information about the packet to a healing engine.

In an embodiment, at least a first function of the defined set of functions is configured to trigger performance of an action by a processing component based on a value output by the first function.

In an embodiment, the method further comprises repeatedly executing the one or more functions selected by the function selection data in iterations, the function selection data changing between at least a first iteration and a second iteration.

In an embodiment, the programmable visibility engine is a first of multiple programmable visibility engines, wherein a second programmable visibility engine is bound to first data output by the first programmable visibility engine as an input data source for the second programmable visibility engine.

In an embodiment, the defined set of functions includes two or more of: an accumulate-by-value function that updates a data store by summing the data store with an input value; a count function that updates a data store to indicate the number of times the count function has been called; a compare function that compares an input value to an input threshold and updates a data store to indicate true or false based on the comparison; a probabilistic function that causes performance of an action when a randomly selected number surpasses an inputted probability threshold; or an Exponentially Weighted Moving Average function that accepts an input value and uses the input value to update a weighted moving average in a data store.

In an embodiment, the method is performed by a network switch. In an embodiment, the programmable visibility engine is implemented by one or more Field Programmable Gate Arrays or Application-Specific Integrated Circuits.

Other examples of these and other embodiments are found throughout this disclosure.

8.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though the foregoing techniques are described with respect to a hardware implementation, which provides a number of advantages in certain embodiments, it will also be recognized that, in another embodiment, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 18:
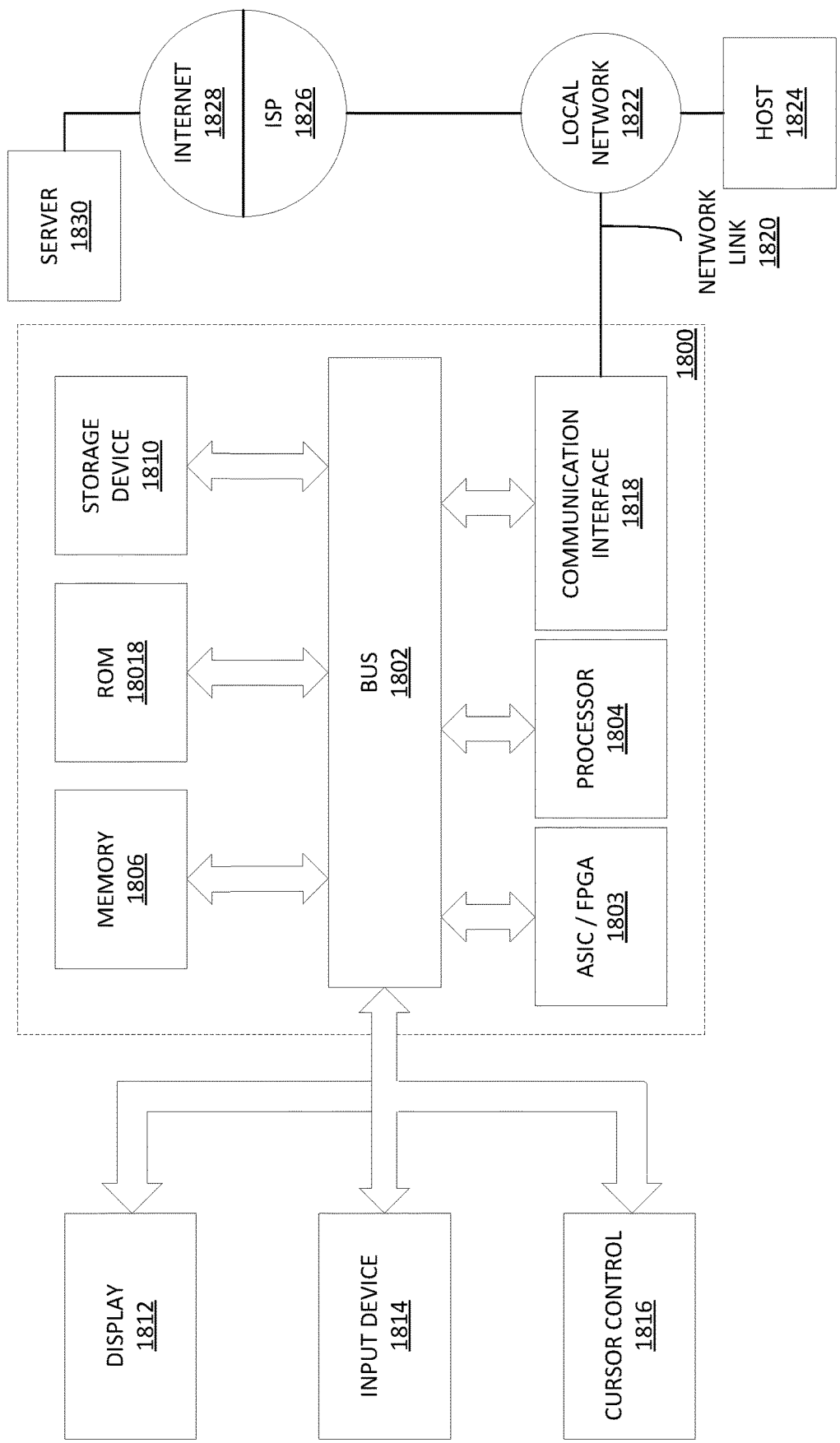
FIG. 18 is block diagram of a computer system upon which embodiments of the inventive subject matter may be implemented.

FIG. 18 is a block diagram that illustrates a computer system 1800 that may be utilized in implementing the above-described techniques, according to an embodiment. Computer system 1800 may be, for example, a desktop computing device, laptop computing device, tablet, smartphone, server appliance, computing mainframe, multimedia device, handheld device, networking apparatus, or any other suitable device.

Computer system 1800 may include one or more ASICs, FPGAs, or other specialized circuitry 1803 for implementing program logic as described herein. For example, circuitry 1803 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1800 may include one or more hardware processors 1804 configured to execute software-based instructions. Computer system 1800 may also include one or more busses 1802 or other communication mechanism for communicating information. Busses 1802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1800 also includes one or more memories 1806, such as a RAM, hardware registers, or other dynamic or volatile storage device for storing data units to be processed by the one or more ASICs, FPGAs, or other specialized circuitry 1803. Memory 1806 may also or instead be used for storing information and instructions to be executed by processor 1804. Memory 1806 may be directly connected or embedded within circuitry 1803 or a processor 1804. Or, memory 1806 may be coupled to and accessed via bus 1802. Memory 1806 also may be used for storing temporary variables, data units describing rules or policies, or other intermediate information during execution of program logic or instructions.

Computer system 1800 further includes one or more read only memories (ROM) 1808 or other static storage devices coupled to bus 1802 for storing static information and instructions for processor 1804. One or more storage devices 1810, such as a solid-state drive (SSD), magnetic disk, optical disk, or other suitable non-volatile storage device, may optionally be provided and coupled to bus 1802 for storing information and instructions.

A computer system 1800 may also include, in an embodiment, one or more communication interfaces 1818 coupled to bus 1802. A communication interface 1818 provides a data communication coupling, typically two-way, to a network link 1820 that is connected to a local network 1822. For example, a communication interface 1818 may be an integrated services digital network (ISDN) card, cable modem, satellite modem, or a modem to provide a data communication connection to a corresponding type of telephone line. As another example, the one or more communication interfaces 1818 may include a local area network (LAN) card to provide a data communication connection to a compatible LAN. As yet another example, the one or more communication interfaces 1818 may include a wireless network interface controller, such as a 1802.11-based controller, Bluetooth controller, Long Term Evolution (LTE) modem, and/or other types of wireless interfaces. In any such implementation, communication interface 1818 sends and receives electrical, electromagnetic, or optical signals that carry digital data streams representing various types of information.

Network link 1820 typically provides data communication through one or more networks to other data devices. For example, network link 1820 may provide a connection through local network 1822 to a host computer 1824 or to data equipment operated by a Service Provider 1826. Service Provider 1826, which may for example be an Internet Service Provider (ISP), in turn provides data communication services through a wide area network, such as the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

In an embodiment, computer system 1800 can send messages and receive data through the network(s), network link 1820, and communication interface 1818. In some embodiments, this data may be data units that the computer system 1800 has been asked to process and, if necessary, redirect to other computer systems via a suitable network link 1820. In other embodiments, this data may be instructions for implementing various processes related to the described techniques. For instance, in the Internet example, a server 1830 might transmit a requested code for an application program through Internet 1828, ISP 1826, local network 1822 and communication interface 1818. The received code may be executed by processor 1804 as it is received, and/or stored in storage device 1810, or other non-volatile storage for later execution. As another example, information received via a network link 1820 may be interpreted and/or processed by a software component of the computer system 1800, such as a web browser, application, or server, which in turn issues instructions based thereon to a processor 1804, possibly via an operating system and/or other intermediate layers of software components.

Computer system 1800 may optionally be coupled via bus 1802 to one or more displays 1812 for presenting information to a computer user. For instance, computer system 1800 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1812.

One or more input devices 1814 are optionally coupled to bus 1802 for communicating information and command selections to processor 1804. One example of an input device 1814 is a keyboard, including alphanumeric and other keys. Another type of user input device 1814 is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane. Yet other examples of suitable input devices 1814 include a touch-screen panel affixed to a display 1812, cameras, microphones, accelerometers, motion detectors, and/or other sensors. In an embodiment, a network-based input device 1814 may be utilized. In such an embodiment, user input and/or other information or commands may be relayed via routers and/or switches on a Local Area Network (LAN) or other suitable shared network, or via a peer-to-peer network, from the input device 1814 to a network link 1820 on the computer system 1800.

As discussed, computer system 1800 may implement techniques described herein using customized hard-wired logic, one or more ASICs or FPGAs 1803, firmware and/or program logic, which in combination with the computer system causes or programs computer system 1800 to be a special-purpose machine. According to one embodiment, however, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1810. Volatile media includes dynamic memory, such as main memory 1806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1800 can receive the data on the network and demodulate the signal to decode the transmitted instructions. Appropriate circuitry can then place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

9.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network switching apparatus comprising:
   one or more communication interfaces configured to receive packets from one or more devices over a network;
   forwarding logic, configured to:
      determine whether certain packets of the packets are experiencing an unexpected amount of latency based on comparing delays in transmission of the certain packets to a target threshold;
      forward first packets of the packets, including at least those of the certain packets determined not to be experiencing the unexpected amount of latency, to destinations associated with address information specified by the first packets;
      determine, based on the comparing, that a particular packet of the packets is experiencing the unexpected amount of latency;
      in response to the determining that the particular packet is experiencing the unexpected amount of latency, forward at least a first portion of the particular packet to a visibility subsystem along a visibility path that is different than any normal path to any destination associated with particular address information specified by the particular packet.

2. The network switching apparatus of claim 1, wherein the forwarding logic is further configured to also forward the particular packet to a destination associated with the particular address information specified by the particular packet.

3. The network switching apparatus of claim 1, wherein the forwarding logic is configured to forward at least the first portion of the particular packet to the visibility subsystem instead of sending the particular packet to a destination associated with the particular address information specified by the particular packet.

4. The network switching apparatus of claim 1, wherein the forwarding logic is further configured to tag the first portion of the particular packet with a visibility tag that includes at least an identifier of the network switching apparatus or an identifier of a particular processing queue within the network switching apparatus in which the particular packet was placed.

5. The network switching apparatus of claim 1, wherein the first portion comprises only one or more cells at the start of the particular packet, the forwarding logic configured not to forward one or more cells at the end of the particular packet to the visibility subsystem.

6. The network switching apparatus of claim 1, wherein the visibility subsystem is a data collector executing external to the network switching apparatus.

7. The network switching apparatus of claim 1, wherein the visibility subsystem is a healing engine, the healing engine configured to, based on a plurality of packets sent to the visibility subsystem, reconfigure the network switching apparatus.

8. The network switching apparatus of claim 1, wherein the forwarding logic is configured to:
  determine a plurality of the packets that are experiencing the unexpected amount of latency, including the particular packet;
  select one or more of the packets in the plurality of packets to send to the visibility subsystem at a certain frequency, wherein the particular packet is one of the selected one or more of the packets, wherein copies of other packets in the plurality of packets are not sent to the visibility subsystem.

9. The network switching apparatus of claim 1, wherein the forwarding logic is configured to:
  determine a plurality of the packets that are experiencing the unexpected amount of latency, including the particular packet;
  select one or more of the packets in the plurality of packets to send to the visibility subsystem based on one or more attributes of the packets, wherein the particular packet is one of the selected one or more of the packets, wherein copies of other packets in the plurality of packets are not sent to the visibility subsystem.

10. The network switching apparatus of claim 1,
  wherein the forwarding logic is configured to determine a plurality of the packets that are experiencing the unexpected amount of latency, including the particular packet;
  wherein the network switching apparatus further comprises sampling logic configured to select a sample of the packets in the plurality of packets to send to an external device for analysis.

11. The network switching apparatus of claim 1, wherein determining that the particular packet is experiencing the unexpected amount of latency is based on a timestamp associated with the particular packet.

12. The network switching apparatus of claim 1, wherein determining that the particular packet is experiencing the unexpected amount of latency is based on a congestion level of a port associated with the particular packet.

13. The network switching apparatus of claim 1, wherein determining that the particular packet is experiencing the unexpected amount of latency is based on one or more of: a timestamp associated with the particular packet, or a congestion level of a port associated with the particular packet.

14. A method comprising:
  receiving, at a network switching apparatus, packets from one or more devices over a network;
  determining whether certain packets of the packets are experiencing an unexpected amount of latency based on comparing delays in transmission of the certain packets to a target threshold;
  forwarding first packets of the packets, including at least those of the certain packets determined not to be experiencing the unexpected amount of latency, to destinations associated with address information specified by the first packets;
  determining, based on the comparing, that a particular packet of the packets is experiencing the unexpected amount of latency;
  in response to the determining that the particular packet is experiencing the unexpected amount of latency, forwarding at least a first portion of the particular packet to a visibility subsystem along a visibility path that is different than any normal path to any destination associated with particular address information specified by the particular packet.

15. The method of claim 14, further comprising also forwarding the particular packet to a destination associated with the particular address information specified by the particular packet.

16. The method of claim 14, further comprising:
  tagging the first portion of the particular packet with a visibility tag that includes at least an identifier of the network switching apparatus or an identifier of a particular processing queue within the network switching apparatus in which the particular packet was placed;
  wherein the first portion comprises only one or more cells at the start of the particular packet;
  wherein one or more cells at the end of the particular packet are not forwarded to the visibility subsystem.

17. The method of claim 14, wherein the visibility subsystem is a data collector executing external to the network switching apparatus.

18. The method of claim 14, wherein the visibility subsystem is a healing engine, the method further comprising, based on a plurality of packets sent to the visibility subsystem, reconfiguring the network switching apparatus.

19. The method of claim 14, further comprising:
  determining a plurality of the packets that are experiencing the unexpected amount of latency, including the particular packet;
  selecting one or more of the packets in the plurality of packets to send to the visibility subsystem based on one or more of: an attribute of the particular packets or a certain frequency;
  wherein the particular packet is one of the selected one or more of the packets, wherein copies of other packets in the plurality of packets are not sent to the visibility subsystem.

20. One or more non-transitory computer readable media storing instructions that, when executed by a network switching apparatus, cause:
  receiving, at a network switching apparatus, packets from one or more devices over a network;

determining whether certain packets of the packets are experiencing an unexpected amount of latency based on comparing delays in transmission of the certain packets to a target threshold;

forwarding first packets of the packets, including at least those of the certain packets determined not to be experiencing the unexpected amount of latency, to destinations associated with address information specified by the first packets;

determining, based on the comparing, that a particular packet of the packets is experiencing the unexpected amount of latency;

in response to the determining that the particular packet is experiencing the unexpected amount of latency, forwarding at least a first portion of the particular packet to a visibility subsystem along a visibility path that is different than any normal path to any destination associated with particular address information specified by the particular packet.

* * * * *